(12) United States Patent
Dickie et al.

(10) Patent No.: US 12,387,145 B2
(45) Date of Patent: Aug. 12, 2025

(54) PREDICTION OF FUTURE OCCURRENCES OF EVENTS USING ADAPTIVELY TRAINED ARTIFICIAL-INTELLIGENCE PROCESSES AND CONTEXTUAL DATA

(71) Applicant: The Toronto-Dominion Bank, Toronto (CA)

(72) Inventors: Paige Elyse Dickie, Toronto (CA); Jianjin Dong, Toronto (CA); Tomi Johan Poutanen, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1180 days.

(21) Appl. No.: 17/190,992

(22) Filed: Mar. 3, 2021

(65) Prior Publication Data
US 2022/0207430 A1 Jun. 30, 2022

Related U.S. Application Data

(60) Provisional application No. 63/132,832, filed on Dec. 31, 2020.

(51) Int. Cl.
*G06N 20/20* (2019.01)
*G06N 5/01* (2023.01)
*G06F 40/40* (2020.01)

(52) U.S. Cl.
CPC .............. *G06N 20/20* (2019.01); *G06N 5/01* (2023.01); *G06F 40/40* (2020.01)

(58) Field of Classification Search
CPC ........... G06N 20/20; G06N 5/01; G06F 40/40
See application file for complete search history.

(56) References Cited

U.S. PATENT DOCUMENTS 10,726,334 B1 * 7/2020 Elnahrawy ............. G06N 3/088
11,151,480 B1 * 10/2021 Golovidov ............ G06F 16/904
(Continued)

FOREIGN PATENT DOCUMENTS

CA           3019195 A1 * 4/2020 ............. G06Q 30/02
CN          209085657 U * 7/2019 ......... B62D 15/0215
(Continued)

*Primary Examiner* — Hassan Mrabi
(74) *Attorney, Agent, or Firm* — NIXON PEABODY LLP

(57) ABSTRACT

The disclosed embodiments include computer-implemented apparatuses and processes that dynamically predict future occurrences of events using adaptively trained artificial-intelligence processes and contextual data. For example, an apparatus may generate an input dataset based on first interaction data and contextual data associated with a prior temporal interval, and may apply an adaptively trained, gradient-boosted, decision-tree process to the input dataset. Based on the application of the adaptively trained, gradient-boosted, decision-tree process to the input dataset, the apparatus may generate output data representative of a predicted likelihood of an occurrence of an event during a future temporal interval, which may be separated from the prior temporal interval by a corresponding buffer interval. The apparatus may also transmit a portion of the generated output data to a computing system, and the computing system may be configured to generate or modify second interaction data based on the portion of the output data.

21 Claims, 9 Drawing Sheets

(56) References Cited

U.S. PATENT DOCUMENTS

| | | | |
|---|---|---|---|
| 11,188,940 B1* | 11/2021 | Vanderveld | G06N 20/00 |
| 11,200,514 B1* | 12/2021 | Chen | G06N 20/00 |
| 11,227,269 B2* | 1/2022 | Collares | G06N 3/08 |
| 11,538,048 B1* | 12/2022 | Nahta | G06N 3/0985 |
| 2018/0089585 A1* | 3/2018 | Rickard, Jr. | G06N 20/00 |
| 2018/0314947 A1* | 11/2018 | Morris, II | G06N 20/00 |
| 2019/0102681 A1* | 4/2019 | Roberts | G06N 20/00 |
| 2019/0324444 A1* | 10/2019 | Cella | G05B 19/4183 |
| 2019/0339688 A1* | 11/2019 | Cella | H04L 1/18 |
| 2019/0370684 A1* | 12/2019 | Gunes | G06N 20/00 |
| 2020/0104911 A1* | 4/2020 | Suvajac | G06N 3/04 |
| 2020/0225655 A1* | 7/2020 | Cella | G05B 19/41875 |
| 2020/0250548 A1* | 8/2020 | Shwartz | G06N 5/045 |
| 2020/0251213 A1* | 8/2020 | Tran | G06N 20/00 |
| 2020/0341878 A1* | 10/2020 | Chaturvedi | G08B 1/08 |
| 2021/0035224 A1* | 2/2021 | Crabtree | G06Q 10/067 |
| 2021/0264375 A1* | 8/2021 | Himura | G06Q 10/04 |
| 2021/0378563 A1* | 12/2021 | Derdzinski | A61B 5/0022 |
| 2022/0028010 A1* | 1/2022 | Jeske | G06Q 40/12 |
| 2022/0075878 A1* | 3/2022 | Begg | G06F 21/6245 |
| 2022/0108238 A1* | 4/2022 | Liposky | G06N 20/00 |
| 2022/0108240 A1* | 4/2022 | Liposky | G06Q 10/0635 |
| 2022/0108241 A1* | 4/2022 | Jalal | G06Q 30/0201 |
| 2022/0108402 A1* | 4/2022 | Jalal | G06N 5/01 |
| 2022/0197306 A1* | 6/2022 | Cella | G06N 3/088 |
| 2022/0207295 A1* | 6/2022 | Stanevich | G06F 18/2185 |
| 2022/0207430 A1* | 6/2022 | Dickie | G06N 5/01 |
| 2022/0207606 A1* | 6/2022 | Dickie | G06N 20/20 |
| 2022/0277227 A1* | 9/2022 | Yu | G06Q 30/01 |
| 2022/0277323 A1* | 9/2022 | Whelan | G06Q 30/0201 |
| 2023/0222454 A1* | 7/2023 | Cella | G06N 7/01 |
| | | | 705/28 |

FOREIGN PATENT DOCUMENTS

| | | | | |
|---|---|---|---|---|
| CN | 111279304 B | * | 8/2023 | G06F 16/221 |
| WO | 2019/031794 | | 2/2019 | |
| WO | WO-2019116417 A1 | * | 6/2019 | G06N 20/20 |

* cited by examiner

PREDICTION OF FUTURE OCCURRENCES OF EVENTS USING ADAPTIVELY TRAINED ARTIFICIAL-INTELLIGENCE PROCESSES AND CONTEXTUAL DATA

CROSS-REFERENCE TO RELATED APPLICATION

This application claims the benefit of priority under 35 U.S.C. § 119(e) to prior U.S. Provisional Application No. 63/132,832, filed Dec. 31, 2020, the disclosure of which is incorporated by reference herein to its entirety.

TECHNICAL FIELD

The disclosed embodiments generally relate to computer-implemented systems and processes that facilitate a prediction of future occurrences of events using adaptively trained artificial intelligence processes and contextual data.

BACKGROUND

Today, many financial institutions extend credit in the form of credit-card accounts, personal loans, and other unsecured lines-of-credit to their customers in accordance with certain terms and conditions, such as a repayment schedule or corresponding interest rate. The terms and conditions associated with the extended credit may be established initially by the financial institutions prior to issuing the credit-card accounts, personal loans, and unsecured lines-of-credit to corresponding ones of the customers and further, the financial institutions may elect to modify one or more of the terms and conditions of the extended credit based on an evolution in the relationships between the financial institutions and the customers, and based on the customer's use, or misuse, of various financial or credit instruments issued by these financial institutions.

SUMMARY

In some examples, an apparatus includes a memory storing instructions, a communications interface, and at least one processor coupled to the memory and the communications interface. The at least one processor is configured to execute the instructions to generate an input dataset based on (i) elements of first interaction data associated with a first temporal interval and (ii) elements of contextual data characterizing exchanges of data initiated during the first temporal interval. The at least one processor is further configured to execute the instructions to apply a trained first artificial intelligence process to the input dataset, and based on the application of the trained first artificial intelligence process to the input dataset, generate output data representative of a predicted likelihood of an occurrence of an event during a second temporal interval. The second temporal interval is subsequent to the first temporal interval and is separated from the first temporal interval by a corresponding buffer interval. The at least one processor is further configured to execute the instructions to transmit at least a portion of the generated output data to a computing system via the communications interface. The computing system is configured to generate or modify second interaction data based on the portion of the output data.

In other examples, a computer-implemented method may include generating, using at least one processor, an input dataset based on (i) elements of first interaction data associated with a first temporal interval and (ii) elements of contextual data characterizing exchanges of data initiated during the first temporal interval. The computer-implemented method may also include, using the at least one processor, applying a trained first artificial intelligence process to the input dataset, and based on the application of the trained first artificial intelligence process to the input dataset, generating output data representative of a predicted likelihood of an occurrence of an event during a second temporal interval. The second temporal interval is subsequent to the first temporal interval and is separated from the first temporal interval by a corresponding buffer interval. The computer-implemented method may also include transmitting, using the at least one processor, at least a portion of the generated output data to a computing system. The computing system is configured to generate or modify second interaction data based on the portion of the output data.

Additionally, in some examples, a tangible, non-transitory computer-readable medium stores instructions that, when executed by at least one processor, cause the at least one processor to perform a method. The method includes generating an input dataset based on (i) elements of first interaction data associated with a first temporal interval and (ii) elements of contextual data characterizing exchanges of data initiated during the first temporal interval. The method also includes applying a trained first artificial intelligence process to the input dataset, and based on the application of the trained first artificial intelligence process to the input dataset, generating output data representative of a predicted likelihood of an occurrence of an event during a second temporal interval. The second temporal interval is subsequent to the first temporal interval and is separated from the first temporal interval by a corresponding buffer interval. The method further includes transmitting at least a portion of the generated output data to a computing system. The computing system is configured to generate or modify second interaction data based on the portion of the output data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

BRIEF DESCRIPTION OF THE DRAWINGS

Like reference numbers and designations in the various drawings indicate like elements.

DETAILED DESCRIPTION

Figure 1A:
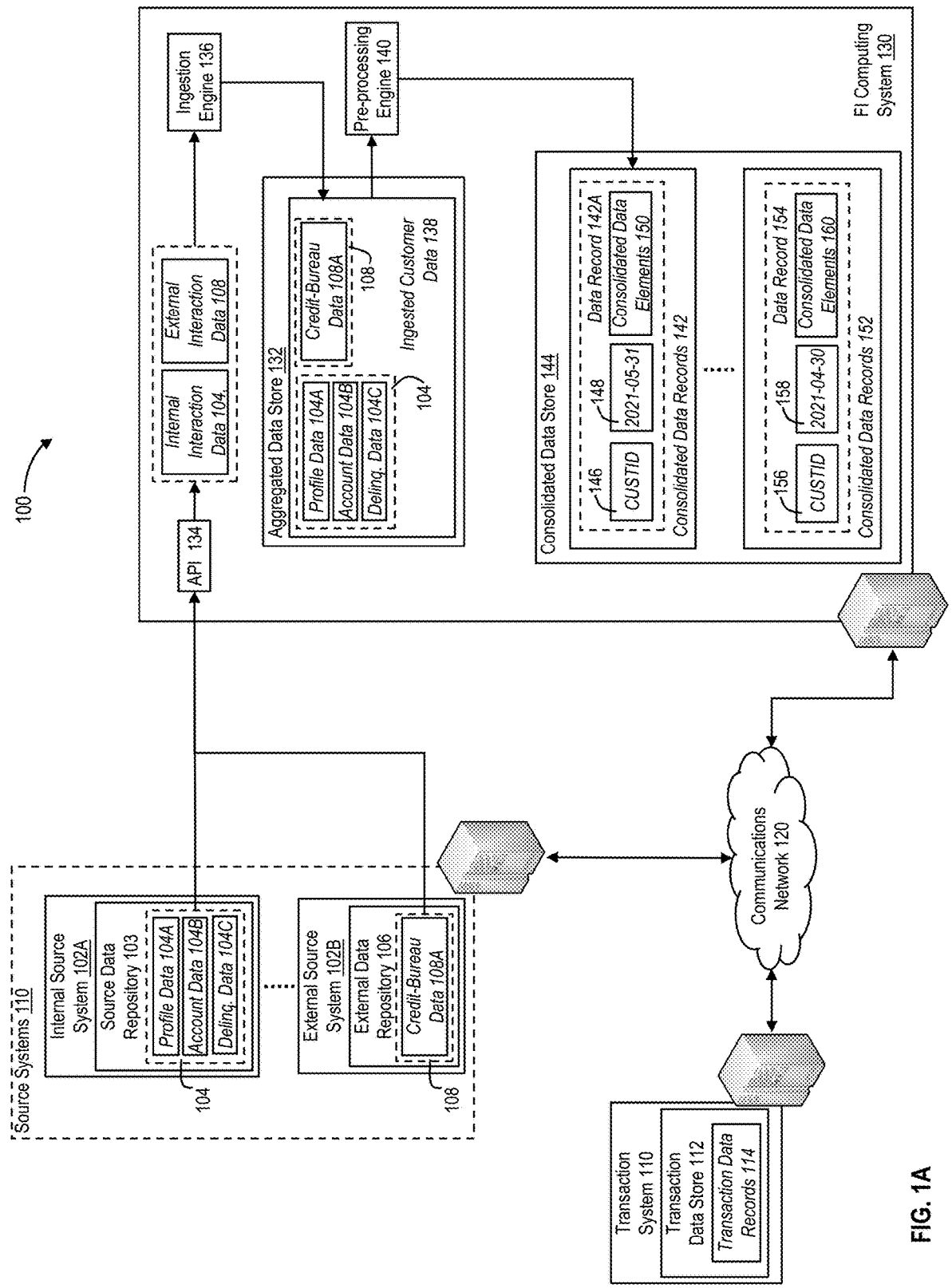
FIGS. 1A, 1B, and 1C are block diagrams illustrating portions of an exemplary computing environment, in accordance with some exemplary embodiments.

Modern financial institutions offer a variety of financial products or services to their customers, both through in-person branch banking and through various digital channels, and decisions related to the provisioning of a particular financial product or service to a corresponding customer are often informed by the customer's relationship with the financial institution and the customer's use, or misuse, of other financial products or services. For example, one or more computing systems of a financial institution (e.g., an FI computing system, as described herein) may obtain, generate, and maintain elements of customer profile data identifying the customer and characterizing the customer's relationship with the financial institution, elements of account data identifying and characterizing one or more financial products issued to the customer by the financial institution, elements of transaction data identifying and characterizing one or more transactions involving these issued financial products, or elements of reporting data, such as credit-bureau data associated with the particular customer. The elements of customer profile data, account data, transaction data, and/or reporting data may establish collectively a time-evolving risk profile for the customer, and the financial institution may base not only a decision to provision the particular financial product or service to the corresponding customer, but also a determination of one or more initial terms and conditions of the provisioned financial product or service, on the established risk profile.

By way of example, the particular financial product or service may include an unsecured credit product, such as a credit-card account, and the initial terms and conditions imposed on that credit-card account may include, but are not limited to, an amount of credit extended to the customer (e.g., a credit limit), a repayment schedule, an interest rate, or a penalty imposed upon the customer by the financial institution in response to a determined violation of the initial terms or conditions. Further, and based on additional elements of the customer profile data, account data, transaction data, and/or reporting data generated or obtained subsequent to the issuance of the credit-card account, the one or more FI computing systems may perform operations that modify one or more of the initial terms or conditions of the unsecured credit product to reflect the customer's use, or misuse, of the credit-card account, a change in the customer's relationship with the financial institution, and additionally, or alternatively, a determined use, or misuse, of other financial products or services. The modifications to the initial terms or conditions may include, but are not limited to, an increase in the interest rate, a reduction in the credit limit, an acceleration of the repayment schedule or an increase in a scheduled monthly payment, or a request that the customer repay all, or a portion of, an outstanding balance associated with the credit-card account.

In some instances, the determination of the initial terms and conditions of the credit-card account by the one or more FI computing systems, and any modification to these initial terms and conditions subsequent to issuance of the credit-card account to the customer, may be informed by, and may reflect, a risk to the financial institution that the customer will be unable to satisfy the obligations associated with the issued credit-card account. By way of example, and upon issuance of the credit-card account to the customer, the financial institution may assume the risk that the customer, at some point in the future, may be unable to submit, or may delay a submission of, one or more scheduled payments associated with the credit-card account to the financial institution, and as such, that the issued credit-card account may accrue a past-due balance that increases with delayed, or missed, scheduled payment. The inability to satisfy the obligations associated with the unsecured credit product, e.g., in accordance with the initial or modified terms and conditions, may result in, or may represent, an occurrence of a default event involving the customer.

By way of example, and for the customer holding the credit card account, a default event involving the customer and the credit-card account may occur when the past-due balance exceeds a predetermined threshold balance (e.g., $150, etc.) and is associated with a corresponding past-due interval (e.g., as defined by the number of scheduled payments missed, or delayed, by the customer) that exceeds a predetermined a threshold time period (e.g., sixty days, etc.). An occurrence of a default event may also be associated with an inability of the financial institution to recover all, or at least a portion of an outstanding balance associated with the credit-card account, and in some instances, a default event involving the customer and the credit-card account may occur when the customer is associated with, or declares, a personal bankruptcy, or when the financial institution writes down the past-due balance on the credit-card account (e.g., to cancel an unrecoverable or "bad" debt).

To further characterize the risk posed to the financial institution by the issuance of the credit-card account to the customer, the one or more FI computing systems may analyze the elements of customer profile, account, transaction, or reporting data and generate a corresponding score that characterizes the level of risk associated with issuance of the credit-card account to the customer. While these computed scores may reflect a probability that the customer may misuse the credit-card account during a current temporal interval, and may characterize a relationship between the customer and the financial institution during that current temporal interval, these computed scores may alone be incapable of characterizing a risk that the customer will experience or be associated with a default event during a future temporal interval, much less of capturing, in real-time, changes in the purchasing or spending habits of customers that could be indicative of likelihood of a future default event. Furthermore, given the increasing volume of the profile, transaction, account, or reporting data maintained by the one or more FI computing systems on behalf of their customers, some existing processes may be incapable of analyzing the elements of customer profile, transaction, account, or reporting data, and of generating the corresponding, customer-specific scores, in time frames sufficient to support a real-time determination of the initial terms and conditions of a requested unsecured credit product, such as a credit-card account, or the periodic monitoring of the risk posed to the financial institution by these unsecured credit products subsequent to their issuance to various customers.

In some examples, described herein, a machine-learning or artificial-intelligence process may be adaptively trained to predict a likelihood of an occurrence of a default event involving a customer during a future temporal interval using training data associated with a first prior temporal interval, and using validation data associated with a second, and distinct, prior temporal interval. The machine-learning or artificial-intelligence process may include an ensemble or decision-tree process, such as a gradient-boosted decision-tree process (e.g., XGBoost model), and the training and validation data may include, but are not limited to, elements of profile, account, or reporting data characterizing corresponding ones of the customers of the financial institution, along with elements of delinquency data identifying and characterizing prior occurrences of default events associated with, or involving, the corresponding customers.

Further, and as described herein, the training and validation data may also include elements of contextual data that characterize a determined or detected change in the spending and purchase habits of the customers across one or more temporal intervals. The elements of contextual data may, in some examples, be generated through an application of one or more adaptively trained, natural language processing (NLP) algorithms or models to elements of transaction data that characterize counterparties to purchase transactions initiated by the customers of the financial institution. Further, the elements of contextual data may associate each of these counterparties with a corresponding counterparty type, and may assign each of these counterparties to a one or more of predetermined, type-specific counterparty categories.

Through the implementation of the exemplary processes described herein, the one or more FI computing systems (e.g., which may collectively establish a distributed computing cluster associated with the financial institution) may perform operations that adaptively, and successively, train and validate the machine-learning or artificial-intelligence process based on corresponding subsets of the training and validation data. Further, the trained machine-learning or artificial-intelligence process (e.g., the trained gradient-boosted, decision-tree process described herein) may further ingest input datasets associated with one or more customers of the financial institution, and based on an application of the trained gradient-boosted, decision-tree process to the input datasets, the one or more FI computing systems may generate elements of output data indicative of a likelihood of an occurrence of a default event involving corresponding ones of the customers during a future temporal interval, such a three-month interval disposed between three and six months from a prediction date.

Certain of these exemplary processes, which adaptively train and validate a gradient-boosted, decision-tree process using customer-specific training and validation datasets associated with respective training and validation periods, and which apply the trained and validated gradient-boosted, decision-tree process to additional customer-specific input datasets, may enable the one or more of the FI computing systems to predict, in real-time, a likelihood of an occurrence of a default event involving one or more customers of the financial institution during a predetermined, future temporal interval (e.g., via an implementation of one or more parallelized, fault-tolerant distributed computing and analytical protocols across clusters of graphical processing units (GPUs) and/or tensor processing units (TPUs)). These exemplary processes may, for example, be implemented in addition to, or as alternative to, processes through which the one or more FI computing systems compute customer-specific scores indicative of a potential misuse of an issued credit product by a customer during a current temporal interval or that characterize a relationship between the financial institution and a corresponding customer during the current temporal interval.

Further, certain of these exemplary processes, which generate training, validation, and input datasets that include feature values obtained from, or derived from, elements of contextual data that characterize purchase transactions initiated by customers of the financial institution, may enable the one or more of the FI computing systems to adaptively train and validate the gradient-boosted, decision-tree process using, and to apply the trained and validated gradient-boosted, decision-tree process to, data characterizing real-time changes, or real-time patterns, in the counterparty-specific purchasing or spending habits of these customers. The data characterizing the real-time changes or patterns in the counterparty-specific purchasing or spending habits of the customers may, for example, capture a real-time transition in customer purchasing or spending between certain types of counterparties, or certain type-specific counterparty categories, and may be associated with a contribution to a predicted risk of future customer default that exceeds comparable contributions by other feature values of the training, validation, and input datasets (e.g., extracted, or derived, from elements of customer profile, account, delinquency, and/or reporting data). Additionally, one or more of the exemplary processes described herein may provide, to the financial institution, a real-time indication of the likelihood of a future default event involving one or more customers, which may inform a determination of not only an initial set of terms and conditions associated with a newly issued credit product, but also a subsequent modification of an existing set of terms and conditions associated with a previously issued credit product.

Figure 1B:
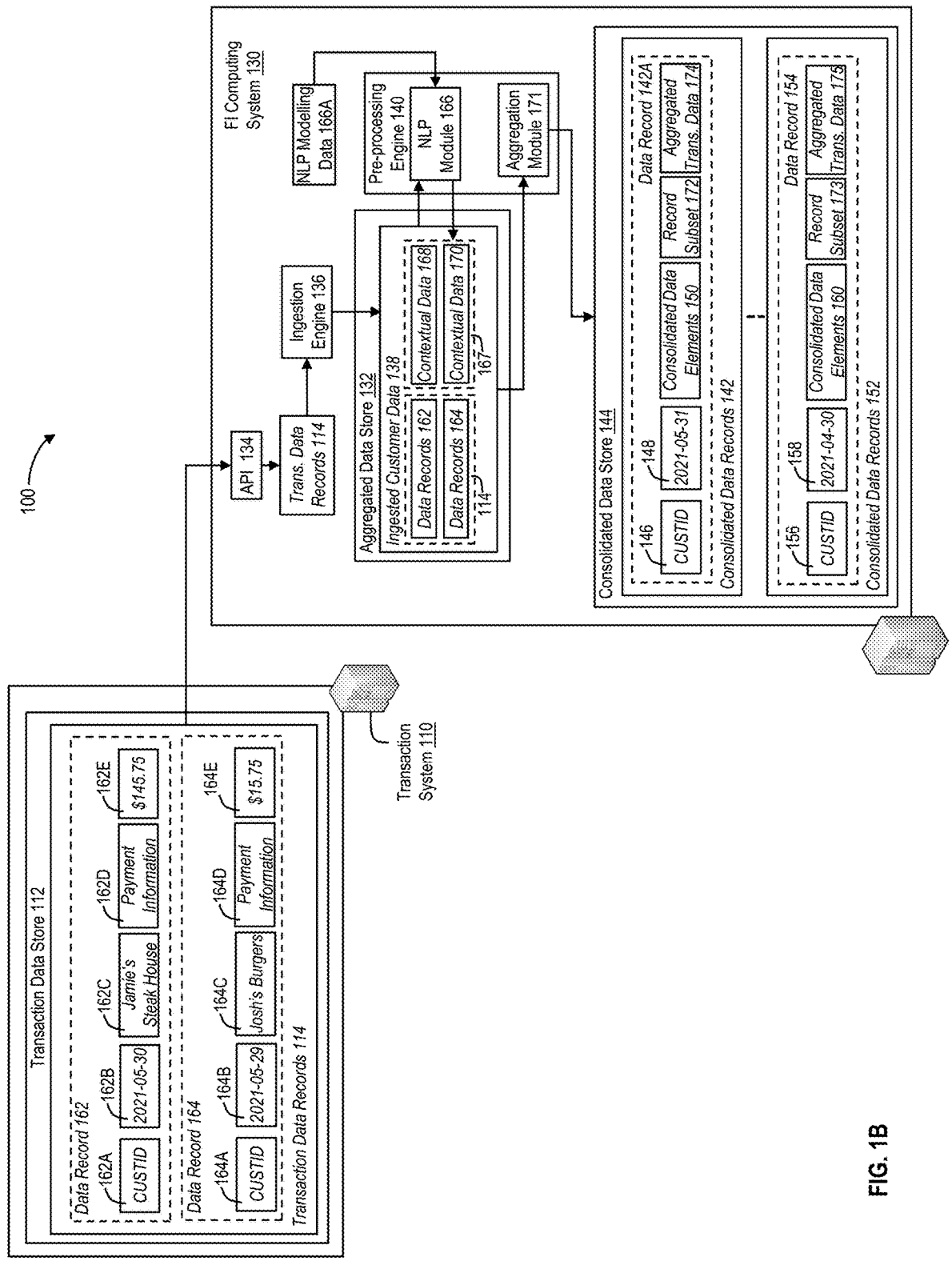
Figure 1C:
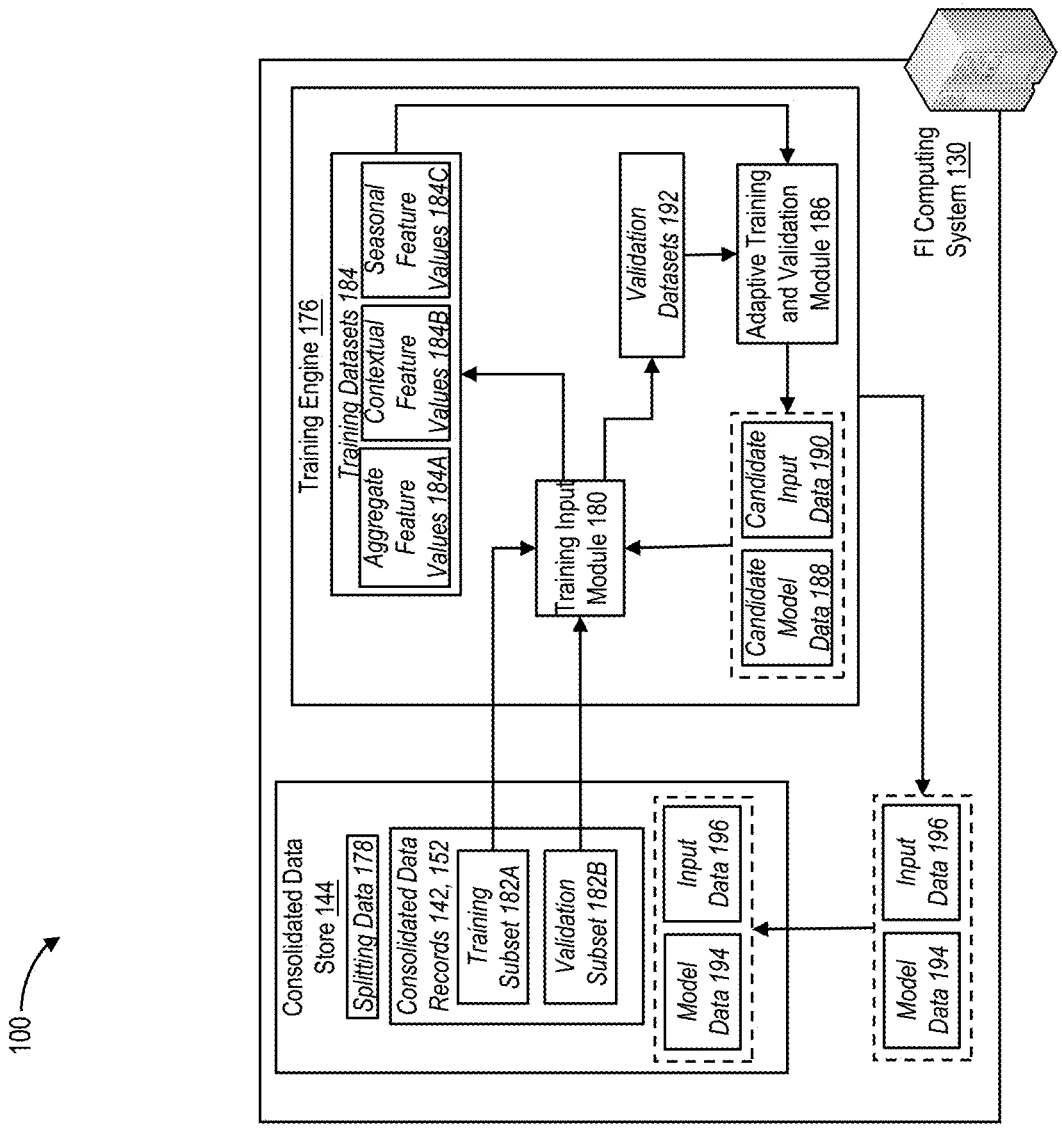

A. Exemplary Processes for Adaptively Training Gradient-Boosted, Decision Tree Processes Using Contextual Data in a Distributed Computing Environment FIGS. 1A, 1B, and 1C illustrate components of an exemplary computing environment 100, in accordance with some exemplary embodiments. For example, as illustrated in FIG. 1A, environment 100 may include one or more source systems 102, such as, but not limited to, internal source system 102A and external source system 102B, and one or more computing systems associated with, or operated by, a financial institution, such as a transaction system 110 and a financial institution (FI) computing system 130, In some instances, each of source systems 102 (including internal source system 102A and external source system 102B), transaction system 110, and FI computing system 130, may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 (including internal source system 102A and external source system 102B), transaction system 110, and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 102 (including internal source system 102A and external source system 102B), transaction system 110, and FI computing system 130 may also include a communications interface, such as one or more wireless transceivers, coupled to the one or more processors for accommodating wired or wireless internet communication with other computing systems and devices operating within environment 100.

Further, in some instances, source systems 102 (including internal source system 102A and external source system 102B), transaction system 110, and FI computing system 130 may each be incorporated into a respective, discrete computing system. In additional, or alternate, instances, one or more of source systems 102 (including internal source system 102A and external source system 102B), transaction system 110, and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with and maintained by the financial institution, although in other examples, FI computing system 130 or transaction system 110 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed computing components of FI computing system 130 may perform any of the exemplary processes described herein, to ingest elements of data associated with the customers of the financial institution, including elements of transaction data characterizing purchase transaction involving these customers, to preprocess the ingested data element and characterize, in real-time, trends or patterns in the customers' purchase transactions, and to store the preprocessed data elements within an accessible data repository (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may perform operations in parallel that not only train adaptively a machine learning or artificial intelligence process (e.g., the gradient-boosted, decision-tree process described herein) using corresponding training and validation datasets extracted from temporally distinct subsets of the preprocessed data elements, but also apply the adaptively trained machine learning or artificial intelligence process to customer-specific input datasets and generate, in real time, elements of output data indicative of a likelihood of an occurrence of a default event involving corresponding ones of the customers during a future temporal interval, such a three-month interval disposed between three and six months from a prediction date. The implementation of the parallelized, fault-tolerant distributed computing and analytical protocols described herein across the one or more GPUs or TPUs included within the distributed components of FI computing system 130 may, in some instances, accelerate the training, and the post-training deployment, of the machine-learning and artificial-intelligence process when compared to a training and deployment of the machine-learning and artificial-intelligence process across comparable clusters of CPUs capable of processing a single operation per clock cycle.

Referring back to FIG. 1A, each of source systems 102 may maintain, within corresponding tangible, non-transitory memories, a data repository that includes confidential data associated with the customers of the financial institution. For example, internal source system 102A may be associated with, or operated by, the financial institution, and may maintain, within the corresponding one or more tangible, non-transitory memories, a source data repository 103 that includes one or more elements of internal interaction data 104. In some instances, internal interaction data 104 may include data that identifies or characterizes one or more customers of the financial institution and interactions between these customers and the financial institution, and examples of the data include, but are not limited to, customer profile data 104A, account data 104B, and delinquency data 104C.

In some instances, customer profile data 104A may include a plurality of data records associated with, and characterizing, corresponding ones of the customers of the financial institution. By way of example, and for a particular customer of the financial institution, the data records of customer profile data 104A may include, but are not limited to, one or more unique customer identifiers (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., ages, occupations, marital status, etc.), and other data characterizing the relationship between the particular customer and the financial institution. Further, customer profile data 104A may also include, for the particular customer, multiple data records that include corresponding elements of temporal data (e.g., a time or date stamp, etc.), and the multiple data records may establish, for the particular customer, a temporal evolution in the customer residence or a temporal evolution in one or more of the demographic parameter values.

Account data 104B may also include a plurality of data records that identify and characterize one or more financial products or financial instruments issued by the financial institution to corresponding ones of the customers. For example, the data records of account data 104B may include, for each of the financial products issued to corresponding ones of the customers, one or more identifiers of the financial product or instrument (e.g., an account number, expiration data, card-security-code, etc.), one or more unique customer identifiers (e.g., an alphanumeric character string, such as a login credential, a customer name, etc.), and additional information characterizing a balance or current status of the financial product or instrument (e.g., payment due dates or amounts, delinquent accounts statuses, etc.).

Examples of these financial products or financial instruments may include, but are not limited to, one or more deposit accounts issued to corresponding ones of the customers (e.g., a savings account, a checking account, etc.), one or more brokerage or retirements accounts issued to corresponding ones of the customers by the financial institutions, and one or more secured credit products issued to corresponding ones of the customers by the financial institution (e.g., a home mortgage, a home-equity line-of-credit (HELOC), an auto loan, etc.). The financial products or financial instruments may also include one or more credit products issued to corresponding ones of the customers by the financial institution, and examples of these unsecured credit products may include, but are not limited to, a credit-card account or a line-of-credit. Further, and in addition to specifying the one or more identifiers of the unsecured credit products and the additional information characterizing the balance or current status of the unsecured credit products, the data records of account data 104B may also identify, for each of the unsecured credit products, one or more terms and conditions that include, but are not limited to, a credit limit (e.g., an amount of credit extended to the corresponding customer), a repayment schedule, an interest rate, or a penalty imposed upon the corresponding customer by the financial institution in response to a determined violation of the terms or conditions.

Further, delinquency data 104C may include data records that identify and characterize occurrences of default events involving customers of the financial institution and corresponding financial products or financial instruments issued by the financial institution, such as the credit-card accounts described herein. In some instances, an inability of a customer to satisfy obligations associated with the corresponding financial products or financial instruments, e.g., in accordance with the initial or modified terms and conditions, may result in, or may represent, an occurrence of a default event involving the customer. By way of example, and for a customer that holds a credit card account, a default event involving the customer and the credit-card account may occur when a past-due balance exceeds a predetermined threshold balance (e.g., $150, etc.) and is associated with a corresponding past-due interval (e.g., as defined by the number of scheduled payments missed, or delayed, by the customer) that exceeds a predetermined a threshold time period (e.g., sixty days, etc.). An occurrence of a default event can also be associated with an inability of the financial institution to recover all, or at least a portion of an outstanding balance associated with the credit-card account, and in some instances, a default event involving the customer and the credit-card account may occur when the customer is associated with, or declares, a personal bankruptcy, or when the financial institution writes down the past-due balance on the credit-card account (e.g., to cancel an unrecoverable or "bad" debt).

In some instances, each of the data records of delinquency data 104C may associated with a corresponding occurrence of a default event, and may include, for the corresponding occurrence of the default event, a unique identifier of a customer associated with or involved in the corresponding occurrence of the default event (e.g., an alphanumeric identifier or login credential, a customer name, etc.), temporal data characterizing of the corresponding occurrence of the default event (e.g., a time or date, etc.), information identifying one or more financial products or financial instruments associated with the corresponding occurrence of the default event (e.g., a portion of a tokenized account number for a credit-card account, etc.), and additionally, or alternatively, information characterizing the corresponding occurrence of the default event (e.g., an event type, such as the past-due balance on the credit-card account, the bankruptcy, or the write-down described herein, etc.).

The disclosed embodiments are, however, not limited to these exemplary elements of customer profile data 104A, account data 104B, or delinquency data 104C. In other instances, the data records of internal interaction data 104 may include any additional or alternate elements of data that identify and characterize the customers of the financial institution and their relationships or interactions with the financial institution, financial products issued to these customers by the financial institution, and any additional, or alternate, information characterizing prior occurrences of default events involving customer of the financial institution. Further, although stored in FIG. 1A within data repositories maintained by internal source system 102A, the exemplary elements of customer profile data 104A, account data 104B, and delinquency data 104C may be maintained by any additional or alternate computing system associated with the financial institution, including, but not limited to, within one or more tangible, non-transitory memories of FI computing system 130.

External source system 102B may be associated with, or operated by, one or more judicial, regulatory, governmental, or reporting entities external to, and unrelated to, the financial institution, and external source system 102B may maintain, within the corresponding one or more tangible, non-transitory memories, a source data repository 103 that includes one or more elements of external interaction data 108. In some instances, external source system 102B may be associated with, or operated by, a reporting entity, such as a credit bureau, and external interaction data 108 may include data records that specify elements of credit-bureau data 108A associated with one or more customers of the financial institution. In some instances, the elements of credit-bureau data 108A for a particular one of the customers of the financial institution may include, but are not limited to, a unique identifier of the particular customer (e.g., an alphanumeric identifier or login credential, a customer name, etc.), information identifying one or more financial products currently or previously held by the particular customer (e.g., one or more of the financial products or payment instruments described herein, financial products issued by other financial institutions, etc.), information identifying a history of payments associated with these financial products, information identifying negative events associated with the particular customer (e.g., missed payments, collections, repossessions, etc.), and information identifying one or more credit inquiries involving the particular customer (e.g., inquiries by the financial institution, other financial institutions or business entities, etc.). The disclosed embodiments are, however, not limited to these exemplary elements of external interaction data 108, and in other instances, external interaction data 108 may include any additional or alternate elements of data associated with the customer and generated by the judicial, regulatory, governmental, or regulatory entities described herein, such as additional, or alternate, elements of credit-bureau data.

Further, and as illustrated in FIG. 1A, transaction system 110 may also be associated with, or operated by, the financial institution, and may maintain, within the corresponding one or more tangible, non-transitory memories, a transaction data store 112 having one or more transaction data records 114 that maintain elements of transaction data identifying, and characterizing, purchase transactions initiated by, and involving, customers of the financial institution. Each of the purchase transactions may, for example, be initiated by a customer of the financial institution and involve a corresponding counterparty (e.g., a merchant, retailer, or other business, such as a restaurant, that offers products or services for sale), and may be funded by a corresponding one of the financial products or instruments held by that customer, such as, but not limited to, the credit products described herein. As illustrated in FIG. 1A, transaction data store 112 may include one or more elements of transaction data, such as transaction data records 114, and each of transaction data records 114 may be associated with, and may identify and characterize, a corresponding one of the purchase transactions.

In some instances, not illustrated in FIG. 1A, transaction system 110 may establish a secure, programmatic channel of communications across network 120 with one or more additional computing systems operating within environment 100, and may receive, via the secure programmatic channel of communications, portions of transaction data records 114 from the one or more of the additional computing systems in real-time data and on a continuous streaming basis, on in batch form in accordance with a predetermined temporal schedule (e.g., on a daily basis, a monthly basis, etc.). The one or more additional computing systems may, for example, be associated with a transaction processing network, such as, but not limited to, a payment rail that clears and settles purchase transactions funded via corresponding credit-card accounts. Further, in some instances, the one or more of the additional computing systems may be associated with real-time payment rail that processes and facilitates real-time payment (RTP) transactions between counterparties (e.g., via payment messages structured in accordance with an ISO-20022 messaging standard). Additionally, or alternatively, one or more of the additional computing systems may be associated with a mobile payment rail that processes certain peer-to-peer (P2P) transactions between the customers of the financial institutions and corresponding counterparties, or an automated clearing house (ACH) that also process and facilitate certain of the P2P transactions described herein, along with electronic funds transfer (EFT) transactions between the customers of the financial institutions and the corresponding counterparties.

Referring back to FIG. 1A, FI computing system 130 may perform operations that establish and maintain one or more centralized data repositories within corresponding ones of the tangible, non-transitory memories. For example, as illustrated in FIG. 1A, FI computing system 130 may establish an aggregated data store 132, which maintains, among other things, elements of the customer profile, account, transaction, delinquency, and credit-bureau data associated with one or more of the customers of the financial institution, which may be ingested by FI computing system 130 (e.g., from one or more of source systems 102 and/or from transaction system 110) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, including internal source system 102A and external source system 102B, across network 120, and may perform operations that access and obtain all, or a selected portion, of the elements of customer profile, account, delinquency, and/or reporting data maintained by corresponding ones of source systems 102. As illustrated in FIG. 1A, internal source system 102A may perform operations that obtain all, or a selected portion, of internal interaction data 104, including the data records of customer profile data 104A, account data 104B, and delinquency data 104C, from source data repository 103, and transmit the obtained portions of internal interaction data 104 across network 120 to FI computing system 130. Further, external source system 102B may also perform operations that obtain all, or a selected portion, of external interaction data 108, including the data records of credit-bureau data 108A, from external data repository 106, and transmit the obtained portions of external interaction data 108 across network 120 to FI computing system 130. In some instances, each of source systems 102, including internal source system 102A and external source system 102B, may perform operations that transmit respective portions of internal interaction data 104 and external interaction data 108 across network 120 to FI computing system 130 in batch form and in accordance with a predetermined temporal schedule (e.g., on a daily basis, on a monthly basis, etc.), or in real-time on a continuous, streaming basis.

A programmatic interface established and maintained by FI computing system 130, such as application programming interface (API) 134, may receive the portions of internal interaction data 104 (including the data records of customer profile data 104A, account data 104B, and delinquency data 104C) from internal source system 102A and the portions of external interaction data 108 (including the data records of credit-bureau data 108A) from external source system 102B. As illustrated in FIG. 1A, API 134 may route the portions of internal interaction data 104 (including the data records of customer profile data 104A, account data 104B, and delinquency data 104C) and external interaction data 108 (including the data records of credit-bureau data 108A) to a data ingestion engine 136 executed by the one or more processors of FI computing system 130. As described herein, the portions of internal interaction data 104 and external interaction data 108 (and the additional, or alternate, portions of the customer profile, account, delinquency, or reporting data) may be encrypted, and executed data ingestion engine 136 may perform operations that decrypt each of the encrypted portions of internal interaction data 104 and external interaction data 108 (and the additional, or alternate, portions of the customer profile, account, delinquency, or reporting data) using a corresponding decryption key, e.g., a private cryptographic key associated with FI computing system 130. Executed data ingestion engine 136 may also perform operations that store the portions of internal interaction data 104 (including the data records of customer profile data 104A, account data 1046, and delinquency data 104C) and external interaction data 108 (including the data records of credit-bureau data 108A) within aggregated data store 132, e.g., as ingested customer data 138.

In some instances, a pre-processing engine 140 executed by the one or more processors of FI computing system 130 may access ingested customer data 138, and perform any of the exemplary data pre-processing operations described herein to selectively aggregate, filter, and process portions of the elements of ingested customer data 138, and to generate consolidated data records 142 that characterize corresponding ones of the customers, their interactions with the financial institution and with other financial institutions, and any associated default events during a corresponding temporal interval associated with the ingestion of internal interaction data 104 and external interaction data 108 by executed data ingestion engine 136. By way of example, executed pre-processing engine 140 may access the data records of profile data 104A, account data 104B, delinquency data 104C, and in some instances, credit-bureau data 108A (e.g., as maintained within ingested customer data 138). As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. For instance, FI computing system 130 may assign a unique, alphanumeric customer identifier to each customer, and executed pre-processing engine 140 may perform operations that parse the accessed data records, obtain each of the parsed data records that identifies the corresponding customer using a customer name, and replace that customer name with the corresponding alphanumeric customer identifier.

Executed pre-processing engine 140 may also perform operations that assign a temporal identifier to each of the accessed data records, and that augment each of the accessed data records to include the newly assigned temporal identifier. In some instances, the temporal identifier may associate each of the accessed data records with a corresponding temporal interval, which may be indicative of reflect a regularity or a frequency at which FI computing system 130 ingests the elements of internal interaction data 104 and external interaction data 108 from corresponding ones of source systems 102. For example, executed data ingestion engine 136 may receive elements of confidential customer data from corresponding ones of source systems 102 on a monthly basis (e.g., on the final day of the month), and in particular, may receive and store the elements of internal interaction data 104 and external interaction data 108 from corresponding ones of source systems 102 on May 31, 2021. In some instances, executed pre-processing engine 140 may generate a temporal identifier associated with the regular, monthly ingestion of internal interaction data 104 and external interaction data 108 on May 31, 2021 (e.g., "2021-05-31"), and may augment the accessed data records of profile data 104A, account data 104B, delinquency data 104C and/or credit-bureau data 108A to include the generated temporal identifier. The disclosed embodiments are, however, not limited to temporal identifiers reflective of a regular, monthly ingestion of internal interaction data 104 and external interaction data 108 by FI computing system 130, and in other instances, executed pre-processing engine 140 may augment the accessed data records to include temporal identifiers reflective of any additional, or alternative, temporal interval during which FI computing system 130 ingests the elements of internal interaction data 104 and external interaction data 108.

In some instances, executed pre-processing engine 140 may perform further operations that, for a particular customer of the financial institution during the temporal interval (e.g., represented by a pair of the customer and temporal identifiers described herein), obtain one or more data records of profile data 104A, account data 104B, delinquency data 104C and/or credit-bureau data 108A that include the pair of customer and temporal identifiers. Executed pre-processing engine 140 may perform operations that consolidate the one or more obtained data records and generate a corresponding one of consolidated data records 142 that includes the customer identifier and temporal identifier, and that is associated with, and characterizes, the particular customer of the financial institution across the temporal intervals. By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.). Further, executed pre-processing engine 140 may perform any of the exemplary processes described herein to generate another one of consolidated data records 142 for each additional, or alternate, customer of the financial institution during the temporal interval (e.g., as represented by a corresponding customer identifier and the temporal interval).

Executed pre-processing engine 140 may perform operations that store each of consolidated data records 142 within the one or more tangible, non-transitory memories of FI computing system 130, such as within consolidated data store 144. Consolidated data store 144 may, for instance, correspond to a data lake, a data warehouse, or another centralized repository established and maintained, respectively, by the distributed components of FI computing system 130, e.g., through a Hadoop™ distributed file system (HDFS). In some instances, and as described herein, consolidated data records 142 may include a plurality of discrete data records, and each of these discrete data records may be associated with, and may maintain data characterizing, a corresponding one of the customers of the financial institution during the corresponding temporal interval (e.g., a month-long interval extending from May 1, 2021, to May 31, 2021). For example, and for a particular customer of the financial institution, discrete data record 142A of consolidated data records 142 may include a customer identifier 146 of the particular customer (e.g., an alphanumeric character string "CUSTID"), a temporal identifier 148 of the corresponding temporal interval (e.g., a numerical string "2021-05-31"), and consolidated data elements 150 of customer profile, account, delinquency, or credit-bureau data that characterize the particular customer during the corresponding temporal interval (e.g., as consolidated from the data records of profile data 104A, account data 104B, delinquency data 104C and/or credit-bureau data 108A ingested by FI computing system 130 on May 31, 2021).

Further, in some instances, consolidated data store 144 may maintain each of consolidated data records 142, which characterize corresponding ones of the customers, their interactions with the financial institution and with other financial institutions, and any associated default events during the temporal interval, in conjunction with additional consolidated data records 152. Executed pre-processing engine 140 may perform any of the exemplary processes described herein to generate each of the additional consolidated data records 152, including based on elements of profile, account, delinquency, and/or credit-bureau data ingested from source systems 102 during the corresponding prior temporal intervals.

Each of additional consolidated data records 152 may also include a plurality of discrete data records that are associated with and characterize a particular one of the customers of the financial institution during a corresponding one of the prior temporal intervals. For example, as illustrated in FIG. 1A, additional consolidated data records 152 may include one or more discrete data records, such as discrete data record 154, associated with a prior temporal interval extending from Apr. 1, 2021, to Apr. 30, 2021. For the particular customer, discrete data record 154 may include a customer identifier 156 of the particular customer (e.g., an alphanumeric character string "CUSTID"), a temporal identifier 158 of the prior temporal interval (e.g., a numerical string "2021-04-30"), and consolidated elements 160 of customer profile, account, delinquency, or credit-bureau data that characterize the particular customer during the prior temporal interval extending from Apr. 1, 2021, to Apr. 30, 2021 (e.g., as consolidated from the data records ingested by FI computing system 130 on Apr. 30, 2021).

The disclosed embodiments are, however, not limited to the exemplary consolidated data records described herein, or to the exemplary temporal intervals described herein. In other examples, FI computing system 130 may generate, and the consolidated data store 144 may maintain any additional or alternate number of discrete sets of consolidated data records, having any additional or alternate composition, that would be appropriate to the elements of customer profile, account, delinquency, or credit-bureau data ingested by FI computing system 130 at the predetermined intervals described herein. Further, in some examples, FI computing system 130 may ingest elements of customer profile, account, delinquency, or credit-bureau data from source systems 102 at any additional, or alternate, fixed or variable temporal interval that would be appropriate to the ingested data or to the adaptive training of the machine learning or artificial intelligence processes described herein, including a continuous, real-time ingestion of the elements of customer profile, account, delinquency, or credit-bureau data Referring to FIG. 1B, the one or more executed application programs, elements of code, or code modules may also cause FI computing system 130 to perform operations that, in conjunction with the corresponding communications interface, establish a secure, programmatic channel of communication with transaction system 110 across network 120, and may perform operations that access and obtain all, or a selected portion, of the transaction data records 114 maintained within transaction data store 112. For example, transaction system 110 may access transaction data store 112, and perform operations that transmit all, or a selected portion, of transaction data records 114 across network 120 to FI computing system 130. As described herein, the elements of transaction data maintained within transaction data records 114 may characterize patterns of customer purchases both in real-time and in a time-evolving manner across multiple temporal intervals, and transaction system 110 may perform operations that transmit portions of transaction data records 114 across network 120 to FI computing system 130 in real-time on a continuous streaming basis (e.g., upon receipt of corresponding ones of transaction data records 114 at transaction system 110) or in accordance with a predetermined temporal schedule (e.g., on an hourly basis, on a daily basis, on a monthly basis, etc.). Further, in some instances, and prior to transmission across network 120 to FI computing system 130, transaction system 110 may encrypt portions of transaction data records 114 using a corresponding encryption key, such as, but not limited to, a corresponding public cryptographic key associated with FI computing system 130.

In some instances, transaction data records 114 may include a plurality of discrete data records, each of which may identify and characterize a purchase transaction initiated by, and involving, a corresponding customer of the financial institution. Each of the purchase transactions may, for example, involve a corresponding counterparty (e.g., a merchant, retailer, or other business, such as a restaurant, that offers products or services for sale), and may be funded by a corresponding one of the financial products or instruments held by the corresponding customer, such as, but not limited to, the credit-card account described herein. By way of example, and as illustrated in FIG. 1B, the discrete data records of transaction data records 114 may include, but is not limited to, a data record 162 that identifies and characterizes a purchase transaction initiated by a particular customer at a first counterparty (e.g., a restaurant, such as "Jamie's Steak House") in May 30, 2021, and a data record 164 that identifies and characterizes a purchase transaction initiated by the particular customer at a second counterparty (e.g., an additional restaurant, such as "Josh's Burgers") on May 29, 2021. These disclosed embodiments are not limited to these exemplary purchase transactions or exemplary data records, and in other instances, transaction data records 114 may include any additional, or alternate, number of discrete, structured or unstructured data that identify and characterize any additional or alternate purchase transaction capable of initiation by the customer of the financial institution. Further, in some examples, transaction data records 114 may also identify and characterize other types of transaction initiated by, or involving, the customers of the financial institution, such as, but not limited to, electronic transfers of funds between customer accounts, bill-payment transactions, payroll deposits, or purchase or sales of securities.

By way of example, each of the discrete data records of transaction data records 114 may maintain, for a corresponding purchase transaction initiated by a corresponding one of the customers of the financial institution, information that identifies, among other things, the corresponding customer (e.g., an alphanumeric customer identifier), a transaction time or date (e.g., a time or date at which the corresponding customer initiated the corresponding purchase transaction), a counterparty to the corresponding transaction (e.g., a counterparty name, etc.), a financial product or instrument that funds the corresponding purchase transaction (e.g., a portion of a tokenized account number of a credit-card account, etc.), and one or more transaction parameters that characterize the corresponding purchase transaction. In some instances, the transaction parameters may include, but are not limited, to a transaction amount associated with the corresponding transaction, an identifier of one or more products or services involved in the purchase transaction (e.g., a product name, a universal product code (UPC), etc.), or additional information describing the counterparty, such as a counterparty location, a standard industrial classification (SIC) code, or a merchant classification code (MCC) associated with the counterparty.

As illustrated in FIG. 1B, and for the purchase transaction initiated by the particular customer at "Jamie's Steak House" on May 30, 2021, data record 162 may include a customer identifier 162A of the particular customer (e.g., an alphanumeric character string "CUSTID"), a temporal identifier 162B associated with the transaction date (e.g., a numerical string "2021-05-30"), a counterparty identifier 162C associated with the first counterparty to the purchase transaction (e.g., "Jamie's Steak House"), an identifier 162D of a financial product or instrument that funds the initiated purchase transaction (e.g., a portion of a tokenized account number of a credit-card account held by the particular customer, etc.), and a transaction amount 162E associated with the initiated purchase transaction (e.g., $145.75). Further, and for the purchase transaction initiated by the particular customer at "Josh's Burgers" on May 29, 2021, data record 164 may include a customer identifier 164A of the particular customer (e.g., an alphanumeric character string "CUSTID"), a temporal identifier 164B associated with the transaction date (e.g., a numerical string "2021-05-29"), a counterparty identifier 164C associated with the first counterparty to the purchase transaction (e.g., "Josh's Burgers"), an identifier 164D of a financial product or instrument that funds the initiated purchase transaction (e.g., a portion of a tokenized account number of the credit-card account, etc.), and a transaction amount 164E associated with the initiated purchase transaction (e.g., $145.75). In other examples, not illustrated in FIG. 1B, data records 162 and 164 (and additional, or alternate, ones of transaction data records 114) may maintain additional information characterizing respective ones of the first counterparty (e.g., "Jamie's Steak House") and the second counterparty (e.g., "Josh's Burgers"), such as, but not limited to, a counterparty location or a SIC or MCC code associated with respective ones of the first and second counterparties.

API 134 may receive the portions of transaction data records 114 from transaction system 110, and may route the portions of transaction data records 114 to executed data ingestion engine 136. As described herein, the portions of transaction data records 114 may be encrypted, and executed data ingestion engine 136 may perform operations that decrypt each of the encrypted portions of transaction data records 114 using the corresponding decryption key, e.g., the private cryptographic key associated with FI computing system 130. Executed data ingestion engine 136 may also perform operations that store the portions of transaction data records 114 within aggregated data store 132, e.g., as additional portions of ingested customer data 138.

In some instances, executed pre-processing engine 140 executed by the one or more processors of FI computing system 130 may access all, or a portion, of the discrete data records of transaction data records 114 (such as, but not limited to, discrete data records 162 and 164 described herein), and may perform any of the exemplary data preprocessing operations described herein to parse the accessed data records, obtain elements of transaction data characterizing corresponding ones of the initiated purchase transactions, and selectively aggregate, filter, and process the elements of transaction data, e.g., to generate elements of aggregated transaction data characterizing the purchasing or spending habits of corresponding customers of the financial institution across one, or more, temporal intervals. Further, executed pre-processing engine 140 may also perform any of the exemplary processes described herein to apply an adaptively trained, natural-language processing (NLP) model to selected portions of the elements of accessed and/or aggregated transaction data, and based on the application of the adaptively trained NLP model to the accessed or aggregated elements of transaction data, generate one elements of contextual data that not only characterize patterns in the purchasing or spending habits of one or more of the customers of the financial institution, but also identify and characterize, in real-time, changes in the purchasing or spending patents of these customers.

For example, executed pre-processing engine 140 may access each of transaction data records 114 (e.g., as maintained within ingested customer data 138), and obtain the customer identifier maintained within each of transaction data records 114 (e.g., customer identifier 162A of data record 162, customer identifier 164A of data record 164, etc.). As described herein, each of transaction data records 114 identify and characterize a particular purchase transaction involving a corresponding customer of the financial institution, and the accessed customer identifiers uniquely identify that corresponding customer at transaction system 110. In some instances, executed pre-processing engine 140 may perform any of the exemplary processes described herein to map each of accessed transaction data records 114, and the corresponding customer identifier obtained from each of accessed transaction data records 114, to a customer identifier assigned to the corresponding customer by FI computing system 130 (e.g., by replacing the customer identifier within one, or more, of accessed transaction data records 114 with the corresponding one of the assigned customer identifiers). The mapped data records of transaction data records 114 may, for example, include customer identifiers that are consistent in format and structure as those customer identifiers include within each of consolidated data records 142 and 152, described herein.

Further, in some instances, executed pre-processing engine 140 may also perform operations that apply one or more adaptively trained, natural-language processing (NLP) algorithms or models to selected portions of each of transaction data records 114, and based on the application of the adaptively trained, NLP algorithms or models to the selected portions of each of transaction data records 114, executed pre-processing engine 140 may generate one or more elements of contextual data that further characterizes the purchase transaction, and the corresponding counterparty, associated with each of transaction data records 114. The generated elements of contextual data may, for example, identify a counterparty type that characterizes each of the corresponding counterparties to the purchase transactions represented by transaction data records, and may assign each of the corresponding counterparties to one, or more, predetermined, type-specific counterparty categories indicative of, among other things, a relative cost products or services offered for sale by the corresponding counterparty (e.g., relative to other counterparties sharing a common counterparty type).

Through the generation of the elements of contextual data characterizing each of the purchase transaction represented by transaction data records 114, certain of the exemplary processes described herein may enable FI computing system 130 to detect real-time changes in the spending and purchase habits of customers across the counterparty types and the predetermined, type-specific counterparty categories. Further, FI computing system 130 may also perform any of the exemplary processes described herein to adaptively train a machine-learning or artificial-intelligence process to predict a likelihood of an occurrence of a default event involving a customer during a future temporal interval using training datasets and validation datasets that characterize these detected, real-time changes in the customer's spending and purchase habits during respective ones of a first prior temporal interval (e.g., a "training" interval) and a second, and distinct, prior temporal interval (e.g., an out-of-time "validation" interval).

Examples of these NLP algorithms or models may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more NLP algorithms or models may also include one or more artificial intelligence models, such as, but not limited to, an artificial neural network model, a recurrent neural network model, a Bayesian network model, or a Markov model. For instance, the artificial intelligence models may include, or may leverage, one or more Word2Vec models (such as, but not limited to, a skip-gram model or a continuous bag of words (CBOW) model) that, when applied to elements of transaction data maintained within each of transaction data records 114 (e.g., the counterparty name, counterparty location, etc.), derives relations between the counterpart name, the counterparty location, or other elements of transaction data and corresponding ones of the counterparty types or the type-specific counterparty categories. Certain of these exemplary NLP algorithms or models (e.g., the machine-learning processes or artificial intelligence models described herein) can be trained against, and adaptively improved using, training data having a specified composition, which may be extracted from portions of aggregated data store 132 or consolidated data store 144, and can be deemed successfully trained and ready for deployment when a model accuracy (e.g., as established based on a comparison with the outcome data) exceeds a threshold value.

Referring back to FIG. 1B, an NLP module 166 of executed pre-processing engine 140 may access one or more elements of NLP modelling data 166A, which includes one or more model coefficients, parameters, thresholds, and other elements of modelling data that collectively specify the adaptively trained NLP algorithm or model. In some instances, the accessed elements of NLP modelling data 166A may identify a composition of NLP input data that, when ingested by the adaptively trained NLP algorithm or model in accordance with the one or more elements of NLP modelling data 166A, enable executed NLP module 166 to generate, for each of the purchase transactions associated with transaction data records 114, elements of contextual data that predict the counterparty type that characterizes the corresponding counterparty and that assign the corresponding counterparty to one of the predetermined, type-specific counterparty categories.

For example, the counterparty type may correspond to a restaurant (e.g., associated with SIC code 5812, etc.) and the predetermined, type-specific counterparty categories may include, but are not limited to, fine dining, casual dining, fast-casual, and fast food. In other examples, the counterparty type may correspond to an apparel store (e.g., associated with SIC code 56), and the predetermined, type-specific counterparty categories may include, but are not limited to, luxury boutiques, specialty retailers, department stores, discount stores, and thrift stores. The disclosed embodiments are, however, not limited to these exemplary counterparty types or type-specific counterparty categories, and in other instances, NLP modelling data 166A may enable the adaptively trained NLP algorithm or model to predict any additional, or alternate, counterparty type, and any additional, or alternate, ones of the type-specific counterparty categories, that would be appropriate to the purchase transactions and to the elements of transaction data maintained within transaction data records 114.

In some instances, and based on the one or more elements of NLP modelling data 166A, executed NLP module 166 may perform operations that access each of the discrete data records of transactions data records 114 (e.g., as maintained within ingested customer data 138), and extract, from each of the accessed data records, one or more elements of input data consistent with the one or more elements of NLP modelling data 166A. The elements of input data extracted from each of the discrete data records may, for example, include a counterparty identifier (e.g., the counterparty name) and in some instances, additional data characterizing the corresponding purchase transaction or the corresponding counterparty, such as a name of a product or service involving in the corresponding purchase transaction or a location of the corresponding counterparty. Executed NLP module 166 may perform operations (consistent with NLP modelling data 166A) that apply the adaptively trained NLP algorithm or model to each of the extracted or obtained sets of input data, and based on the application of the adaptively trained NLP algorithm or model to the extracted or obtained sets of input data, generate elements of contextual data 167 that characterize each of the purchase transactions represented by transaction data records 114. Executed NLP module 166 may store each of the elements of contextual data 167 within a portion of aggregated data store 132, e.g., in association with corresponding ones of transaction data records 114.

For example, executed NLP module 166 may access data record 162 of transaction data records 114 (that identifies and characterizes the purchase transaction initiated at "Jamie's Steak House" on May 30, 2021), and obtain, among other things, counterparty identifier 162C (e.g., the name "Jamie's Steak House"). Although not illustrated in FIG. 1B, executed NLP module 166 may extract additional or alternate information from data record 162 that characterizes the purchase transaction or the counterparty, such as a counterparty location (e.g., in the Georgetown neighborhood of Washington, D.C.) or an identifier of a product or service associated with the purchase transactions (e.g., an identifier of purchased steak and seafood). Executed NLP module 166 may perform operations that, in accordance with NLP modelling data 166A, apply the adaptively trained NLP algorithm or model to input data that includes each individual word (or linguistic unit) within the counterparty name (e.g., "Jamie's," "Steak," and "House"), either alone or in conjunction with additional words (or linguistic units) extracted from data record 162 (e.g., "Georgetown," "Washington," "steak," or "seafood," etc.). Based the application of the adaptively trained NLP algorithm or model to the input data, executed NLP module 166 may generate an element 168 of contextual data 167 that, among other things, specifies that "Jamie's Steak House" corresponds to a restaurant, and assigns "Jamie's Steak House" to one of the predetermined, restaurant-specific counterparty categories described herein, such as fine dining. Element 168 may, for example, include alphanumeric, or numeric, character strings representative of the predicted counterparty type (e.g., restaurant) and the assigned one of the predetermined, type-specific counterparty categories (e.g., fine dining), and executed NLP module 166 may perform operations that associate element 168 with data record 162, and that store element 168 within a corresponding portion of aggregated data store 132, e.g., in conjunction with data record 162.

Further, executed NLP module 166 may also access data record 164 of transaction data records 114 (that identifies and characterizes the purchase transaction initiated at "Josh's Burgers" on May 29, 2021), and obtain, among other things, counterparty identifier 164C (e.g., the name "Josh's Burgers"). Although not illustrated in FIG. 1B, executed NLP module 166 may extract additional or alternate information from data record 162 that characterizes the purchase transaction or the counterparty, such as a counterparty location (e.g., in the waterfront neighborhood of Washington, D.C.) or an identifier of a product or service associated with the purchase transactions (e.g., an identifier of purchased cheeseburger and onion rings). Executed NLP module 166 may perform operations that, in accordance with NLP modelling data 166A, apply the adaptively trained NLP algorithm or model to input data that includes each individual word (or linguistic unit) within the counterparty name (e.g., "Josh's" and "Burgers"), either alone or in conjunction with additional words (or linguistic units) extracted from data record 164 (e.g., "waterfront," "Washington," "cheeseburgers," "onion," or "rings," etc.). Based the application of the adaptively trained NLP algorithm or model to the input data, executed NLP module 166 may generate an element 170 of contextual data 167 that, among other things, specifies that "Josh's Burgers" corresponds to a restaurant, and assigns "Josh's Burgers" to one of the predetermined, restaurant-specific counterparty categories described herein, such as fast food. Element 170 may, for example, include alphanumeric, or numeric, character strings representative of the predicted counterparty type (e.g., restaurant) and the assigned one of the predetermined, type-specific counterparty categories (e.g., fast food), and executed NLP module 166 may perform operations that associate element 170 with data record 164, and that store element 170 within a corresponding portion of aggregated data store 132, e.g., in conjunction with data record 164.

Although not illustrated in FIG. 1B, executed NLP module 166 may perform any of the exemplary processes described herein to access each of the additional, or alternate, data records of transaction data records 114, generate a corresponding set of input data, and based on the application the adaptively trained NLP algorithm or model to the set of input data, generate further elements of contextual data include the predicted counterparty type, and the assigned one of predetermined, type-specific counterparty categories, for each of the purchase transactions represented by the additional, or alternate, data records of transaction data records 114. Further, in some instances, the distributed computing components of FI computing system 130 (e.g., that include one or more GPUs or TPUs configured to operate as a discrete computing cluster) may perform any of the exemplary processes described herein to executed NLP module 166 and apply the adaptively trained NLP algorithm or model to the extracted or obtained sets of input data in parallel through an implementation of one or more of the parallelized, fault-tolerant distributed computing and analytical processes described herein.

In some instances, an aggregation module 171 of executed pre-processing engine 140 may parse each of the discrete data records of transaction data records 114 (e.g., discrete data records 162 and 164) to obtain the corresponding customer identifier, which identifies the customer that initiated the corresponding one of the purchase transactions, and to obtain the corresponding temporal identifier, which specifies the transaction date or time associated with the corresponding purchase transaction. Based on the obtained customer identifiers, executed aggregation module 171 may perform operations that generate customer-specific sets of transaction data records 114 and associated elements of contextual data 167 that are associated with corresponding ones of the customers of the financial institution. Further, executed aggregation module 171 may perform additional operations that, for each of customer-specific sets of transaction data records 114 and the associated elements of contextual data 167, sort the data records and associated elements based on corresponding ones of the temporal identifiers, e.g., to sort the data records and associated elements within each of the customer-specific sets, and the corresponding purchase transactions, in accordance with the transaction date or time). Through these exemplary processes, executed aggregation module 171 may generate customer-specific sets of temporally-ordered data records and associated elements of contextual data 167 (e.g., data tables), which executed pre-processing engine 140 may maintain locally within the aggregated data store 132 (not illustrated in FIG. 1B).

Executed aggregation module 171 may also perform operations that access each of the discrete data records of consolidated data records 142, and extract a customer identifier of a corresponding customer of the financial institution and a temporal identifier of a temporal interval associated with the corresponding one of consolidated data records 142. In some instances, and based on the pair of customer and temporal identifiers extracted from each the discrete data records of consolidated data records 142, executed aggregation module 171 may perform operations that access, within aggregated data store 132, a corresponding one of the customer-specific sets of transaction data records 114 and the associated elements of contextual data 167 that include, or reference, the customer identifier, and that obtain a subset of the data records within the corresponding one of the customer-specific set of transaction data records 114 and the associated elements of contextual data 167 that characterize purchase transactions initiated within the temporal interval associated with the temporal identifier. Executed aggregation module 171 may perform operations that store each of the extracted subsets of data records within a portion of consolidated data store 144, e.g., in conjunction with corresponding ones of consolidated data records 142.

By way of example, as illustrated in FIG. 1B, executed aggregation module 171 may access data record 142A within consolidated data store 144, which includes customer identifier 146 (e.g., "CUSTID") and temporal identifier 148 (e.g., "2021-05-31"), which identifies a one-month temporal interval ranging from May 1, 2021, to May 31, 2021. In some instances, executed aggregation module 171 may access transaction data records 114, and identify the customer-specific set of transaction data records 114, which includes one or more discrete data records that maintain customer identifier 146 (e.g., "CUSTID"). Executed aggregation module 171 may further parse the customer-specific set of transaction data records 114 and identify one or more discrete data records associated with purchase transactions initiated by corresponding ones of the customers of the financial institution during the temporal interval associated with temporal identifier 148, e.g., one-month temporal interval ranging from May 1, 2021, to May 31, 2021. For instance, and based on respective ones of temporal identifiers 162B and 164B, executed pre-processing engine 140 may determine that data records 162 and 164 are each associated with, and represent, purchase transactions initiated between May 1, 2021, to May 31, 2021, and executed aggregation module 171 may perform operations that package data records 162 and 164, either alone or in conjunction with other appropriate ones of transaction data records 114, into a portions of a record subset 172, which executed pre-processing engine 140 may store within a portion of consolidated data store 144, e.g., as a portion of consolidated data record 142A. Executed aggregation module 171 may also perform any of the exemplary processes described herein to identify, extract, and store a subset of transaction data records associated with pair of customer and transaction identifiers maintained within each additional, or alternate consolidated data record within consolidated data store 144, such as, but not limited to, record subset 173 associated with customer identifier 156 and temporal identifier 158 maintained within discrete data record 154.

Further, in some instances, executed aggregation module 171 may perform operations that access the customer- and temporal-interval-specific subset of transaction data records 114 associated with each of the consolidated data records maintained within consolidated data store 144. For example, as illustrated in FIG. 1B, executed aggregation module 171 may access record subset 172 associated with consolidated data record 142A, and as described herein, record subset 172 may include one or more of transaction data records 114 that characterize purchase transactions initiated by the customer associated with customer identifier 146 (e.g., "CUSTID") during the temporal interval associated with temporal identifier 148 (e.g., May 1, 2021, through May 31, 2021). Executed aggregation module 171 may generate or compute one or more elements of aggregated transaction data 174, which may characterize the spending or purchasing habits of the customer associated with customer identifier 146 during the one-month interval from May 1, 2021, to May 31, 2021.

By way of example, the elements of aggregated transaction data 174 may include, but are not limited to, a total transaction amount of all purchase transactions initiated by the customer during the one-month interval (e.g., a sum of transaction amount 162E maintained within data record 162 ($145.75), transaction amount 164E of data record 164 ($15.75), and a transaction amount maintained within each additional, or alternate, data record within record subset 172), or a total number of purchase transactions initiated by the corresponding customer during the temporal interval (e.g., a transaction velocity). In other examples, one or more of the elements of aggregated transaction data 174 may be specific to a particular financial product or payment instrument held by the customer associated with customer identifier 146, such as the credit-card account held by the customer and associated with respect ones of identifiers 162D and 164D of data records 162 and 164. For example, to generate the product- or payment-instrument-specific elements of aggregated transaction data 174, executed aggregation module 171 may obtain a transaction amount from each data record of record subset 172 that includes an identifier of the particular financial product or payment instrument, such as the credit-card account described herein, and compute a sum of the obtained transaction amounts, which may be stored within aggregated transaction data 174.

In other instances, one or more of the elements of aggregated transaction data may be specific to a particular counterparty (e.g., "Jamie's Steak House," as indicated by counterparty identifier 162C of data record 162, "Josh's Burgers," as indicated by counterparty identifier 164C of data record 164, etc.), or to a particular counterparty type (e.g., as indicated within the elements of contextual data 168 and 170 associated with respective ones of data records 162 and 164). By way of example, executed aggregation module 171 may perform any of the exemplary processes described herein to determine that one of more of the data records of record subset 172 include counterparty identifier associated with a particular counterparty (e.g., "Jamie's Steak House," as indicated by counterparty identifier 162C of data record 162), and to process the one or more data records to generate a total transaction amount, or a total number, of the purchase transactions that are initiated by the customer between May 1, 2021, and May 31, 2021, and that involve the particular counterparty. Further, in some examples, aggregation module 171 may also determine that additional ones of the data records of record subset 172 are associated with elements of contextual data that specify a particular counterparty type (e.g., restaurants, as specified by the elements of contextual data 168 and 170), and to process the additional data records to generate a total transaction amount, or a total number, of the purchase transactions that are initiated by the customer between May 1, 2021, and May 31, 2021, and that involve the counterparties associated with the particular counterparty type.

Further, in some examples, one or more of the elements of aggregated transaction data 174 may characterize transactions involving counterparties assigned to one, or more, of the predetermined, type-specific counterparty categories described herein (e.g., as assigned based on the application of the adaptively trained NLP algorithm or process to portions of transaction data records 114). For example, and as described herein, the "restaurant" counterparty type may be associated with predetermined, type-specific counterparty categories that include, but are not limited to, fine dining, casual dining, fast-casual, and fast food. Based on the elements of contextual data associated with each of the data records of record subset 172 (such as, but not limited to, the elements of contextual data 168 and 170 associated with respective ones of data records 162 and 164), executed aggregation module 171 may identify those data records of record subset 172 that are associated with purchase transactions involving counterparties assigned to each of the predetermined, type-specific counterparty categories of the "restaurant" counterparty type, and may perform any of the exemplary processes described herein to generate total transaction amounts associated with, or total numbers of, the purchase transactions that are initiated by the customer between May 1, 2021, and May 31, 2021, and that involve the restaurants assigned to corresponding ones of the fine dining, casual dining, fast-casual, and fast food categories.

As illustrated in FIG. 1B, executed aggregation module 171 may perform operations that store the elements of aggregated transaction data 174 within a corresponding portion of consolidated data store 144, e.g., within a portion of consolidated data record 142A. Executed aggregation module 171 may also perform any of the exemplary processes described herein to generate additional, or alternate, elements of aggregated transaction data based on the subsets of transaction data records 114 maintained within each additional, or alternate consolidated data record within consolidated data store 144, such as, but not limited to, elements of aggregated transaction data 175 associated with record subset 173. Furthermore, the disclosed embodiments are not limited to the exemplary elements of aggregated transaction data described herein, and in other examples, executed aggregation module 171 may generate any additional or alternate element of aggregated transaction data that characterizes the spending or purchasing behavior of the customers of the financial institution during the temporal intervals associated with each of the consolidated data records maintained within consolidated data store 144.

In some instances, FI computing system 130 may perform operations that adaptively train a machine-learning or artificial-intelligence process to predict a likelihood of an occurrence of a default event involving one or more customers of the financial institution during a future temporal interval using training datasets associated with a first prior temporal interval (e.g., a "training" interval), and using validation datasets associated with a second, and distinct, prior temporal interval (e.g., an out-of-time "validation" interval). As described herein, the machine-learning or artificial-intelligence process may include an ensemble or decision-tree process, such as a gradient-boosted decision-tree process (e.g., the XGBoost model), and the training and validation datasets may include, but are not limited to, values of adaptively selected features obtained, extracted, or derived from the consolidated data records maintained within consolidated data store 144, e.g., from data elements maintained within the discrete data records of consolidated data records 142 or the additional consolidated data records 152.

By way of example, the values of adaptively selected features of the training and validation datasets may be obtained, extracted, or derived from the consolidated elements of customer profile data, account data, and in some instances, credit-bureau data maintained within the consolidated data records of consolidated data store 144. The adaptive selected feature values may also include one, or more, of the elements of aggregated transaction data that characterize the customers of the financial institution during respective ones of the training and validation intervals and further, in some examples, additional or alternate feature values that characterize real-time changes in the aggregated transaction data, and as such, real-time patterns of customer spending and purchasing, during each of the training and validation intervals. These additional, or alternate, feature values may characterize the changes in the aggregate transaction data, and the real-time patterns of customer spending and purchasing, across consecutive temporal intervals (e.g., a month-over-month basis, a week-over-week basis, a day-over-day basis), or may characterize seasonal variations in the real-time patterns of customer spending and purchasing. Through the incorporation of feature values characterizing the current spending and purchasing behaviors of the customer, and real-time changes in the patterns of customer spending and purchase, certain of the exemplary processes described herein enable FI computing system 130 to adaptively train machine-learning or artificial-intelligence process using training and validation datasets that characterize a current status of, and changes in, the customers' lifestyles (e.g., eating, dressing, living, transportation, travel, etc.), which may be indicative of the customers' risk of default across multiple and varied economic conditions.

For example, the distributed computing components of FI computing system 130 (e.g., that include one or more GPUs or TPUs configured to operate as a discrete computing cluster) may perform any of the exemplary processes described herein to adaptively train the machine learning or artificial intelligence process (e.g., the gradient-boosted, decision-tree process) in parallel through an implementation of one or more parallelized, fault-tolerant distributed computing and analytical processes. Based on an outcome of these adaptive training processes, FI computing system 130 may generate model coefficients, parameters, thresholds, and other modelling data that collectively specify the trained machine learning or artificial intelligence process, and may store the generated model coefficients, parameters, thresholds, and modelling data within a portion of the one or more tangible, non-transitory memories, e.g., within consolidated data store 144.

Referring to FIG. 1C, a training engine 176 executed by the one or more processors of FI computing system 130 may access the consolidated data records maintained within consolidated data store 144, such as, but not limited to, the discrete data records of consolidated data records 142 or additional consolidated data records 152. As described herein, each of the consolidated data records, such as discrete data record 142A of consolidated data records 142 or discrete data record 154 of additional consolidated data records 152, may include a customer identifier of a corresponding one of the customers of the financial institution (e.g., customer identifiers 146 and 156 of FIG. 1A) and a temporal identifier that associates the consolidated data record with a corresponding temporal interval (e.g., temporal identifiers 148 and 158 of FIG. 1A). Each of the accessed consolidated data records may also include consolidated elements of customer profile, account, delinquency, or credit-bureau data that characterize the corresponding one of the customers during the corresponding temporal interval (e.g., consolidated data elements 150 and 160 of FIGS. 1A and 1B).

Further, as described herein, each of the accessed consolidated data records may also include: (i) one or more transaction data records that characterize purchase transactions initiated by the corresponding one of the customers during the temporal interval along with one or more associated elements of contextual data characterizing the purchase transactions or the involved counterparties (e.g., as maintained within record subsets 172 and 173 of FIG. 1B); and (ii) one or more elements of aggregated transaction data that characterize the purchasing or spending habits of the corresponding one of the customers during the temporal interval (e.g., as maintained within elements of aggregated transaction data 174 and 175 of FIG. 1B). For example, each of the purchase transactions may be associated with a corresponding counterparty, and as described herein, the elements of contextual data associated with each of the purchase transactions (and with each of the transaction data records) may associate a predicted counterparty type with the corresponding counterparty (e.g., restaurant, etc.) and may identify one, or more, of the predetermined, type-specific counterparty categories assigned to the counterparty (e.g., fine dining, casual fining, fast-casual, or fast food for the restaurant counterparty type). The predetermined, type-specific counterparty categories assigned to each of the corresponding counterparties may be indicative of, among other things, a relative cost products or services offered for sale by the corresponding counterparties (e.g., relative to other counterparties sharing a common counterparty type), and FI computing system 130 may perform any of the exemplary processes described herein to predict the counterparty type for each of the corresponding counterparties, and to assign the corresponding one of the predetermined, type-specific counterparty categories to the predicted counterparty type, based on an application of an adaptively trained NLP algorithm or process to input data associated with the corresponding counterparty or purchase transaction (e.g., portions of a counterparty name, etc.)

Figure 1D:
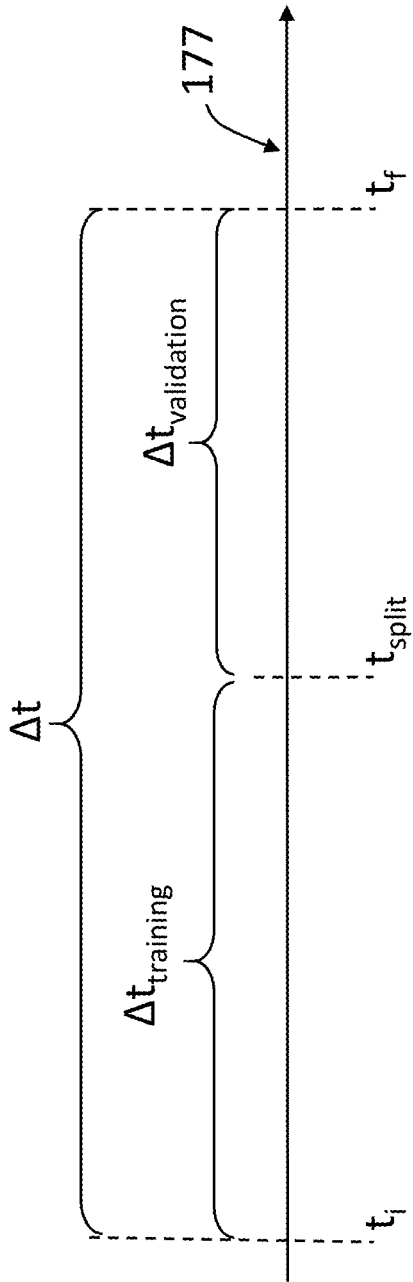
FIGS. 1D and 1E are diagrams of exemplary timelines for adaptively training a machine-learning or artificial intelligence process, in accordance with some exemplary embodiments.

In some instances, executed training engine 176 may parse the accessed consolidated data records, and based on corresponding ones of the temporal identifiers, determine that the consolidated elements of customer profile, account, delinquency, credit-bureau data, and/or transaction data characterize the corresponding customers across a range of prior temporal intervals. Further, executed training engine 176 may also perform operations that decompose the determined range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1D, the range of prior temporal intervals (e.g., shown generally as $\Delta t$ along timeline 177 of FIG. 1D) may be bounded by, and established by, temporal boundaries $t_i$ and $t_f$. Further, the decomposed first subset of the prior temporal intervals (e.g., shown generally as training interval $\Delta t_{training}$ along timeline 177 of FIG. 1D) may be bounded by temporal boundary $t_i$ and a corresponding splitting point $t_{split}$ along timeline 177, and the decomposed second subset of the prior temporal intervals (e.g., shown generally as validation interval $\Delta t_{validation}$ along timeline 177 of FIG. 1D) may be bounded by splitting point $t_{split}$ and temporal boundary $t_f$.

Referring back to FIG. 1C, executed training engine 176 may generate elements of splitting data 178 that identify and characterize the determined temporal boundaries of the consolidated data records maintained within consolidated data store 144 (e.g., temporal boundaries $t_i$ and $t_f$) and the range of prior temporal intervals established by the determined temporal boundaries Further, the elements of splitting data 178 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein). As illustrated in FIG. 1C, executed training engine 176 may store the elements of splitting data 178 within the one or more tangible, non-transitory memories of FI computing system 130, e.g., within consolidated data store 144.

In some instances, each of the prior temporal intervals may correspond to a one-month interval, and executed training engine 176 may perform operations that establish adaptively the splitting point between the corresponding temporal boundaries such that a predetermined first percentage of the consolidated data records are associated with temporal intervals (e.g., as specified by corresponding ones of the temporal identifiers) disposed within the training interval, and such that a predetermined second percentage of the consolidated data records are associated with temporal intervals (e.g., as specified by corresponding ones of the temporal identifiers) disposed within the validation interval. For example, the first predetermined percentage may correspond to seventy percent of the consolidated data records, and the second predetermined percentage may corresponding to thirty percent of the consolidated data records, although in other examples, executed training engine 176 may compute one or both of the first and second predetermined percentages, and establish the decomposition point, based on the range of prior temporal intervals, a quantity or quality of the consolidated data records maintained within consolidated data store 144, or a magnitude of the temporal intervals (e.g., one-month intervals, two-week intervals, one-week intervals, one-day intervals, etc.).

In some examples, a training input module 180 of executed training engine 176 may perform operations that access the consolidated data records maintained within consolidated data store 144. Based on portions of splitting data 178, executed training input module 180 may perform operations that parse the consolidated data records and determine: (i) a first subset 182A of these consolidated data records are associated with the training interval $\Delta t_{training}$ and may be appropriate to training adaptively the gradient-boosted decision model during the training interval; and a (ii) second subset 182B of these consolidated data records are associated with the validation interval $\Delta t_{validation}$ and may be appropriate to validating the adaptively trained gradient-boosted decision model during the validation interval.

Figure 1E:
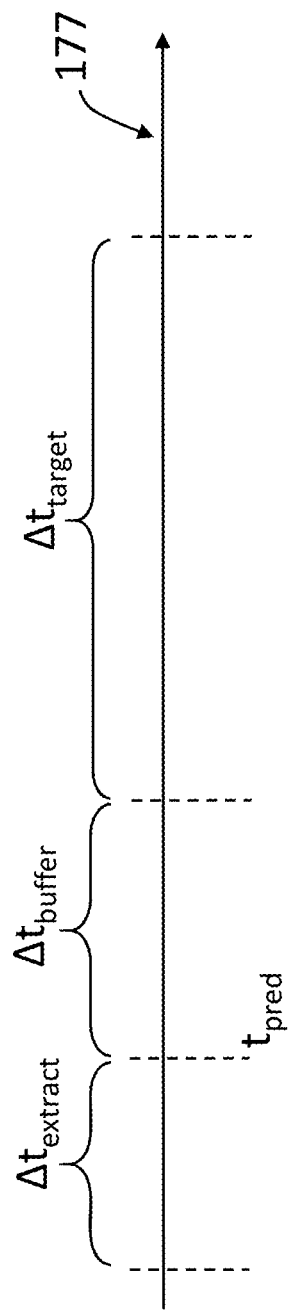

As described herein, FI computing system 130 may perform operations that adaptively train a machine-learning or artificial-intelligence process (e.g., the gradient-boosted, decision-tree process described herein) to predict, during a current temporal interval, a likelihood of an occurrence of a default event involving a customer during a future temporal interval using training datasets associated with the training interval, and using validation datasets associated with the validation interval. For example, and as illustrated in FIG. 1E, the current temporal interval may be characterized by a temporal prediction point $t_{pred}$ along timeline 177, and the executed training engine 176 may perform any of the exemplary processes described herein to train adaptively machine-learning or artificial-intelligence process (e.g., the gradient-boosted, decision-tree process described herein) to predict the likelihood of occurrences of default events during a future, target temporal interval $\Delta t_{target}$ based on input datasets associated with a corresponding prior extraction interval $\Delta t_{extract}$. Further, as illustrated in FIG. 1E, the target temporal interval $\Delta t_{target}$ may be separated temporally from the temporal prediction point $t_{pred}$ by a corresponding buffer interval $\Delta t_{buffer}$.

The target temporal interval $\Delta t_{target}$ may be characterized by a predetermined duration, such as, but not limited to, three months, and the prior extraction interval $\Delta t_{extract}$ may be characterized by a corresponding, predetermined duration, such as, but not limited to, one month. Further, in some examples, the buffer interval $\Delta t_{buffer}$ may also be associated with a predetermined duration, such as, but not limited to, three months, and the predetermined duration of buffer interval $\Delta t_{buffer}$ may established by FI computing system 130 to separate temporally the customers' prior interactions with the financial institution (and with other financial institutions) from the future target temporal interval $\Delta t_{target}$.

Referring back to FIG. 1C, executed training input module 180 may perform operations that access the consolidated data records maintained within consolidated data store 144, and parse each of the consolidated data records to obtain a corresponding customer identifier (e.g., which associates with the consolidated data record with a corresponding one of the customers of the financial institution) and a corresponding temporal identifier (e.g., which associated the consolidated data record with a corresponding temporal interval). For example, and based on the obtained customer and temporal identifiers, executed training input module 180 may generate sets of segmented data records associated with corresponding ones of the customer identifiers (e.g., customer-specific sets of segmented data records), and within each set of segmented data records, executed training input module 180 may order the consolidated data records sequentially in accordance with the obtained temporal interval. Through these exemplary processes, executed training input module 180 may generate sets of customer-specific, sequentially ordered data records (e.g., data tables), which executed training input module 180 may maintain locally within the consolidated data store 144 (not illustrated in FIG. 1C).

Executed training input module 180 may also perform operations that augment the sequentially ordered data records within each of the customer-specific sets to include additional information characterizing a ground truth associated with the corresponding customer and temporal interval (as established by the corresponding pair of customer and temporal identifiers). For example, and for a particular one of the sequentially ordered data record, such as discrete data record 142A of consolidated data records 142, executed training input module 180 may obtain customer identifier 146 (e.g., "CUSTID"), which identifies the corresponding customer, and temporal identifier 148, which indicates data record 142A is associated with May 31, 2021. Based on customer identifier 146 and temporal identifier 148, executed training input module 180 may access delinquency data 104C (e.g., as maintained within aggregated data store 132 of FIG. 1A), and determine whether the corresponding customer experienced a default data within the target interval $\Delta t_{target}$, which may be separated from the temporal interval associated with the data record 142A by the corresponding buffer interval $\Delta t_{buffer}$, as described herein. Executed training input module 180 may perform operations that modify data record 142A by appending an element of ground-truth data indicative of the presence or absence of the default event within the target interval $\Delta t_{target}$ to consolidated data elements 150. Executed training input module 180 may also perform any of the exemplary processes described herein to generate and append an appropriate element of ground-truth data to each additional, or alternate, one of the sequentially ordered data records within each of the customer-specific sets maintained within consolidated data store 144.

Executed training input module 180 may also perform operations that partition the customer-specific sets of sequentially ordered data records into subsets suitable for training adaptively the gradient-boosted, decision-tree process (e.g., which may be maintained in first subset 182A of consolidated data records within consolidated data store 144) and for validating the adaptively trained, gradient-boosted, decision-tree process (e.g., which may be maintained in second subset 182B of consolidated data records within consolidated data store 144). By way of example, executed training input module 180 may access splitting data 178, and establish the temporal boundaries for the training interval $\Delta t_{training}$ (e.g., temporal boundary $t_i$ and splitting point $t_{split}$) and the validation interval $\Delta t_{training}$ (e.g., splitting point twit and temporal boundary $t_f$). Further, executed training input module 180 may also parse each of the sequentially ordered data records of the customer-specific sets, access the corresponding temporal identifier, and determine the temporal interval associated with the each of sequentially ordered data records.

If, for example, executed training input module 180 were to determine that the temporal interval associated with a corresponding one of the sequentially ordered data records is disposed within the temporal boundaries for the training interval $\Delta_{training}$, executed training input module 180 may determine that the corresponding data record may be suitable for training, and may perform operations that include the corresponding data record within a portion of the first subset 182A (e.g., that store the corresponding data record within a portion of consolidated data store 144 associated with first subset 182A). Alternatively, if executed training input module 180 were to determine that the temporal interval associated with a corresponding one of the sequentially ordered data records is disposed within the temporal boundaries for the validation interval $\Delta t_{validation}$, executed training input module 180 may determine that the corresponding data record may be suitable for validation, and may perform operations that include the corresponding data record within a portion of the second subset 182B (e.g., that store the corresponding data record within a portion of consolidated data store 144 associated with second subset 182B). Executed training input module 180 may perform any of the exemplary processes described herein to determine the suitability of each additional, or alternate, one of the sequentially ordered data records of the customer-specific sets for adaptive training, or alternatively, validation, of the gradient-boosted, decision-tree process.

In some instances, executed training input module 180 may also perform operations that filter the consolidated data records of first subset 182A and second subset 182B in accordance with one or more filtration criteria. By way of example, the one or more filtration criteria may cause executed training input module 180 to perform operations that exclude, from first subset 182A and second subset 182B, a consolidated data record of any customer associated with an occurrence of a default event during, or prior to, the temporal interval associated with the corresponding temporal identifier. Further, in some instances, the consolidated data records within first subset 182A and second subset 182B may represent an imbalanced data set in which the actual occurrences of default events within the target interval $\Delta t_{target}$ are outnumbered disproportionately by non-occurrences of default events within the target interval $\Delta t_{target}$ (e.g., as established by the elements of ground-truth data appended for the consolidated data records, as described herein). Based on the imbalanced character of first subset 182A and second subset 182B, executed training input module 180 may perform operations that downsample the consolidated data records within first subset 182A and second subset 182B that are associated not associated with the actual occurrences of the default events (e.g., as established by the appended elements of ground-truth data), and the downsampled data records maintained within each first subset 182A and second subset 182B may represent balanced data sets characterized by a more proportionate balance between the actual occurrences and actual non-occurrences of the default events.

Referring back to FIG. 1C, executed training input module 180 may perform operations that generate a plurality of training datasets 184 based on elements of data obtained, extracted, or derived from all or a selected portion of first subset 182A of the consolidated data records. In some instances, the plurality of training datasets 184 may, when provisioned to an input layer of the gradient-boosted decision-tree process described herein, enable executed training engine 176 to train adaptively the gradient-boosted decision-tree process to predict, during a current temporal interval, a likelihood of occurrences of default events involving customers of the financial institution during a future temporal interval.

By way of example, each of the plurality of training datasets 184 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of training datasets 184 may also include elements of data (e.g., feature values) that characterize the corresponding one of the customers, the corresponding customer's interaction with the financial institution or with other financial institution, and/or an occurrence (or lack thereof) of default events involving the corresponding customer during a temporal interval disposed prior to the corresponding temporal interval, e.g., the extraction interval $\Delta t_{extract}$ described herein. Further, each of training datasets 184 may also include an element of ground-truth data indicative of the presence or absence of a default event associated with a corresponding one of the customers within a three-month period disposed between three and six months after the corresponding temporal interval (e.g., as specified by the corresponding temporal identifier).

In some instances, executed training input module 180 may perform operations that identify, and obtain or extract, one or more of the features values from the consolidated data records maintained within first subset 182A and associated with the corresponding one of the customers. The obtained or extracted feature values may, for example, include elements of the customer profile, account, or delinquency, or credit-bureau data described herein (e.g., which may populate the consolidated data records maintained within first subset 182A), and examples of these obtained or extracted feature values may include, but are not limited to, data identifying one or more types of financial products or payment instruments held by corresponding ones of the customers, a total balance associated with one or more financial products or payment instruments held by corresponding ones of the customers (e.g., the credit-card account described herein, an amount of available credit or available funds associated with one or more financial products or payment instruments held by corresponding ones of the customers, and/or a past-due amount or a minimum payment associated with one or more financial products or payment instruments held by corresponding ones of the customers.

The disclosed embodiments are, however, not limited to these examples of obtained or extracted feature values, and in other instances, training datasets 184 may include any additional or alternate element of data extracted or obtained from the consolidated data records of first subset 182A, associated with corresponding one of the customers, and associated with the extraction interval $\Delta t_{extract}$ described herein.

Further, in some instances, executed training input module 180 may perform operations that compute, determine, or derive one or more of the features values based on elements of data extracted or obtained from the consolidated data records maintained within first subset 182A. Examples of these computed, determined, or derived feature values may include, but are not limited to, time-average values of payments associated with one or more financial products or payment instruments held by corresponding ones of the customer, time-average balances associated with these financial products, sums of balances associated with various financial products or payment instruments held by corresponding ones of the customers, total amounts of credit available to corresponding ones of the customers, and/or total numbers of past-due balances or delinquencies associated with corresponding ones of the customers. These disclosed embodiments are, however, not limited to these examples of computed, determined, or derived feature values, and in other instances, training datasets 184 may include any additional or alternate featured computed, determine, or derived from data extracted or obtained from the consolidated data records of first subset 182A, associated with corresponding one of the customers, and associated with the extraction interval $\Delta t_{extract}$ described herein.

Additionally, or alternatively, one or more of the feature values may characterize a determined or detected change in the spending and purchase habits of customers across one or more temporal intervals. By way of example, executed training input module 180 may access the aggregated elements of transaction data maintained within each of the consolidated data records maintained within consolidated data store 144, and may perform operations that compute or generate a value of one or more features representative of changes in corresponding elements of the aggregated transaction data across multiple temporal intervals, which executed training input module 180 may package into a corresponding one of training datasets 184. In some instances, by including feature values representative of the real-time changes or trends in customer purchasing and spending habits across multiple temporal intervals, certain of the exemplary processes described herein may enable the distributed components of FI computing system 130 to train adaptively the machine-learning or artificial-intelligence process to predict a likelihood of a future occurrence of a default event involving a customer based on data characterizing the real-time changes or trends.

For example, and as described herein, the elements of aggregated transaction data 174 (e.g., as maintained within consolidated data record 142A) may specify a total transaction amount attributable to transactions that are initiated by the customer identifier 146 between May 1, 2021, and May 31, 2021 (e.g., the temporal interval associated with temporal identifier 148), and the elements of aggregated transaction data 175 (e.g., as maintained within discrete data record 154) may specify a total transaction amount attributable to transactions that are initiated by the customer between Apr. 1, 2021, and Apr. 30, 2021 (e.g., the temporal interval associated with temporal identifier 158). In some instances, executed training input module 180 may perform operations compute a variation in the customer's total spend across the temporal intervals associated with temporal identifiers 148 and 158, and may package the computed variation into a corresponding one of training datasets 184 that is associated with the customer and further, that is associated with an extraction interval $\Delta t_{extract}$ from May 1, 2021, to May 31, 2021, e.g., within aggregate feature values 184A.

In some instances, the elements of aggregated transaction data maintained within the consolidated data records of consolidated data store 144 (e.g., aggregated transaction data 174 and 175) may also characterize transactions involving a particular type of counterparty during corresponding temporal intervals (e.g., restaurant, apparel store, etc.), and further, may characterize transactions involving counterparties assigned to one, or more, of the predetermined, type-specific counterparty categories described herein (e.g., as assigned based on the application of the adaptively trained NLP algorithm or process to portions of transaction data records 114, as described herein). For example, the elements of aggregated transaction data 174 may specify a total transaction amount of $250.00 attributable to transactions that are initiated by the customer identifier 146, and that involve counterparties characterized by the "restaurant" counterparty type, between May 1, 2021, and May 31, 2021 (e.g., the temporal interval associated with temporal identifier 148). Further, the elements of aggregated transaction data 175 (e.g., as maintained within discrete data record 154) may specify a total transaction amount of $500.00 attributable to transactions that are initiated by the customer, and involve counterparties having the "restaurant" counterparty type, between Apr. 1, 2021, and Apr. 30, 2021 (e.g., the temporal interval associated with temporal identifier 158). Executed training input module 180 may perform operations that determine that customer's total spend on counterparties having the "restaurant" counterparty type declined fifty percent across the temporal intervals associated with temporal identifiers 148 and 158, and may package data characterizing the determined change in the customer's spending and purchasing habits into a corresponding one of training datasets 184 that is associated with the customer and further, that is associated with an extraction interval $\Delta t_{extract}$ from May 1, 2021, to May 31, 2021, e.g., within contextual feature values 184B.

Further, and by way of example, the elements of aggregated transaction data 174 may specify that a total transaction amount of $90.00 is attributable to transactions involving restaurants (e.g., the corresponding counterparty type) categorized as "fine dining" during the temporal interval extending from May 1, 2021, to May 31, 2021, and that a total transaction amount of $160.00 is attributable to transactions restaurants categorized as "fast food" during that temporal interval. Additionally, the elements of aggregated transaction data 175 may specify that a total transaction amount of $450.00 is attributable to transactions involving fining-dining restaurants during the temporal interval extending from Apr. 1, 2021, to Apr. 30, 2021, and that a total transaction amount of $50.00 is attributable to transactions fast-food restaurants during that temporal interval.

In some instances, executed training input module 180 may perform operations that determine that customer's total spend on fine-dining restaurants declined eighty percent across the temporal intervals associated with temporal identifiers 148 and 158, and that determine that customer's total spend on fast-food restaurants increased 220% across the temporal intervals associated with temporal identifiers 148 and 158. Executed training input module 180 may package additional data characterizing these determined changes in the customer's spending and purchasing habits into a corresponding one of training datasets 184 that is associated with the customer and further, that is associated with an extraction interval $\Delta t_{extract}$ from May 1, 2021, to May 31, 2021, e.g., within a portion of contextual feature values 184B.

Additionally, or alternatively, executed training input module 180 may perform operations that parse the consolidated data records of consolidated data store 144 (e.g., consolidated data records 142 (including data record 142A), consolidated data records 152 (including discrete data record 154), etc.), to detected seasonal trends in the purchasing or spending habits of one or more customers of the financial institution. For example, the purchasing and spending habits of many customers may vary across one or more calendar years, and may experience seasonal increases and corresponding seasonal decreases. In some instances, and for a customer of the financial institution (e.g., the customer associated with customer identifier 146 of consolidated data record 142A, etc.), executed training input module 180 may perform operations that, based on the elements of aggregated transaction data maintained within corresponding data records of consolidated data store 144, generate values of one or more features indicative of whether the spending of the customer during a particular season (e.g., the holiday season) is consistent with, exceeds, or falls below an average aggregate spend of other customers of the financial institution during the particular season, or is consistent with, exceeds, or falls below, and average aggregate spend of the customer during the particular season across multiple, prior years. Executed training input module 180 may package additional data characterizing these determined seasonal variations in the customer's spending and purchasing habits into a corresponding one of training datasets 184 that is associated with the customer and further, that is associated with an extraction interval $\Delta t_{extract}$ from May 1, 2021, to May 31, 2021, e.g., within a portion of seasonal feature values 184C. Further, executed training input module 180 may also perform any of the exemplary processes described herein to determine seasonal variations in the customer's spending and purchasing habits of additional, or alternate, customers of the financial institution, and to package data characterizing these determined seasonal variations into corresponding portions of training datasets 184.

The disclosed embodiments are, however, not limited to these exemplary feature values and exemplary training datasets. In other instances, training datasets 184 may include any additional, or alternate, feature value that characterize corresponding ones of the customers, the relationships between these customers and the financial institution, the use or misuse of financial products or payment instruments issued by the financial institution or by other financial institutions, and further, the purchasing or spending habits of these customers, across one or more current and prior temporal intervals. For example, one or more of training datasets 184 may include feature values obtained, extracted, or derived from the elements of credit-bureau data 108A, as described herein, although in other examples, one or more of training datasets 184 may lack any feature values obtained, extracted, or derived from the elements of credit-bureau data 108A.

Referring back to FIG. 1C, executed training input module 180 may provide training datasets 184 as an input to an adaptive training and validation module 186 of executed training engine 176. In some instances, and upon execution by the one or more processors of FI computing system 130, adaptive training and validation module 186 may perform operations that establish a plurality of nodes and a plurality of decision trees for the gradient-boosted, decision-tree process, with may ingest and process the elements of training data (e.g., the customer identifiers, the temporal identifiers, the feature values, etc.) maintained within each of the plurality of training datasets 184. Further, and based on the execution of adaptive training and validation module 186, and on the ingestion of each of training datasets 184 by the established nodes of the gradient-boosted, decision-tree process, FI computing system 130 may perform operations that adaptively train the gradient-boosted, decision-tree process against the elements of training data included within each of training datasets 184.

In some examples, the distributed components of FI computing system 130 may execute adaptive training and validation module 186, and may perform any of the exemplary processes described herein in parallel to train adaptively the gradient-boosted, decision-tree process against the elements of training data included within each of training datasets 184. The parallel implementation of adaptive training and validation module 186 by the distributed components of FI computing system 130 may, in some instances, be based on an implementation, across the distributed components, of one or more of the parallelized, fault-tolerant distributed computing and analytical protocols described herein.

Through the performance of these adaptive training processes, executed adaptive training and validation module 186 may perform operations that compute one or more candidate model parameters that characterize the adaptively trained, gradient-boosted, decision-tree process, and package the candidate model parameters into corresponding portions of candidate model data 188. In some instances, the candidate model parameters included within candidate model data 188 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, executed adaptive training and validation module 186 may also generate candidate input data 190, which specifies a candidate composition of an input dataset for the adaptively trained, gradient-boosted, decision-tree process (e.g., which be provisioned as inputs to the nodes of the decision trees of the adaptively trained, gradient-boosted, decision-tree process).

As illustrated in FIG. 1C, executed adaptive training and validation module 186 may provide candidate model data 188 and candidate input data 190 as inputs to executed training input module 180 of training engine 176, which may perform any of them exemplary processes described herein to generate a plurality of validation datasets 192 having compositions consistent with candidate input data 190. As described herein, the plurality of validation datasets 192 may, when provisioned to, and ingested by, the nodes of the decision trees of the adaptively trained, gradient-boosted, decision-tree process, enable executed training engine 176 to validate the predictive capability and accuracy of the adaptively trained, gradient-boosted, decision-tree process, for example, based on elements of ground truth data incorporated within the validation datasets 192, or based on one or more computed metrics, such as, but not limited to, computed precision values, computed recall values, and computed area under curve (AUC) for receiver operating characteristic (ROC) curves or precision-recall (PR) curves.

By way of example, executed training input module 180 may parse candidate input data 190 to obtain the candidate composition of the input dataset, which not only identifies the candidate elements of customer-specific data included within each validation dataset (e.g., the candidate feature values described herein), but also a candidate sequence or position of these elements of customer-specific data within the validation dataset. Examples of these candidate feature values include, but are not limited to, one or more of the feature values extracted, obtained, computed, determined, or derived by executed training input module 180 and packaged into corresponding portions of training datasets 184, as described herein. For instance, the candidate feature values may include one or more of the feature values extracted, obtained, computed, determined, or derived from elements of the customer account, account, or delinquency data described herein, either alone or in conjunction with one or more additional feature values extracted, obtained, computed, determined, or derived from the elements of credit-bureau data described herein. The candidate feature values may also include one or more feature values characterizing changes or trends in the purchasing and pending habits of one or more customers of the financial institution over one or more temporal intervals, such as, but not limited to, one or more of aggregate feature values 184A, contextual feature values 184B, or seasonal feature values 184C, as described herein.

Further, in some examples, each of the plurality of validation datasets 192 may be associated with a corresponding one of the customers of the financial institution, and with a corresponding temporal interval within the validation interval $\Delta t_{validation}$, and executed training input module 180 may access the consolidated data records maintained within second subset 182B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 180 may package the extracted customer identifier and temporal identifier into portions of a corresponding one of validation datasets 192, e.g., in accordance with candidate input data 190.

Executed training input module 180 may perform operations that access one or more additional ones of the consolidated data records that are associated with the corresponding one of the customers (e.g., that include the customer identifier) and as associated with a temporal interval (e.g., based on corresponding temporal identifiers) disposed prior to the corresponding temporal interval, e.g., within the extraction interval $\Delta t_{extract}$ described herein. Based on portions of candidate input data 190, executed training input module 180 may identify, and obtain or extract one or more of the feature values of the validation datasets from within the additional ones of the consolidated data records within second subset 182B. Further, in some examples, and based on portions of candidate input data 190, executed training input module 180 may perform operations that compute, determine, or derive one or more of the features values based on elements of data extracted or obtained from further ones of the consolidated data records within second subset 182B. Executed training input module 180 may package each of the obtained, extracted, computed, determined, or derived feature values into corresponding positions within the initial one of validation datasets 192, e.g., in accordance with the candidate sequence or position specified within candidate input data 190. Additionally, and in some examples, executed training input module 180 may also package, into an appropriate position within portion of the corresponding one of validation datasets 192, an element of ground-truth data indicative of the presence or absence of a default event associated with the corresponding one of the customers within a three-month period disposed between three and six months subsequent to the corresponding temporal interval.

In some instances, executed training input module 180 may perform any of the exemplary processes described herein to generate additional, or alternate, ones of validation datasets 192 based on the elements of data maintained within the consolidated data records of second subset 182B. For example, each of the additional, or alternate, ones of validation datasets 192 may associated with a corresponding, and distinct, pair of customer and temporal identifiers, and as such, corresponding customers of the financial institution and corresponding temporal intervals within validation interval $\Delta t_{validation}$. Further, executed training input module 180 may perform any of the exemplary processes described herein to generate an additional, or alternate, ones of validation datasets 192 associated with each unique pair of customer and temporal identifiers maintained within the consolidated data records of second subset 182B, and in other instances a number of discrete validation datasets within validation datasets 192 may be predetermined or specified within candidate input data 190.

Referring back to FIG. 1C, executed training input module 180 may provide the plurality of validation datasets 192 as inputs to executed adaptive training and validation module 186. In some examples, executed adaptive training and validation module 186 may perform operations that apply the adaptively trained, gradient-boosted, decision-tree process to respective ones of validation datasets 192 (e.g., based on the candidate model parameters within candidate model data 188, as described herein), and that generate elements of output data based on the application of the adaptively trained, gradient-boosted, decision-tree process to corresponding ones of validation datasets 192.

As described herein, each of the each of elements of output data may be generated through the application of the adaptively trained, gradient-boosted, decision-tree process to a corresponding one of validation datasets 192, which may include, among other things, a customer identifier (e.g., identifying a corresponding customer of the financial institution), a temporal identifier (e.g., identifying a corresponding temporal interval), and an element of ground-truth data, which indicates whether the corresponding customer is involved in an actual default event during a future temporal interval, e.g., the target interval $\Delta t_{target}$ separated from the corresponding temporal interval by buffer interval $\Delta t_{buffer}$. Further, as described herein, each of elements of output data may be representative of a predicted likelihood of an occurrence of a default event involving, or associated with, the corresponding customer during the target interval $\Delta t_{target}$, and in some instances, the predicted likelihood may be represented by a numerical score of either zero (e.g., indicative of a predicted non-occurrence of the default event during the target interval $\Delta t_{target}$) or unity (e.g., indicative of a predicted occurrence of the default event during the target interval $\Delta t_{target}$).

Executed adaptive training and validation module 186 may perform operations that compute a value of one or more metrics that characterize a predictive capability, and an accuracy, of the adaptively trained, gradient-boosted, decision-tree process based on the generated elements of output data and corresponding ones of validation datasets 192. The computed metrics may include, but are not limited to, one or more recall-based values for the adaptively trained, gradient-boosted, decision-tree process (e.g., "recall@5," "recall@10," "recall@20," etc.), and additionally, or alternatively, one or more precision-based values for the adaptively trained, gradient-boosted, decision-tree process. Further, in some examples, the computed metrics may include a computed value of an area under curve (AUC) for a precision-recall (PR) curve associated with the adaptively trained, gradient-boosted, decision-tree process, and additional, or alternatively, computed value of an AUC for a receiver operating characteristic (ROC) curve associated with the adaptively trained, gradient-boosted, decision-tree process. The disclosed embodiments are, however, not limited to these exemplary computed metric values, and in other instances, executed adaptive training and validation module 186 may compute a value of any additional, or alternate, metric appropriate to validation datasets 192, the elements of ground-truth data, or the adaptively trained, gradient-boosted, decision-tree process In some examples, executed adaptive training and validation module 186 may also perform operations that determine whether all, or a selected portion of, the computed metric values satisfy one or more threshold conditions for a deployment of the adaptively trained, gradient-boosted, decision-tree process and a real-time application to elements of customer profile, account, transaction, delinquency, or credit-bureau data, as described herein. For instance, the one or more threshold conditions may specify one or more predetermined threshold values for the adaptively trained, gradient-boosted, decision-tree mode, such as, but not limited to, a predetermined threshold value for the computed recall-based values, a predetermined threshold value for the computed precision-based values, and/or a predetermined threshold value for the computed AUC values. In some examples, executed adaptive training and validation module 186 that establish whether one, or more, of the computed recall-based values, the computed precision-based values, or the computed AUC values exceed, or fall below, a corresponding one of the predetermined threshold values and as such, whether the adaptively trained, gradient-boosted, decision-tree process satisfies the one or more threshold requirements for deployment.

If, for example, executed adaptive training and validation module 186 were to establish that one, or more, of the computed metric values fail to satisfy at least one of the threshold requirements, FI computing system 130 may establish that the adaptively trained, gradient-boosted, decision-tree process is insufficiently accurate for deployment and a real-time application to the elements of customer profile, account, transaction, delinquency, and/or credit-bureau data described herein. Executed adaptive training and validation module 186 may perform operations (not illustrated in FIG. 1C) that transmit data indicative of the established inaccuracy to executed training input module 180, which may perform any of the exemplary processes described herein to generate one or more additional training datasets and to provision those additional encrypted training datasets to executed adaptive training and validation module 186. In some instances, executed adaptive training and validation module 186 may receive the additional training datasets, and may perform any of the exemplary processes described herein to train further the gradient-boosted, decision-tree process against the elements of training data included within each of the additional training datasets.

Alternatively, if executed adaptive training and validation module 186 were to establish that each computed metric value satisfies threshold requirements, FI computing system 130 may deem the gradient-boosted, decision-tree process adaptively trained, and ready for deployment and real-time application to the elements of customer profile, account, transaction, delinquency, and/or credit-bureau data described herein. In some instances, executed adaptive training and validation module 186 may generate model data 194 that includes the model parameters of the adaptively trained, gradient-boosted, decision-tree process, such as, but not limited to, each of the candidate model parameters specified within candidate model data 188. Further, executed adaptive training and validation module 186 may also generate input data 196, which characterizes a composition of an input dataset for the adaptively trained, gradient-boosted, decision-tree process and identifies each of the discrete data elements within the input data set, along with a sequence or position of these elements within the input data set (e.g., as specified within candidate input data 190). As illustrated in FIG. 1C, executed adaptive training and validation module 186 may perform operations that store model data 194 and input data 196 within the one or more tangible, non-transitory memories of FI computing system 130, such as consolidated data store 144.

B. Exemplary Processes for Predicting Future Occurrences of Default Events Using Adaptively Trained, Machine-Learning or Artificial-Intelligence Processes In some examples, one or more computing systems associated with or operated by a financial institution, such as one or more of the distributed components of FI computing system 130, may perform operations that adaptively train a machine learning or artificial intelligence process to predict, during a current temporal interval, a likelihood of an occurrence of a default event involving a customer during a future temporal interval using training data associated with a first prior temporal interval, and using validation data associated with a second, and distinct, prior temporal interval. As described herein, the machine-learning or artificial-intelligence process may include an ensemble or decision-tree process, such as a gradient-boosted, decision-tree process, and the training and validation data may include, but are not limited to, elements of customer profile, account, transaction, and/or reporting data characterizing corresponding ones of the customers of the financial institution, along with elements of delinquency data identifying and characterizing prior occurrences of default events associated with, or involving, the corresponding customers. Further, and as described herein, the training and validation data may also include additional data, e.g., feature values that characterize a determined or detected change in the spending and purchase habits of the customers across one or more temporal intervals.

In some instances, FI computing system 130 may perform any of the exemplary processes described herein to generate input datasets associated with all, or a selected subset, of the customers of the financial institution, and to apply the adaptively trained machine-learning or artificial-intelligence process, such as the adaptively trained, gradient-boosted, decision-tree process described herein, to each of the input datasets. Based on the application of the adaptively trained machine-learning or artificial-intelligence process to each of the input datasets, FI computing system 130 may perform any of the exemplary processes described herein to generate corresponding elements of output data, each of which may indicate of a predicted likelihood of occurrence of a default event involving a corresponding customer during a future temporal interval, such as, but not limited to, three-month interval disposed three and six months subsequent to a corresponding prediction date.

By way of example, the selected subset may include one or more customers of the financial institution that hold an unsecured credit product issued by the financial institution, such as, but not limited to, a credit-card account. As described herein, each of the unsecured credit products, including the credit-card account, may be subject to one or more terms and conditions on a subsequent usage of the unsecured credit products and on a subsequent repayment of all, or a portion, of funds associated with the unsecured credit products, and the one or more terms and conditions of each of the unsecured credit products may be established by the financial institution initially upon issuance, and further, may be modified subsequent to issuance in accordance with the customers' use, or misuse, of these unsecured credit products. In some instances, FI computing system 130 may, in conjunction with other computing systems associated with the financial institution, perform any of the exemplary processes described herein to generate input datasets associated with the selected subset of the customers of the financial institution, and to apply the adaptively trained machine-learning or artificial-intelligence process to each of the input datasets in accordance with a predetermined temporal schedule (e.g., on a daily, weekly, or monthly basis), or in response to a detection of a triggering event (e.g., based on the usage of the credit-card account or other unsecured credit product by one or more of the customers).

As described herein, each of the generated elements of output data may include a numerical score (e.g., either zero or unity) indicative of a predicted likelihood that a corresponding one of the customers will be involved in a default event during the future temporal interval, e.g., with a score of zero being indicative of a predicted non-occurrence of the default event during the future temporal interval, and with a score of unity being indicative of a predicted occurrence of the default event during the future temporal interval. In some instances, the generated elements of output data, e.g., the numerical scores, may classify the customers of the financial institution based on the predicted likelihood of their involvement in the future occurrences of the default events. As described herein, FI computing system 130 may perform operations that, in conjunction with one or more additional computing systems of the financial institution, modify a term or condition of the unsecured credit product (e.g., the credit-card account) for held by one or more of the selected subset of the customers based on the predicted likelihood of the involvement of these customers in the future occurrences of the default events.

Further, in some examples, a customer of the financial institution may request an unsecured credit product available for issuance by the financial institution, such as, but not limited to, a credit-card account subject to certain terms and conditions on a subsequent usage of the credit-card account. For example, a device operable by, or associated with, the customer may execute one or more application programs (e.g., a web browser or mobile application associated with the financial institution), and the executed application program may generate elements of data that identify and characterize the customer and the requested credit-card account, and may perform operations that cause the device to transmit the generated elements of data across a communications network, such as network 120, to one or more additional computing systems of the financial institution, such as an issuer system associated with the credit-card account.

In some instances, and prior to issuing the requested credit-card account to the customer, the issuer system may provision data identifying the customer to FI computing system 130 (e.g., across network 120), which may perform any of the exemplary processes described herein to generate an input dataset associated with the customer, to apply the adaptively machine-learning or artificial-intelligence process to the generated input dataset, and based on the application of the machine-learning or artificial-intelligence process to the input dataset, generate an element of output data (e.g., the numerical score described herein) that indicates a predicted likelihood of an occurrence of a default event involving the customer during the future temporal interval. FI computing system 130 may, in some examples, provision the generated element of output data to the issuer system, which may perform operations that generate initial terms and conditions for the requested credit-card account that are consistent with, and appropriate to, the predicted likelihood of the future occurrence of the default event involving the customer.

Through the implementation of the exemplary processes described herein, which adaptively train and validate a machine-learning or artificial-intelligence process (such as the gradient-boosted, decision-tree process described herein) using customer-specific training and validation datasets associated with respective training and validation intervals, and which apply the trained and validated machine-learning or artificial-intelligence process to additional customer-specific input datasets, FI computing system 130 may predict, in real-time, a likelihood of an occurrence of a default event involving one or more customers of the financial institution during a predetermined, future temporal interval (e.g., via the implementation of the parallelized, fault-tolerant distributed computing and analytical protocols described herein across clusters of GPUs and/or TPUs). These exemplary processes may, for example, provide, to the financial institution, a real-time indication of the likelihood of a future default event involving one or more customers, which may inform a determination of not only an initial set of terms and conditions associated with a newly issued credit product, such as the credit-card account described herein, but also a subsequent modification of an existing set of terms and conditions associated with a previously issued credit product.

Figure 2A:
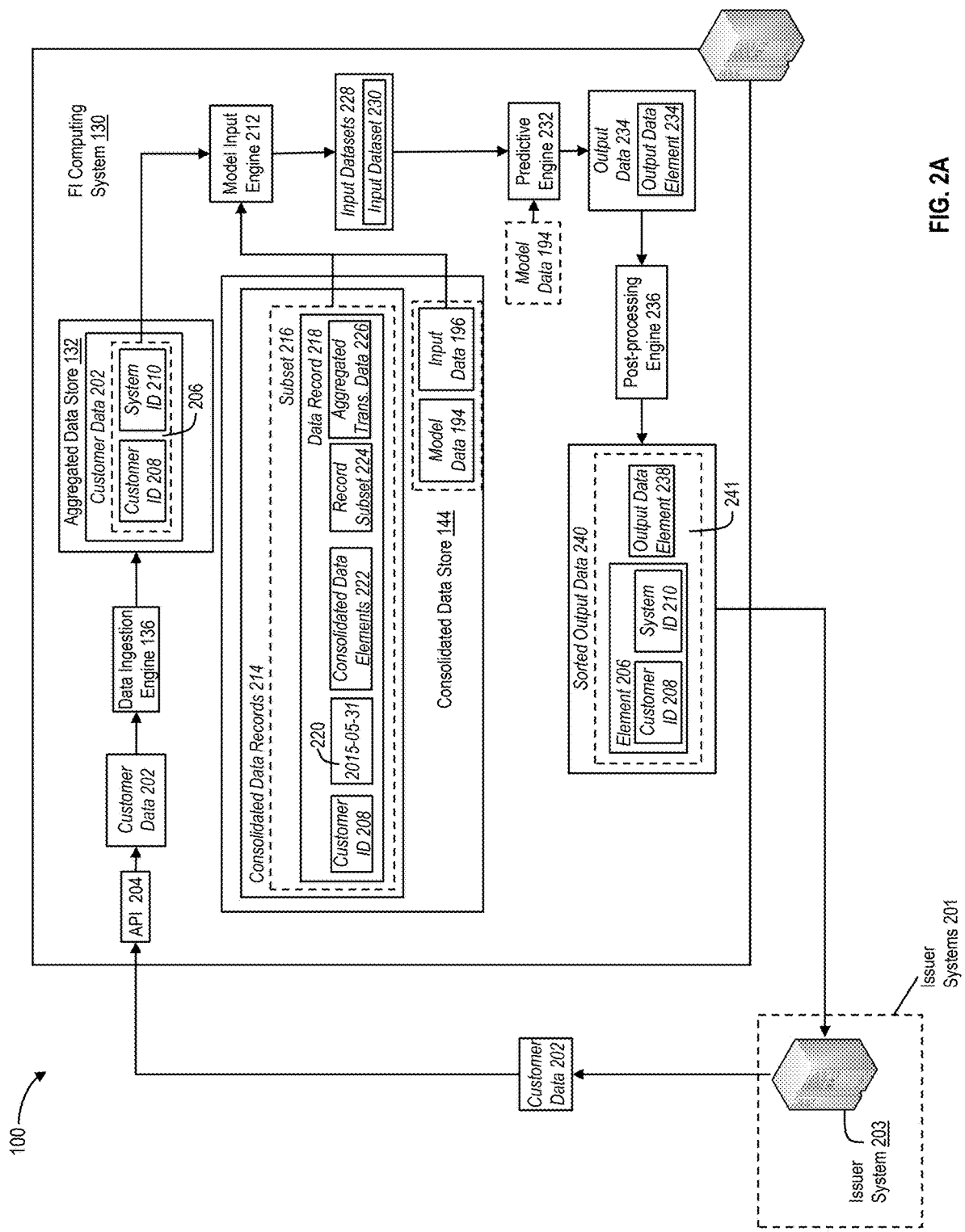
FIGS. 2A and 2B are block diagrams illustrating additional portions of the exemplary computing environment, in accordance with some exemplary embodiments.

Referring to FIG. 2A, aggregated data store 132 of FI computing system 130 may maintain one or more elements of customer data 202. In some instances, each of the one or more elements of customer data 202 may be associated with a customer of the financial institution that holds one, or more issued financial products or payment instruments, such as one or more unsecured credit-card accounts. As described herein, each of the credit-card accounts may be associated with corresponding terms and conditions, which characterize a subsequent usage of the unsecured credit-card account and on a subsequent repayment of all, or a portion, of funds associated with the unsecured credit-card account. Further, as described herein, the financial institution may establish the terms and conditions for each of the unsecured credit-card accounts upon issuance to corresponding ones of the customers, and may selectively modify certain of the terms and conditions in response to the customers' use, or misuse, of the issued credit-card accounts. The disclosed embodiments are, however, not limited to the exemplary credit-card accounts described herein, and in other instances, the elements of customer data 202 may be associated with customers of the financial institution that hold one, or more, additional, or alternate, financial products or payment instruments issued by the financial institution, such as, but not limited to, a secured financial product or payment instrument (e.g., a home mortgage, an automobile loan, etc.) or another, unsecured credit product (e.g., an unsecured personal loan, an unsecured line-of-credit, etc.).

FI computing system 130 may, for example, receive all, or a selected portion, of customer data elements 202 from one or more issuer systems 201 associated with the unsecured credit products, such as, but not limited to, issuer system 203 of FIG. 2A. In some instances, each of issuer systems 201, including issuer system 203, may represent a computing system that includes one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Each of issuer systems 201, including issuer system 203, may also include a communications interface, such as one or more wireless transceivers, coupled to the one or more processors for accommodating wired or wireless internet communication with other computing systems and devices operating within environment 100. In some instances, each of issuer systems 201 (including issuer system 203) may be incorporated into a respective, discrete computing system, although in other instances, one or more of issuer systems 201 (such as issuer system 203) may correspond to a distributed computing system having a plurality of interconnected, computing components distributed across an appropriate computing network, such as communications network 120 of FIG. 1A, or to a publicly accessible, distributed or cloud-based computing cluster, such as a computing cluster maintained by Microsoft Azure™, Amazon Web Services™, Google Cloud™, or another third-party provider.

Referring back to FIG. 2A, an application program executed by the one or more processors of issuer system 203, and of additional, or alternate, ones of issuer systems 201, may transmit portions of customer data elements 202 across network 120 to FI computing system 130. The transmitted portions may be encrypted using a corresponding encryption key, such as a public cryptographic key associated with FI computing system 130, and a programmatic interface established and maintained by FI computing system 130, such as application programming interface (API) 204, may receive the portions of customer data 202 from issuer system 203, or from additional, or alternate, ones of issuer systems 201.

API 204 may, for example, route each of the elements of customer data 202 to executed data ingestion engine 136, which may perform operations that store the elements of customer data 202 within one or more tangible, non-transitory memories of FI computing system 130, such as within aggregated data store 132. In some instances, and as described herein, the received elements of customer data 202 may be encrypted, and executed data ingestion engine 136 may perform operations that decrypt each of the encrypted elements of customer data 202 using a corresponding decryption key (e.g., a private cryptographic key associated with FI computing system 130) prior to storage within aggregated data store 132. Further, although not illustrated in FIG. 2A, aggregated data store 132 may also store one or more additional elements of customer data identifying customers of the financial institution that hold corresponding ones of the unsecured credit products, and executed data ingestion engine 136 may perform one or more synchronization operation that merge the received elements of customer data 202 with the previously stored elements of customer data, and that eliminate any duplicate elements existing among the received elements of customer data 202 with the previously stored elements of customer data (e.g., through an invocation of an appropriate Java-based SQL "merge" command).

As described herein, each of the elements of customer data 202 may be associated with, and include a unique identifier of, a customer of the financial institution that holds one or more of unsecured credit products (e.g., the credit-card accounts, the unsecured personal loans, or the unsecured lines-of-credit), and FI computing system 130 may receive each of the elements of customer data 202 from a corresponding one of issuer systems 201, such as issuer system 203. For example, as illustrated in FIG. 2A, element 206 of customer data 202, which may be associated with a particular one of the customers and received from issuer system 203, may include a customer identifier 208 assigned to the particular customer by FI computing system 130 (e.g., an alphanumeric character string, etc.), and a system identifier 210 associated with issuer system 203 (e.g., an Internet Protocol (IP) address, a media access control (MAC) address, etc.). Further, although not illustrated in FIG. 2A, each additional, or alternate, element of customer data 202 may be associated with an additional customer of the financial institution that holds an unsecured credit product and received from a corresponding one of issuer systems 201, and may include a customer identifier associated with that additional customer and a system identifier associated with the corresponding one of issuer systems 201.

As described herein, FI computing system 130 may perform any of the exemplary processes described herein to generate an input dataset associated with each of the customers identified by the discrete elements of customer data 202, and to apply the adaptively trained, gradient-boosted, decision-tree process described herein to each of the input datasets, in accordance with a predetermined temporal schedule (e.g., on a daily, weekly, or monthly basis, etc.), or in response to a detection of a triggering event. By way of example, the triggering event may correspond to a detected change in a composition of the elements of customer data 202 maintained within aggregated data store (e.g., to an ingestion of additional elements of customer data 202, etc.) or to a receipt of an explicit request received from one or more of issuer systems 201.

In some instances, and in accordance with the predetermined temporal schedule, or upon the detection of the triggering event, a model input engine 212 executed by FI computing system 130 may perform operations that access the elements of customer data 202 maintained within aggregated data store 132, and that obtain the customer identifier maintained within a corresponding one of the accessed elements of customer data 202. For example, as illustrated in FIG. 2A, executed model input engine 212 may access element 206 of customer data 202 (e.g., as maintained within aggregated data store 132) and obtain customer identifier 208, which includes, but is not limited to, the alphanumeric character string assigned to the particular customer of the financial institution (e.g., one of customer identifiers 146 and 156 of FIGS. 1A, and 1B, as described herein).

Executed model input engine 212 may also access consolidated data store 144, and perform operations that identify, within consolidated data records 214, a subset 216 of consolidated data records that include customer identifier 208 and as such, are associated with the particular customer of the financial institution identified by element 206 of customer data 202. As described herein, each of consolidated data records 214 may be associated with a customer of the financial institution, and may characterize that customer, the interaction of that customer with the financial institution and with other financial institutions, and any associated default events involving that customer during a corresponding temporal interval. For example, and as described herein, each of consolidated data records 214 may include a corresponding customer identifier (e.g., an alphanumeric character string assigned to a corresponding customer), a corresponding temporal identifier (e.g., that identifies the corresponding temporal interval), and one or more consolidated data elements associated with the corresponding customer. Examples of these consolidated data elements may include, but are not limited to, elements customer profile data, account data, delinquency data, or credit-bureau data, which may be ingested, processed, aggregated, or filtered by FI computing system 130 using any of the exemplary processes described herein.

In some instances, and as illustrated in FIG. 2A, each data record within subset 216 may include customer identifier 208 and as such, may be associated with the particular customer identified by element 206 of customer data 202. Each of subset 216 of consolidated data records 214 may also include a temporal identifier of a corresponding temporal interval, and one or more consolidated elements associated with the particular customer, the interaction of particular customer with the financial institution and with other financial institutions, and any associated default events involving the particular customer during corresponding ones of the temporal intervals. By way of example, data record 218 of subset 216 may include customer identifier 208, a corresponding temporal identifier 220 (e.g., "2021-05-31," indicating a temporal interval spanning May 1, 2021, through May 31, 2021), and consolidated data elements 222, which identify and characterize the particular customer during the temporal interval spanning May 1, 2021, through May 31, 2021.

Further, each of the consolidated data record within subset 216 may also include one or more transaction data records that characterize purchase transactions initiated by the particular customer during corresponding ones of the temporal intervals and that maintain elements of contextual data characterizing the each of purchase transactions or the involved counterparties. For example, as illustrated in FIG. 2A, data record 218 may include record subset 224, which includes one or more transaction data records (e.g., one or more of transaction data records 114, as described herein) that identify and characterize purchase transactions initiated by the particular customer associated with customer identifier 208 during the temporal interval associated with temporal identifier 220, e.g., between May 1, 2021, and May 31, 2021.

In some instances, each data record within subset 216, such as data record 218, may include one or more elements of aggregated transaction data that characterize the purchasing or spending habits of the particular customer during corresponding ones of the temporal intervals. By way of example, as illustrated in FIG. 2A, data record 218 may maintain elements of aggregated transaction data 226 that, among other things, a total transaction amount of all purchase transactions initiated by the particular customer during the temporal interval associated with temporal identifier 220 (e.g., between May 1, 2021, and May 31, 2021), a total number of purchase transactions initiated by the particular customer during the temporal interval (e.g., a transaction velocity associated with the particular customer during the temporal interval), and/or a total transaction amount attributable to, or a total number of, purchase transactions involving the particular customer and a particular financial product or payment instrument (e.g., the credit-card account described herein) during the temporal interval.

Further, and by way of example, the elements of aggregated transaction data 226 may also include, but are not limited to: (i) a total transaction amount attributable to, or a total number of, purchase transactions involving the particular customer and a specific counterparty (e.g., Jamie's Steak House" or "Josh's Burgers," as described herein) during the temporal intervals; (ii) a total transaction amount attributable to, or a total number of, purchase transactions involving the particular customer and counterparties characterized by one or more of the counterparty types described herein during the temporal intervals (e.g., the "restaurant" or "apparel store" counterparty types, etc.); and/or (iii) a total transaction amount attributable to, or a total number of, purchase transactions involving the particular customer and counterparties assigned to one, or more, of the predetermined, type-specific counterparty categories described herein (e.g., the "fine dining," "casual dining," "fast casual," or "fast food" categories associated with the "restaurant" counterparty type) during the temporal interval. For example, FI computing system 130 may perform any of the exemplary processes described herein to determine the counterparty type associated the counterparty to each of the purchase transactions, and to assign a corresponding one of the predetermined, type-specific counterparty categories to that counterparties, based an application of an adaptively trained NLP algorithm or model to portions of a corresponding transaction data record, e.g., to the counterparty name.

The disclosed embodiments are, however, not limited to these exemplary elements of aggregated transaction data, and in other instances, aggregated transaction data 226 may include any additional or alternate elements of aggregated transaction data that characterize changes or trends in the purchasing and pending habits of that particular customer during the temporal interval associated with temporal identifier 220. Further, although not illustrated in FIG. 2A, each additional, or alternate, data records within subset 216 may include customer identifier 208, a temporal identifier of a corresponding temporal interval, and corresponding elements of consolidated data, subsets of transaction data records, and elements of aggregated transaction data that identify and characterize the particular customer during the corresponding temporal interval.

Executed model input engine 212 may also perform operations that obtain, from consolidated data store 144, elements of input data 196 characterize a composition of an input dataset for the adaptively trained, gradient-boosted, decision-tree process. In some instances, executed model input engine 212 may parse input data 196 to obtain the composition of the input dataset, which not only identifies the elements of customer-specific data included within each input data set dataset (e.g., input feature values, as described herein), but also a specified sequence or position of these input feature values within the input dataset. Examples of these input feature values include, but are not limited to, one or more of the candidate feature values extracted, obtained, computed, determined, or derived by executed training input module 180 and packaged into corresponding portions of training datasets 184 using any of the exemplary processes described herein.

In some instances, and based on the parsed portions of input data 196, executed model input engine 212 may that identify, and obtain or extract, one or more of the input feature values from one or more of data records maintained within subset 216 of consolidated data records 214 and associated with temporal intervals disposed within the extraction interval $\Delta t_{extract}$, as described herein. Executed model input engine 212 may perform operations that package the obtained, or extracted, input feature values within a corresponding one of input datasets 228, such as input dataset 230 associated with the particular customer identified by element 206 of customer data 202, in accordance with their respective, specified sequences or positions. Further, in some examples, and based on the parsed portions of input data 196, executed model input engine 212 may perform operations that compute, determine, or derive one or more of the input features values based on elements of data extracted or obtained from the additional ones of the consolidated data records, which may include, but are not limited to, one or more feature values characterizing changes or trends in the purchasing and pending habits of the particular customer during one or more temporal intervals, such as, but not limited to, one or more of aggregate feature values 184A, contextual feature values 184B, or seasonal feature values 184C, as described herein. Executed model input engine 212 may perform operations that package each of the computed, determined, or derived input feature values into portions of input dataset 230 in accordance with their respective, specified sequences or positions.

Through an implementation of these exemplary processes, executed model input engine 212 may populate an input dataset associated with the particular customer identified by element 206 of customer data 202, such as input dataset 230 of input datasets 228, with input feature values obtained or extracted from, or computed, determined or derived from element of data within, the data records of subset 216. Further, in some instances, executed model input engine 212 may also perform any of the exemplary processes described herein to generate, and populate with input feature values, an additional one of input datasets 228 for each of the additional, or alternate, customers of the financial institution (e.g., which are associated with additional, or alternate, elements of customer data 202). Executed model input engine 212 may package each of the customer-specific input datasets within input datasets 228, and executed model input engine 212 may provide input datasets 228 as an input to a predictive engine 232 executed by the one or more processors of FI computing system 130.

As illustrated in FIG. 2A, executed predictive engine 232 may perform operations that obtain, from consolidated data store 144, model data 194 that includes one or more model parameters of the adaptively trained, gradient-boosted, decision-tree process. For example, and as described herein, the model parameters included within model data 194 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyper-parameters that reduce potential model overfitting (e.g., regularization of pseudo-regularization hyperparameters).

In some examples, and based on portions of model data 194, executed predictive engine 232 may perform operations that establish a plurality of nodes and a plurality of decision trees for the adaptively trained, gradient-boosted, decision-tree process, each of which receive, as inputs (e.g., "ingest"), corresponding elements of input datasets 228. Further, and based on the execution of predictive engine 232, and on the ingestion of input datasets 228 by the established nodes and decision trees of the adaptively trained, gradient-boosted, decision-tree process, FI computing system 130 may perform operations that apply the adaptively trained, gradient-boosted, decision-tree process to each of the input datasets of input datasets 228, including input dataset 230, and that generate an element of output data 234 associated with a corresponding one of input datasets 228, and as such, a corresponding one of the customers identified by the elements of customer data 202. Each of the generated elements of output data 234 may include a numerical score indicative of a predicted likelihood that the corresponding one of the customers will be involved in a default event during the future temporal interval (e.g., the target interval $\Delta t_{target}$, described herein). In some examples, the numerical score within each of the elements of output data 234 may correspond to either zero or unity, with a score of zero being indicative of a predicted non-occurrence of the default event during the future temporal interval, and with a score of unity being indicative of a predicted occurrence of the default event during the future temporal interval.

As illustrated in FIG. 2A, executed predictive engine 232 may provide the generated elements of output data 234 (e.g., either alone, or in conjunction with corresponding ones of input datasets 228) as an input to a post-processing engine 236 executed by the one or more processors of FI computing system 130. In some instances, and upon receipt of the generated elements of output data 234 (e.g., and additionally, or alternatively, the corresponding ones of input datasets 228), executed post-processing engine 236 may perform operations that access the elements of customer data 202 maintained within aggregated data store 132, and associate each of the elements of customer data 202 (e.g., that identify a corresponding one of the customers of the financial institution that hold an unsecured credit product) with a corresponding one of the elements of output data 234 (e.g., that include numerical scores indicative of the predicted likelihood that corresponding ones of the customers will be involved in a default event during the future temporal interval).

By way of example, element 238 of output data 234 may be associated with the particular customer identified by element 206 of customer data 202, and may include a numerical score of unity, which indicates a predicted occurrence of a default event involving the particular customer during the future temporal interval. Executed post-processing engine 236 may, in some instances, associate element 206 of customer data 202 with element 238 of output data, and may perform any of these exemplary processes to associate each additional, or alternate, one of the elements of output data 234 with a corresponding one of the elements of customer data 202.

Further, and in some instances, executed post-processing engine 236 may perform operations that sort the associated elements of customer data 202 and output data 234 based on the corresponding numerical scores (e.g., which indicate the predicted likelihood that corresponding ones of the customer will be involved in a default event during the future temporal interval)), and output elements of sorted output data 240 that include the associated, and now sorted, elements of customer data 202 and output data 234. For example, and for a particular customer of the financial institution, sorted output data 240 may include a corresponding sorted element 241 that associates together element 206 of customer data 202 (which includes customer identifier 208 of the particular customer) and element 238 of output data 234 (which specifies a numerical score of unity for the particular customer).

In some instances, by sorting the associated elements of elements of customer data 202 and output data 234 into respective bins indicative of a predicted non-occurrence of the default event during the future temporal interval (e.g., associated with a numerical score of zero), and indicative of a predicted occurrence of the default event during the future temporal interval (e.g., associated with a numerical score of unity), FI computing system 130 may identify those customers of the financial institution that represent a default risk to the financial institution during the future temporal interval. As illustrated in FIG. 2A, FI computing system 130 may perform operations that transmit all, or a selected portion of, sorted output data 240 to issuer system 203 and additionally, or alternatively, to other ones of issuer systems 201. By way of example, FI computing system 130 may obtain system identifier included within each of the associated elements of customer data 202 and output data 234 within sorted output data 240 (e.g., system identifier 210 maintained within sorted element 241 of sorted output data 240), and perform operations that transmit each of the pairs of ranked and associated elements of customer data 202 and output data 234 to a corresponding one of issuer system 201, including issuer system 203, associated with the obtained system identifier. Further, although not illustrated in FIG. 2A, FI computing system 130 may also encrypt all, or a selected portion of, sorted output data 240 prior to transmission across network 120 using a corresponding encryption key, such as, but not limited to, a corresponding public cryptographic key associated with a corresponding one of issuer systems 201, such as issuer system 203.

Figure 2B:
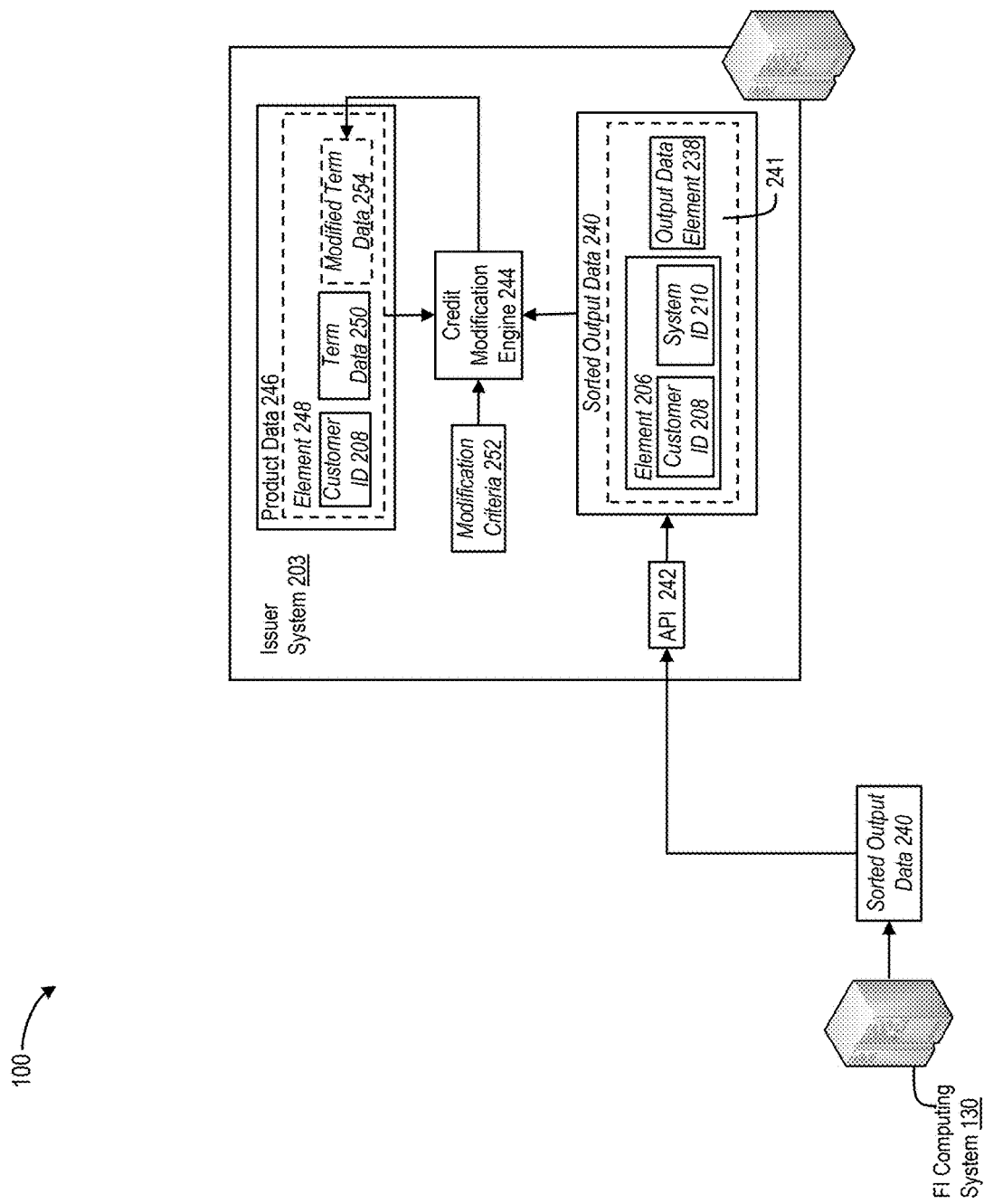

Referring to FIG. 2B, one or more of issuer systems 201, such as issuer system 203, may receive, all, or a selected portion, of sorted output data 240 from FI computing system 130. For example, a programmatic interface associated with and maintained by issuer system 203, such as application programming interface (API) 242, may receive and route sorted output data 240 to a credit modification engine 244 executed by the one or more processors of issuer system 203. As described herein, sorted output data 240 may associated together elements of customer data 202 (e.g., that identifying and characterize corresponding customer of the financial institution) and output data 234 (which include numerical scores indicative of a predicted likelihood that the corresponding ones of the customers will be involved in a default event during the future temporal interval), and may sort (or group) the associated elements of elements of customer data 202 and output data 234 into respective bins indicative of a predicted non-occurrence of the default event during the future temporal interval (e.g., associated with a numerical score of zero), and indicative of a predicted occurrence of the default event during the future temporal interval (e.g., associated with a numerical score of unity). For example, and for a particular customer of the financial institution, sorted output data 240 may include a corresponding sorted element 241 that associates together element 206 of customer data 202 (which includes customer identifier 208 of the particular customer) and element 238 of output data 234 (which specifies a numerical score of unity for the particular customer).

In some instances, executed credit modification engine 244 may perform operations that parse each the elements of sorted output data 240 (including element 241) to determine, for a corresponding one of the customers of the financial institution, whether to modify one or more terms or conditions of an issued unsecured credit product, such as an issued credit-card account, based on the corresponding numerical score and as such, in accordance with the predicted likelihood that the corresponding customer will be involved in a default event during the future temporal interval (e.g., the target temporal interval $\Delta t_{target}$ described herein). For example, executed credit modification engine 244 may access element 241 of sorted output data 240, and obtain customer identifier 208 of the particular customer of the financial institution (e.g., from element 206) and the predicted numerical score associated with that particular customer (e.g., from output data element 238). Further, executed credit modification engine 244 may access product data 246 (e.g., as maintained within one or more tangible, non-transitory memories of issuer system 203), which characterizes terms and conditions of unsecured credit products issued to customers of the financial institution, and obtain element 248 that includes customer identifier 208 and term data 250, which identifies one or more terms and conditions of a financial product or payment instrument issued to a particular customer by the financial institution. For example, the financial products or payment instruments may include a credit-card account, and term data 250 may include, among other things, an identifier of the credit-card account, an amount of credit extended to the particular customer (e.g., a credit limit), a repayment schedule, an interest rate, or a penalty imposed upon the particular customer by the financial institution in response to a determined violation of the terms or conditions.

Further, as illustrated in FIG. 2B, executed credit modification engine 244 may also access modification criteria 252 associated with the terms and conditions of the issued, unsecured credit products. In some instances, modification criteria 252 may include, for a particular ones of the unsecured credit products, one or more criteria that, if satisfied by the elements of sorted output data 240, would trigger a modification of the terms and conditions of the particular ones of the unsecured credit products. Further, modification criteria 252 may also specify one or more modifications to the terms and conditions that would be appropriate to the threshold criteria. By way of example, and for an issued credit-card account, modification criteria 252 may specify that, for a predicted numerical score of unity, executed credit modification engine 244 should decrease the credit limit of the credit-card account by a corresponding percentage, such as fifty percent. Further, in some examples, and for the issued credit-card account, modification criteria 252 may specify that, for a predicted numerical score of zero, executed credit modification engine 244 should increase the credit limit of the credit-card account by a corresponding percentage, such as ten percent. The disclosed embodiments are, however, not limited to these exemplary triggering criteria or appropriate modifications, and in other instances, modification criteria 252 may include other triggering criteria, and other modifications, that would be appropriate to the each of the unsecured credit instruments issued to customers by the financial institution and a level of default risk associated with these customers, such as, but not limited to, an adjustment to the modification associated with a particular triggering criterion to reflect a duration of corresponding customer relationship, or a modification to a corresponding interest rate.

For example, executed credit modification engine 244 may parse element 241 of sorted output data 240, and determine that output data element 238 specifies a numerical score of unity for the particular customer. Based on portions of term data 250, executed credit modification engine 244 may determine that the financial institution issued the credit-card account to the particular customer and that the credit-card account is associated with a corresponding credit limit (e.g., $10,000). Further, and based on portions of modification criteria 252, executed credit modification engine 244 may determine that the numerical score of unity represents a triggering condition associated with a fifty-percent reduction in the credit limit of the issued credit-card account. Executed credit modification engine 244 may perform operations that generate one or more elements of modified term data 254, which identify and characterize the reduction of the credit limit of the credit-card account (e.g., a reduction from $10,000 to $5,000) issued to the particular customer, and store the modified term data 254 within a portion of product data 246 associated with customer identifier 208.

Executed credit modification engine 244 may also perform any of the exemplary processes described herein to determine, for a customer of the financial institution associated with each additional, or alternate, element of sorted output data 240, whether to modify one or more terms or conditions of an issued, unsecured credit product, in accordance with the predicted likelihood that the corresponding customer will be involved in a default event during a future temporal interval. Further, although not illustrated in FIG. 2B, issuer system 203 may perform operations that generate, and transmit across network 120, a notification characterizing each of the modified terms and conditions to a device associated with, or operated by, corresponding ones of the customers of the financial institution.

As described herein, FI computing system 130 may perform operations that, in conjunction with one or more of issuer systems 201, apply an adaptively trained, gradient-boosted, decision-tree process to customer-specific input datasets characterizing all, or a selected subset, of the customers of the financial institution during a prior temporal interval (e.g., the extraction interval $\Delta t_{extract}$, described herein), and based on the application of that apply an adaptively trained, gradient-boosted, decision-tree process to the customer-specific input datasets, generate elements of output data indicative of a predicted likelihood of occurrences of default events involving all, or the subset of, the customers during a future temporal interval (e.g., the target interval $\Delta t_{target}$, described herein). In some instances, also described herein the extraction interval $\Delta t_{extract}$ may be separated temporally from the target interval $\Delta t_{target}$ by a corresponding buffer interval (e.g., the buffer interval $\Delta t_{buffer}$, described herein). Further, examples of the extraction, buffer, and target intervals may include, but are not limited to, respective ones of a one-month interval, a three-month interval, and a three-month interval, and in some instances, each of the generated elements of output data may include a numerical score indicative of the predicted likelihood that a corresponding customer of the financial institution may be involved in, or experience, a default event within three to six months of a corresponding prediction data (e.g., the prediction date $t_{pred}$, described herein).

FI computing system 130 may also perform any of the exemplary processes described herein to generate the input datasets that characterize all, or the selected subset, of the customers during the prior temporal interval (e.g., input datasets 228 of FIG. 2A), to apply the adaptively trained, gradient-boosted, decision-tree process to the customer-specific input datasets, and to generate the elements of output data (e.g., output data 234 of FIG. 2A), and further, to sort the elements of output data 234 and provision the sorted elements of output data (e.g., sorted output data 240 of FIG. 2B) to one or more of issuer systems 201 in accordance with a predetermined schedule (e.g., on a daily basis, a weekly basis, a monthly basis, etc.). As described herein, to generate of the customer-specific input datasets for each customer of the financial institution, or even the selected subset of these customers (e.g., those customers that hold unsecured credit products), FI computing system 130 may ingest, preprocess, and maintain elements of customer profile, account, transaction, default, or credit-bureau data identifying and characterizing potentially millions of customers of the financial institution over various temporal intervals.

In some instances, FI computing system 130 may maintain the data within aggregated data store 132, such as but not limited to, the elements of ingested customer data 138, and the preprocessed data within consolidated data store 144, such as consolidated data records 142, 152, and/or 214, in sparse-vector format to utilize efficiently memory within the distributed file system. Further, the distributed components of FI computing system 130 may perform any of the exemplary processes described herein in parallel to generate the customer-specific input datasets for the potentially millions of customers, and to apply the adaptively trained, gradient-boosted, decision-tree model to the customer-specific input datasets, and to generate the customer-specific elements of output data indicative of the predicted likelihood of the future default events (e.g., via the implementation of the parallelized, fault-tolerant distributed computing and analytical protocols described herein across clusters of GPUs and/or TPUs, as described herein).

These exemplary processes may provide, to the financial institution, a real-time indication of the likelihood of a future default event involving one or more customers based on, among other things, real-time changes or tends in the purchasing or spending habits of the one or more customers, and the provisioned, real-time indication may inform a determination of not only an initial set of terms and conditions associated with a newly issued credit product, but also a subsequent modification of an existing set of terms and conditions associated with a previously issued credit product. For example, as described herein, one or more of issuer systems 201, including issuer system 203, may receive sorted elements of predictive output data (e.g., elements of sorted output data 240 of FIGS. 2A and 2B), which indicate a likelihood that the one or more customers will be involved in, or experience, a default event during a future temporal interval (e.g., the target interval $\Delta t_{target}$ described herein) in accordance with a predetermined schedule, such as, but not limited to, on a daily basis, a weekly basis, or a monthly basis. Based on the sorted elements of the predictive output data, one or more of issuer systems 201, such as issuer system 203, may perform operations that the modify a term or condition associated with an unsecured credit product held by at least one of these customers, such as the credit-card account described herein, to reflect a risk that the at least one of the customers will experience, or be involved in, a default event during the future temporal interval.

By way of example, issuer system 203 may perform operations that issue one or more unsecured credit products to customers of the financial institution, such as an unsecured credit-card account, and each of the issued credit-card accounts may be associated with a corresponding set of initial conditions. In some instances, the sorted elements of predictive output data (e.g., elements of sorted output data 240 described herein) may each be associated with a corresponding one of the customers of the financial institution that hold the unsecured credit-card account issued by issuer system 203, and issuer system 203 may perform any of the exemplary processes described herein (e.g., via the operations performed by executed credit modification engine 244, as described herein) to modify the terms and conditions associated with the unsecured credit-card account held by at least one of the customers based on corresponding ones of the sorted elements of predictive output data, which include numerical scores indicative of a predicted likelihood of an occurrence of a default event during a future temporal interval (e.g., a numerical score of unity) or a predicted non-occurrence of a default event during a future temporal interval (e.g., a numerical score of zero).

In other examples, and in addition to characterizing those customers of the financial institution that hold the unsecured credit-card accounts issued by issuer system 203, the sorted elements of predictive output data received by issuer system 203 may also characterize customers that hold other unsecured credit instruments or other financial products issued by the financial institution (e.g., unsecured credit products or financial products and associated with additional, or alternate, ones of issuer systems 201). The broader composition of the sorted elements of predictive output data may, for instance, enable issuer system 203 to perform operations that establish a set of initial terms and conditions for an unsecured credit product requested by a corresponding customer of the financial institution, e.g., based on a determined risk that the corresponding customer will be experience, or be involved in, a default event during the future temporal interval. For example, issuer system 203 (or an additional, or alternate, one of issuer systems 201) may receive a request to obtain an unsecured credit product, such as the unsecured credit-card account described herein, from a device operated by a requesting customer (e.g., via a mobile banking application executed by that device and associated with the financial institution).

Issuer system 203 may, for example, parse the received request and obtain a customer identifier associated with the requesting customer, and based on the obtained identifier, issuer system 203 may access a corresponding one of the sorted elements of output data that includes, or is associated with, the customer identifier (e.g., one of the elements of sorted output data 240). The corresponding one of the sorted elements may include a numerical score indicative of a predicted likelihood that the requesting customer will experience, or will be involved in, a default event during the future temporal interval, e.g., as generated by FI computing system based on the application of the adaptively trained, gradient-boosted, decision-tree process to a corresponding input data set. Based on the numerical score, and the predicted likelihood of the occurrence of the default event during the future temporal interval, issuer system 203 may perform any of the exemplary processes described herein to determine one or more initial terms and conditions for the requested credit-card account, and transmit data identifying the initial terms and conditions for the requested credit-card account to the device, e.g., for presentation to the requesting customer within a corresponding digital interface.

Further, in some instances, issuer system 203 may, upon receipt of the request from the device operable by the customer, perform additional operations that package all or a portion of the received request, including the customer identifier, into a portion of an additional request that, when transmitted to FI computing system 130 across network 120, causes FI computing system 130 to perform any of the exemplary processes described herein to generate a customer-specific dataset based on the customer identifier, to apply the adaptively trained, gradient-boosted, decision-tree process to the customer-specific dataset, and based on the application of the adaptively trained, gradient-boosted, decision-tree process to the customer-specific dataset, generate an element of output data indicative of a predictive likelihood that the requesting customer will experience, or be involved in, a default event during the future temporal interval. For example, a programmatic interface established and maintained by FI computing system 130, such as API 204, may receive and route the received customer request, which includes the customer identifier, to executed model input engine 212.

Executed model input engine 212 may obtain the customer identifier from the customer request, and may access one or more consolidated data records maintained within consolidated data store 144 (e.g., consolidated data records 214 of FIG. 2A) that include or reference the customer identifier and as such, as associated with the requesting customer. Based on the one or more accessed consolidated data records, executed model input engine 212 may perform any of the exemplary processes described herein to generate a customer-specific input dataset consistent with the composition and sequence specified by input data 196. Executed model input engine 212 may provision the customer-specific input dataset to executed predictive engine 232, which may perform any of the exemplary processes described herein to apply the adaptively trained, gradient-boosted, decision-tree process to the customer-specific input dataset, and to generate the element of output data indicative of the predictive likelihood that the requested customer will experience, or be involved in, a default event during the future temporal interval.

Responsive to the generation of the element of output data, FI computing system 130 may perform operations that transmit the generated element of output data, which includes the corresponding numerical score indicative of the predicted likelihood of the future occurrence of the default event, across network 120 to issuer system 203. Issuer system 203 may, for example, perform any of the exemplary processes described herein to determine one or more initial terms and conditions for the requested unsecured personal loan based on the numerical score (and the predicted likelihood of the occurrence of the default event during the future temporal interval) issuer system 203 may perform any of the exemplary processes described herein, and transmit data identifying the initial terms and conditions for the requested unsecured personal loan to the device, e.g., for presentation to the requesting customer within a corresponding digital interface.

The distributed components of FI computing system 130 may perform any of the exemplary processes described herein in parallel to generate the customer-specific input dataset, to apply the adaptively trained, gradient-boosted, decision-tree model to the customer-specific input dataset, and to generate the customer-specific element of output data indicative of the predicted likelihood of the future default event (e.g., via the implementation of the parallelized, fault-tolerant distributed computing and analytical protocols described herein across clusters of GPUs and/or TPUs, as described herein). Through the parallel implementation of these processes, FI computing system 130 may generate and provision the customer-specific element of output data to issuer system 203 in real-time and contemporaneously with the receipt of the corresponding request for the unsecured credit-card account at issuer system 203 (e.g., as generated by the device operable by the customer), and the receipt of the additional request for the output data from issuer system 203.

Figure 3A:
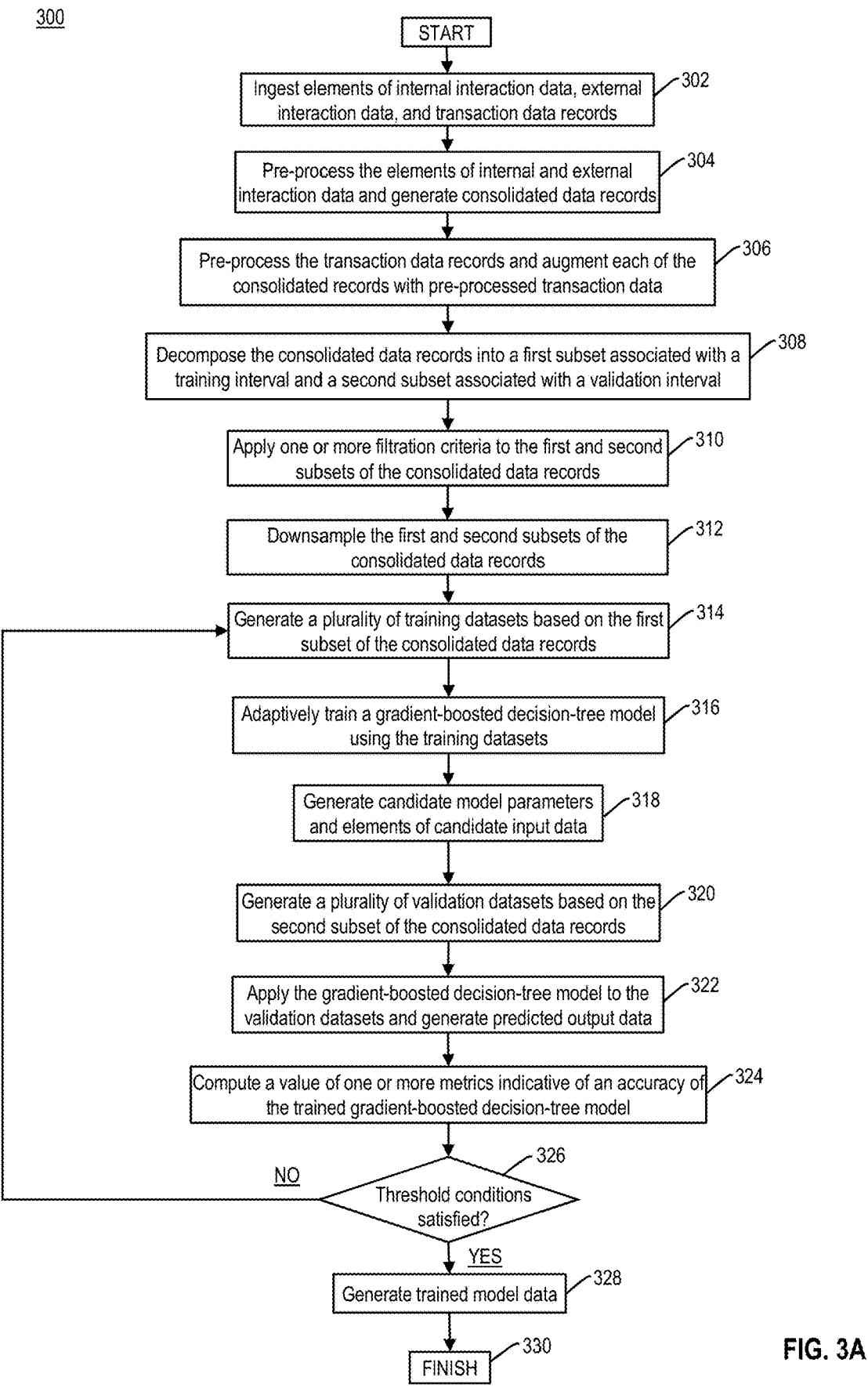
FIGS. 3A and 3B are flowcharts of exemplary processes for adaptively training a machine learning or artificial intelligence process, in accordance with some exemplary embodiments.
Figure 3B:
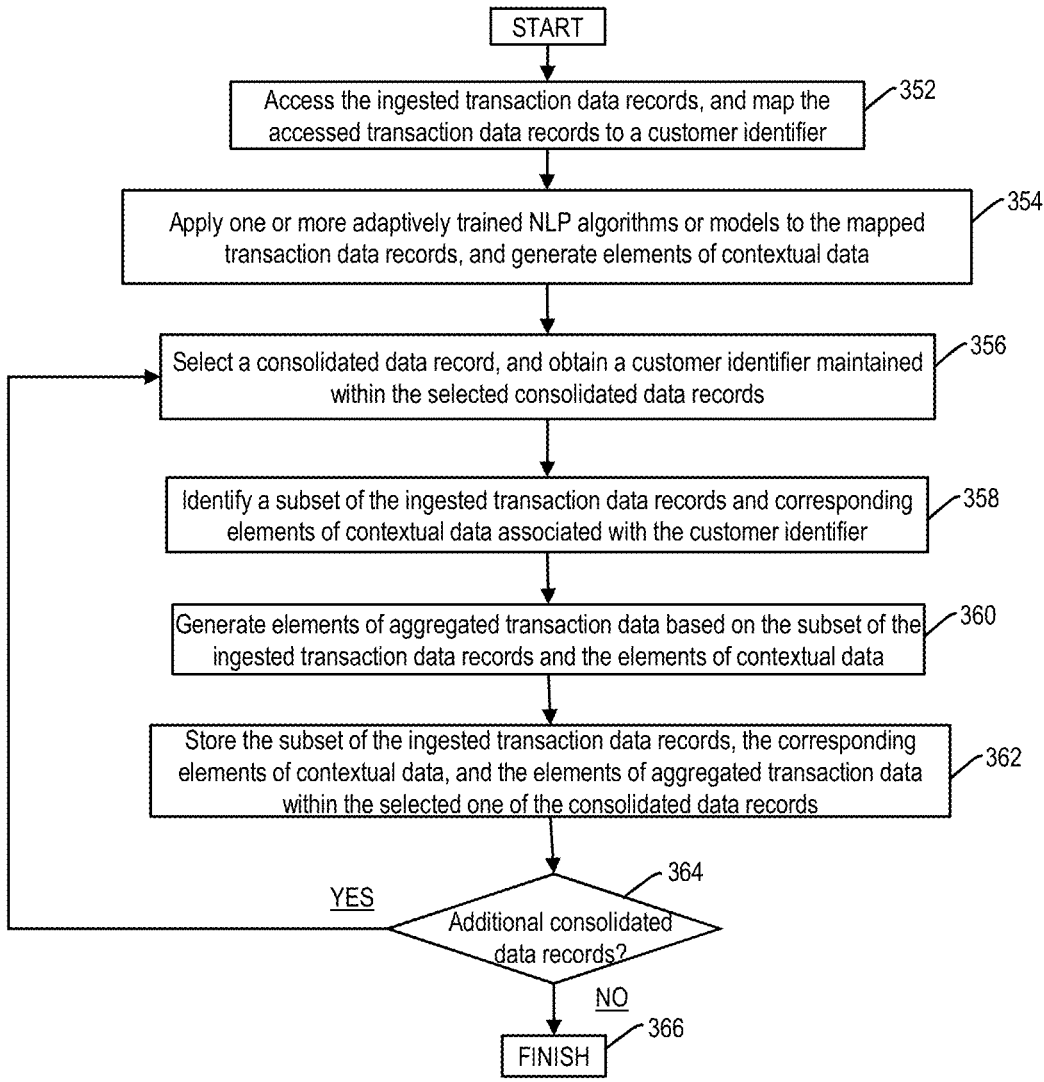

FIGS. 3A and 3B are flowcharts of exemplary processes for adaptively training a machine learning or artificial intelligence process to predict a likelihood of an occurrence of an event during a future temporal interval using training datasets associated with a first prior temporal interval, and using validation datasets associated with a second, and distinct, prior temporal interval. As described herein, the machine-learning or artificial-intelligence process may include an ensemble or decision-tree process, such as a gradient-boosted decision-tree process (e.g., the XGBoost model), and the event may include, but is not limited to, a default event involving one or more customers of a financial institution. In some instances, one or more computing systems, such as, but not limited to, one or more of the distributed components of FI computing system 130, may perform one or more of the steps of exemplary process 300, as described herein in reference to FIG. 3A, and one or more of the steps of exemplary process 350, as described herein in reference to FIG. 3B.

Referring to FIG. 3A, FI computing system 130 may perform any of the exemplary processes described herein to establish a secure, programmatic channel of communication with one or more computing systems, such as source systems 102 and transaction system 110 of FIG. 1A, and to obtain, from the computing systems, elements of internal interaction data, elements of external interaction data, and transaction data records associated with one or more customers of the financial institution (e.g., in step 302 of FIG. 3). The elements of internal customer data may include, but are not limited to, one or more elements of customer profile, account, and/or default data associated with corresponding ones of the customers, and the elements of external customer data may include, but are not limited to, elements of reporting or credit-bureau data associated with corresponding ones of the customers. Further, and as described herein, the transaction data records 114 may maintain elements of transaction data that identify, and characterize, purchase transactions initiated by, and involving, customers of the financial institution.

FI computing system 130 may also perform operations that store (or ingest) the obtained elements of internal interaction data, the obtained elements of external interaction data, and the obtained transaction data records within one or more accessible data repositories, such as aggregated data store 132 (e.g., also in step 302 of FIG. 3). In some instances, FI computing system 130 may perform any of the exemplary processes described herein to obtain and ingest the one or more of the elements of internal interaction data, the elements of external interaction data, and the transaction data records in batch form and in accordance with a predetermined temporal schedule (e.g., on a daily basis, on a weekly basis, on a monthly basis, etc.), or on a continuous streaming basis, across the secure, programmatic channel of communication.

Further, FI computing system 130 may access the ingested elements of internal and external interaction data, and may perform any of the exemplary processes described herein to pre-process the ingested elements of internal and external interaction data elements (e.g., the elements of customer profile, account, delinquency, and/or credit bureau data described herein) and generate one or more consolidated data records (e.g., in step 304 of FIG. 3). As described herein, the FI computing system 130 may store each of the consolidated data records within one or more accessible data repositories, such as consolidated data store 144 (e.g., also in step 304 of FIG. 3A). For example, and as described herein, each of the consolidated data records may be associated with a particular one of the customers, and may include a corresponding pair of a customer identifier associated with the particular customer (e.g., an alphanumeric character string, etc.) and a temporal interval that identifies a corresponding temporal interval. Further, and in addition to the corresponding pair of customer and temporal identifiers, each of the consolidated data records may also include one or more consolidated elements of customer profile, account, delinquency, and/or credit-bureau data that characterize the particular customer during the corresponding temporal interval associated with the temporal identifier.

In some instances, FI computing system 130 may also access each of the ingested transaction data records, and may perform any of the exemplary processes described herein to pre-process the ingested transaction data records, and to augment each of the consolidated data records with elements of pre-processed transaction data that characterize purchase transactions initiated by the particular customer during the corresponding temporal interval and that characterize a purchasing or spending habit of that particular customer during the temporal interval (e.g., in step 306 of FIG. 3A). For example, FI computing system 130 may perform operations that generate elements of contextual data based on an application of an adaptively trained natural language processing (NLP) algorithm or model to elements of transaction data maintained within each of the ingested transactions data records, that generate elements of aggregated transaction data based on the elements of transaction data maintained within each of the ingested transactions and on the elements of contextual data, and that store a corresponding subset of the ingested transaction data records and of the elements of aggregated transaction data within each of the consolidated data records, as described in reference to FIG. 3B.

Referring to FIG. 3B, FI computing system 130 may access the ingested transaction data records, and perform any of the exemplary processes described herein to obtain a customer identifier of a corresponding customer maintained within each of the ingested transaction data records and to map each of accessed transaction data records, and the obtained customer identifier, to a customer identifier assigned to the corresponding customer by FI computing system 130 (e.g., in step 352 of FIG. 3B). FI computing system 130 may also perform any of the exemplary processes described herein to apply one or more adaptively trained, natural-language processing (NLP) algorithms or models to selected portions of each of the ingested transaction data records, and based on the application of the adaptively trained NLP algorithms or models to selected portions of each of the ingested transaction data records, FI computing system 130 may generate elements of contextual data that, among other things, characterizes the purchase transaction and the corresponding counterparty associated with each of the ingested transaction data records (e.g., in step 354 of FIG. 3B).

The generated elements of contextual data may, for example, identify a counterparty type that characterizes each of the corresponding counterparties to the purchase transactions represented by the ingested transaction data records, and may assign each of the corresponding counterparties to one, or more, predetermined, type-specific counterparty categories indicative of, among other things, a relative cost products or services offered for sale by the corresponding counterparty (e.g., relative to other counterparties sharing a common counterparty type). Through the generation of the elements of contextual data characterizing each of the purchase transaction represented by the ingested transaction data records, certain of the exemplary processes described herein may enable FI computing system 130 to detect real-time changes in the spending and purchase habits of customers across the counterparty types and/or across the predetermined, type-specific counterparty categories.

In some instances, FI computing system 130 may perform any of the exemplary processes described herein to access a selected one of the consolidated data records, and obtain, from the selected one of the consolidated data records, a customer identifier associated with a corresponding customer of the financial institution and a temporal identifier associated with a corresponding temporal interval (e.g., in step 356 of FIG. 3B). FI computing system 130 may also perform operations, such as those described herein, to identify a subset of the ingested transaction data records, and the corresponding elements of contextual data, that characterize purchase transactions initiated by the corresponding customer during the corresponding temporal interval (e.g., in step 358 of FIG. 3B). FI computing system 130 may also perform any of the exemplary processes described herein to generate one or more elements of aggregated transaction data based on the subset of the ingested transaction data, and the corresponding elements of contextual data, that characterize the purchase transactions initiated by the corresponding customer during the corresponding temporal interval (e.g., in step 360 of FIG. 3B).

By way of example, and as described herein, the one or more elements of aggregated transaction data may characterize the purchasing or spending habits of the corresponding customer during the corresponding temporal interval, and may include, but is not limited to, a total transaction amount attributable to the purchase transactions initiated by the corresponding customer during the corresponding temporal interval, a total number of purchase transactions initiated by the corresponding customer during the corresponding temporal interval (e.g., a transaction velocity), and/or a total transaction amount attributable to, or a total number of, purchase transactions involving the corresponding customer and a particular financial product or payment instrument during the corresponding temporal interval. Further, in some examples, the elements of aggregated transaction data may also include, but are not limited to: (i) a total transaction amount attributable to, or a total number of, purchase transactions involving the corresponding customer and a specific counterparty during the corresponding temporal interval; (ii) a total transaction amount attributable to, or a total number of, purchase transactions involving the particular customer and counterparties characterized by one or more of the counterparty types described herein during the corresponding temporal interval; and/or (iii) a total transaction amount attributable to, or a total number of, purchase transactions involving the corresponding customer and counterparties assigned to one, or more, of the predetermined, type-specific counterparty categories described herein during the corresponding temporal interval.

In some instances, FI computing system 130 may perform any of the exemplary processes described herein to store the subset of the ingested transaction data records, the corresponding elements of contextual data, and the one or more elements of aggregated transaction data within a portion of the selected one of the consolidated data records (e.g., in step 362 of FIG. 3B). Further, FI computing system 130 may determine whether additional or alternate ones of the consolidated data records await processing via any of the exemplary pre-processing and aggregation operations described herein (e.g., in step 364 of FIG. 3B). If, for example, FI computing system were to determine that one or more consolidated data records await pre-processing and aggregation (e.g., step 364; YES), exemplary process 350 may pass back to step 356, and FI computing system 130 may perform any of the exemplary processes described herein to select an additional one of the consolidated data records for pre-processing and aggregation. Alternatively, if FI computing system were to determine that no further consolidated data records await pre-processing and aggregation (e.g., step 364; NO), exemplary process 350 is complete in step 366.

Referring back to FIG. 3A, in step 308, FI computing system 130 may perform any of the exemplary processes described herein to decompose the consolidated data records into (i) a first subset of the consolidated data records having temporal identifiers associated with a first prior temporal interval (e.g., the training interval $\Delta t_{training}$, as described herein) and (ii) a second subset of the consolidated data records having temporal identifiers associated with a second prior temporal interval (e.g., the validation interval $\Delta t_{validation}$, as described herein), which may be separate, distinct, and disjoint from the first prior temporal interval. By way of example, portions of the consolidated data records within the first subset may be appropriate to train adaptively the machine-leaning or artificial process (e.g., the gradient-boosted decision model described herein during the training interval $\Delta t_{training}$, and portions of the consolidated records within the second subset may be appropriate to validating the adaptively trained gradient-boosted decision model during the validation interval $\Delta t_{validation}$.

FI computing system 130 may also perform any of the exemplary processes described herein to filter the consolidated data records of the first and second subsets in accordance with one or more filtration criteria (e.g., in step 310 of FIG. 3A). By way of example, and without limitation, the one or more filtration criteria may cause FI computing system 130 to exclude, from the first and second subsets of consolidated data records, a consolidated data record of any customer associated with an occurrence of a default event during, or prior to, the temporal interval associated with the corresponding temporal identifier.

Further, and as described herein, the consolidated data records within first subset or within the second subset may represent an imbalanced data set in which the actual occurrences of default within a future temporal interval associated with adaptively trained machine learning or artificial intelligence process (e.g., the target interval $\Delta t_{target}$ associated with the adaptively trained, gradient-boosted, decision-tree process described herein) are outnumbered disproportionately by non-occurrences of default within the target prediction interval $\Delta t_{target}$. Given the imbalanced character of the first and second subsets, FI computing system 130 may also perform any of the exemplary processes described herein to downsample the consolidated data records within the first and second subsets that are associated with the non-occurrences of default (e.g., in step 312 of FIG. 3A). In some instances, the downsampled data records maintained within each of the first and second subsets may represent, respectively, a balanced data set characterized by a more proportionate balance between the actual occurrences of default and non-occurrences of default.

In some instances, FI computing system 130 may perform any of the exemplary processes described herein to generate a plurality of training datasets based on elements of data obtained, extracted, or derived from all or a selected portion of the first subset of the consolidated data records (e.g., in step 314 of FIG. 3A). By way of example, each of the plurality of training datasets may be associated with a corresponding one of the customers of the financial institution and a corresponding temporal interval, and may include, among other things a customer identifier associated with that corresponding customer and a temporal identifier representative of the corresponding temporal interval, as described herein. Further, and as described herein, each of the plurality of training datasets may also elements of data (e.g., feature values) that characterize the corresponding one of the customers, the corresponding customer's interaction with the financial institution or with other financial institution, and/or an occurrence (or lack thereof) of default events involving the corresponding customer during a temporal interval disposed prior to the corresponding temporal interval, e.g., during the extraction interval $\Delta t_{extract}$ described herein. Further, each of the plurality of training datasets may also include an element of ground-truth data indicative of the presence or absence of an actual default event associated with a corresponding one of the customers within a corresponding target prediction interval $\Delta t_{target}$, such as, but not limited to, a three-month period disposed between three and six months of the date specified by the temporal identifier).

Based on the plurality of training datasets, FI computing system 130 may also perform any of the exemplary processes described herein to train adaptively the machine-learning or artificial-intelligence process (e.g., the gradient-boosted decision-tree process described herein) to predict, during a current temporal interval, a likelihood of occurrences of default events involving customers of the financial institution during a future temporal interval (e.g., in step 316 of FIG. 3A). For example, and as described herein, FI computing system 130 may perform operations that establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets, and that adaptively train the gradient-boosted, decision-tree process against the elements of training data included within each of the plurality of the training datasets.

In some examples, the distributed components of FI computing system 130 may perform any of the exemplary processes described herein in parallel to establish the plurality of nodes and a plurality of decision trees for the gradient-boosted, decision-tree process, and to adaptively train the gradient-boosted, decision-tree process against the elements of training data included within each of the plurality of the training datasets. The parallel implementation of these exemplary adaptive training processes by the distributed components of FI computing system 130 may, in some instances, be based on an implementation, across the distributed components, of one or more of the parallelized, fault-tolerant distributed computing and analytical protocols described herein.

Through the performance of these adaptive training processes, FI computing system 130 may compute one or more candidate model parameters that characterize the adaptively trained machine-learning or artificial-intelligence process, such as, but not limited to, candidate model parameters for the adaptively trained, gradient-boosted, decision-tree process described herein (e.g., in step 318 of FIG. 3A). In some instances, and for the adaptively trained, gradient-boosted, decision-tree process, the candidate model parameters included within candidate model data may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, FI computing system 130 may perform any of the exemplary processes described herein to generate candidate input data, which specifies a candidate composition of an input dataset for the adaptively trained machine-learning or artificial intelligence process, such as the adaptively trained, gradient-boosted, decision-tree process (e.g., also in step 318 of FIG. 3A).

Further, FI computing system 130 may perform any of the exemplary processes described herein to access the second subset of the consolidated data records, and to generate a plurality of validation subsets having compositions consistent with the candidate input data (e.g., in step 320 of FIG. 3A). As described herein, each of the plurality of the validation datasets may be associated with a corresponding one of the customers of the financial institution, and with a corresponding temporal interval within the validation interval $\Delta t_{validation}$, and may include a customer identifier associated with the corresponding one of the customers and a temporal identifier that identifies the corresponding temporal interval. Further, each of the plurality of the validation datasets may also include one or more feature values that are consistent with the candidate input data, associated with the corresponding one of the customers, and obtained, extracted, or derived from corresponding ones of the accessed second subset of the consolidated data records (e.g., during the corresponding extraction interval $\Delta t_{extract}$, as described herein).

In some instances, FI computing system 130 may perform any of the exemplary processes described herein to apply the adaptively trained machine-learning or artificial intelligence process (e.g., the adaptively trained, gradient-boosted, decision-tree process described herein) to respective ones of the validation datasets, and to generate corresponding elements of output data based on the application of the adaptively trained machine-learning or artificial intelligence process to the respective ones of the validation datasets (e.g., in step 322 of FIG. 3A). As described herein, each of the generated elements of output data may be associated with a respective one of the validation datasets and as such, a corresponding one of the customers of the financial institution. Further, each of the generated elements of output data may also a numerical score indicative of a predicted likelihood that the corresponding one of the customers will experience, or will be involved in, a default event within a future temporal interval, such as, but not limited to, a three-month interval disposed between three and six months from the date specified by the temporal identifier within the respective one of the validation datasets. For example, a numerical score of zero may be indicative of a predicted non-occurrence of a default event during a future temporal interval, and a numerical score of unity may be indicative of a predicted occurrence of a default event during a future temporal interval.

Further, and as described herein, the distributed components of FI computing system 130 may perform any of the exemplary processes described herein in parallel to validate the adaptively trained, gradient-boosted, decision-tree process described herein based on the application of the adaptively trained, gradient-boosted, decision-tree process (e.g., configured in accordance with the candidate model parameters) to each of the validation datasets. The parallel implementation of these exemplary adaptive validation processes by the distributed components of FI computing system 130 may, in some instances, be based on an implementation, across the distributed components, of one or more of the parallelized, fault-tolerant distributed computing and analytical protocols described herein.

In some examples, FI computing system 130 may perform any of the exemplary processes described herein to compute a value of one or more metrics that characterize a predictive capability, and an accuracy, of the adaptively trained machine-learning or artificial intelligence process (such as the adaptively trained, gradient-boosted, decision-tree process described herein) based on the generated elements of output data and corresponding ones of the validation datasets (e.g., in step 324 of FIG. 3A), and to determine whether all, or a selected portion of, the computed metric values satisfy one or more threshold conditions for a deployment of the adaptively trained machine-learning or artificial intelligence process (e.g., in step 326 of FIG. 3A). As described herein, and for the adaptively trained, gradient-boosted, decision-tree process, the computed metrics may include, but are not limited to, one or more recall-based values (e.g., "recall@5," "recall@10," "recall@20," etc.), one or more precision-based values for the adaptively trained, gradient-boosted, decision-tree process, and additionally, or alternatively, a computed value of an area under curve (AUC) for a precision-recall (PR) curve or a computed value of an AUC for a receiver operating characteristic (ROC) curve associated with the adaptively trained, gradient-boosted, decision-tree process.

Further, and as described herein, the threshold requirements for the adaptively trained, gradient-boosted, decision-tree process may specify one or more predetermined threshold values, such as, but not limited to, a predetermined threshold value for the computed recall-based values, a predetermined threshold value for the computed precision-based values, and/or a predetermined threshold value for the computed AUC values. In some examples, FI computing system 130 may perform any of the exemplary processes described herein to establish whether one, or more, of the computed recall-based values, the computed precision-based values, or the computed AUC values exceed, or fall below, a corresponding one of the predetermined threshold values and as such, whether the adaptively trained, gradient-boosted, decision-tree process satisfies the one or more threshold requirements for deployment.

If, for example, FI computing system 130 were to establish that one, or more, of the computed metric values fail to satisfy at least one of the threshold requirements (e.g., step 326; NO), FI computing system 130 may establish that the adaptively trained machine-learning or artificial-intelligence process (e.g., the adaptively trained, gradient-boosted, decision-tree process) is insufficiently accurate for deployment and a real-time application to the elements of customer profile, account, transaction, delinquency, or credit-bureau data described herein. Exemplary process 300 may, for example, pass back to step 314, and FI computing system 130 may perform any of the exemplary processes described herein to generate additional training datasets based on the elements of the consolidated data records maintained within the first subset.

Alternatively, if FI computing system 130 were to establish that each computed metric value satisfies threshold requirements (e.g., step 326; YES), FI computing system 130 may deem the machine-learning or artificial intelligence process (e.g., the gradient-boosted, decision-tree process described herein) adaptively trained and ready for deployment and real-time application to the elements of customer profile, account, transaction, delinquency, and/or credit-bureau data described herein, and may perform any of the exemplary processes described herein to generate trained model data that includes the candidate model parameters and candidate input data associated with the of the adaptively trained machine-learning or artificial intelligence process (e.g., in step 328 of FIG. 3). Exemplary process 300 is then complete in step 330.

Figure 4:
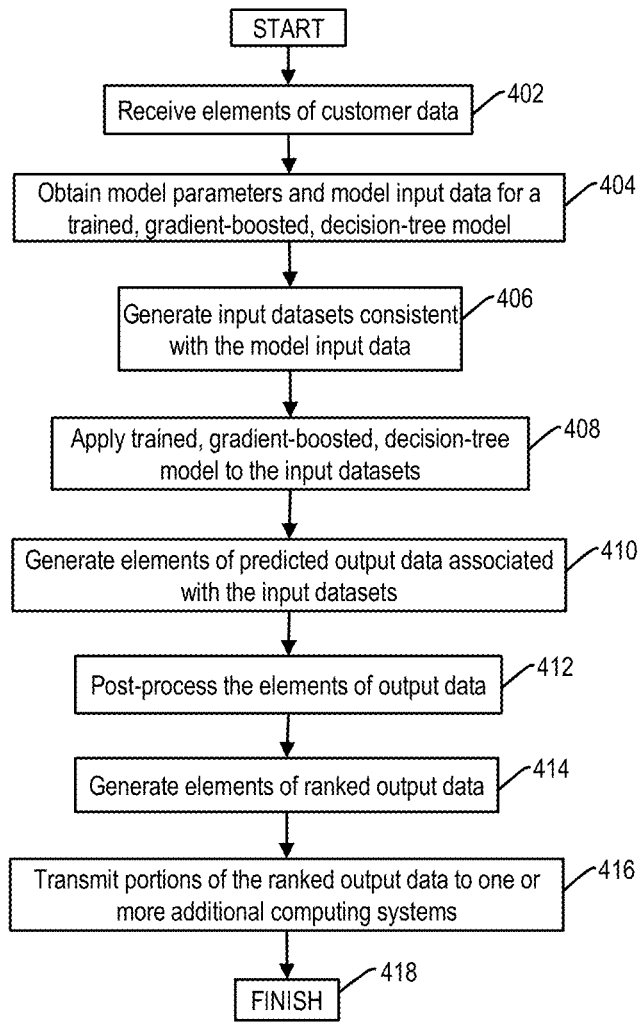
FIG. 4 is a flowchart of an exemplary process for predicting a likelihood of future occurrences of events based on an application of an adaptively trained machine-learning or artificial-intelligence process to customer-specific input datasets, in accordance with some exemplary embodiments.

FIG. 4 is a flowchart of an exemplary process 400 for predicting a likelihood of future occurrences of events involving one or more customers of a financial institution based on an application of an adaptively trained machine-learning or artificial-intelligence process to customer-specific input datasets, in accordance with the disclosed exemplary embodiments. As described herein, the events may include one or more default events involving corresponding ones of the customers, and the machine-learning or artificial-intelligence process may include an ensemble or decision-tree process, such as a gradient-boosted decision-tree process (e.g., the XGBoost model), which may be trained adaptively to predict a likelihood of an occurrence of a default event during a future temporal interval using training datasets associated with a first prior temporal interval (e.g., the training interval $\Delta t_{training}$, as described herein), and using validation datasets associated with a second, and distinct, prior temporal interval (e.g., the validation interval $\Delta t_{validation}$, as described herein). In some instances, one or more of the distributed components of FI computing system 130 may perform one or of the steps of exemplary process 300, as described herein.

Referring to FIG. 4, FI computing system 130 may perform any of the exemplary processes described herein to receive elements of customer data that identify one or more customers of the financial institution (e.g., in step 402 of FIG. 4). For example, FI computing system 130 may receive the elements of customer data from one or more additional computing systems associated with, or operated by, the financial institution (such as, but not limited to, one or more of issuer systems 201, including issuer system 203), and in some instances, FI computing system 130 may perform any of the exemplary processes described herein to store the obtained elements of customer data within a locally accessible data repository (e.g., within aggregated data store 132). Further, in some instances, FI computing system 130 may also perform any of the exemplary processes described herein to synchronize and merge the obtained elements of customer data with one or more previously ingested elements of customer data maintained within the locally accessible data repository. As described herein, each of the elements of customer data may be associated with a corresponding one of the customers, and may include a customer identifier associated with the corresponding one of the customers (e.g., the alphanumeric character string, etc.) and a system identifier associated with a corresponding one of the additional computing systems (e.g., an IP or MAC address of issuer system 203, etc.).

FI computing system 130 may perform any of the exemplary processes described herein to generate an input dataset associated with each of the customers identified by the discrete elements of customer data 202, and to apply the adaptively trained, gradient-boosted, decision-tree process described herein to each of the input datasets, in accordance with a predetermined temporal schedule (e.g., on a daily, weekly, or monthly basis), or in response to a detection of a triggering event. By way of example, and without limitation, the triggering event may correspond to a detected change in a composition of the elements of customer data 202 maintained within aggregated data store (e.g., to an ingestion of additional elements of customer data 202, etc.) or to a receipt of an explicit request received from one or more of issuer systems 201.

For example, FI computing system 130 may also perform any of the exemplary processes described herein to obtain one or more model parameters that characterize the adaptively trained machine-learning or artificial-intelligence process (e.g., the adaptively trained, gradient-boosted, decision-tree process described herein) and elements of model input data that specify a composition of an input dataset for the adaptively trained machine-learning or artificial-intelligence process (e.g., in step 404 of FIG. 4). In some instances, and for the adaptively trained, gradient-boosted, decision-tree process described herein, the one or more model parameters may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, the elements of model input data may specify the composition of the input dataset for the adaptively trained, gradient-boosted, decision-tree process, which not only identifies the elements of customer-specific data included within each input data set dataset (e.g., input feature values, as described herein), but also a specified sequence or position of these input feature values within the input dataset.

In some instances, FI computing system 130 may access the elements of customer data associated with one or more customers of the financial institution, and may perform any of the exemplary processes described herein to generate, for each of the one or more customers, an input dataset having a composition consistent with the elements of model input data (e.g., in step 406 of FIG. 4). By way of example, and as described herein, the elements of customer data may include customer identifiers associated with each of the customers of the financial institution, or with a selected subset of these customers (e.g., those customers that hold an unsecured credit product issued by the financial institution), and FI computing system 130 may generate the input datasets for each of these customers in accordance with a predetermined schedule (e.g., on a daily, weekly, or monthly basis) or based on a detected occurrence of a triggering event. In other examples, one or more of the elements of customer data may be associated with a customer-specific request for financial product or payment instrument (e.g., received at issuer system 203 from a device operable by a corresponding one of the customers), and FI computing system 130 may perform operations that generate the input dataset for that corresponding customer in real-time and contemporaneously with the receipt of the one or more elements of the customer data from issuer system 203.

Further, and based on the one or more obtained model parameters, FI computing system 130 may perform any of the exemplary processes described herein to apply the adaptively trained machine-learning or artificial-intelligence process (e.g., the adaptively trained, gradient-boosted, decision-tree process described herein) to each of the generated, customer-specific input datasets (e.g., in step 408 of FIG. 4), and to generate a customer-specific element of predicted output data associated with each of the customer-specific input datasets (e.g., in step 410 of FIG. 4). For example, and based on the one or more obtained model parameters, FI computing system 130 may perform operations, described herein, that establish a plurality of nodes and a plurality of decision trees for the adaptively trained, gradient-boosted, decision-tree process, each of which receive, as inputs (e.g., "ingest"), corresponding elements of the customer-specific input datasets. Based on the ingestion of the input datasets by the established nodes and decision trees of the adaptively trained, gradient-boosted, decision-tree process, FI computing system 130 may perform operations that apply the adaptively trained, gradient-boosted, decision-tree process to each of the customer-specific input datasets and that generate the customer-specific elements of the output data associated with the customer-specific input datasets.

As described herein, each of the customer-specific elements of the output data may include a numerical score indicative of a predicted likelihood that a corresponding one of the customers will be involved in a default event during the future temporal interval. In some examples, the numerical score within each of the customer-specific elements of the output data may be zero or unity, with a numerical score of zero being indicative of a predicted non-occurrence of a default event during the future temporal interval, and a numerical score of unity may be indicative of a predicted occurrence of a default event during the future temporal interval. Further, and as described herein, the future temporal interval may include, but is not limited to, a three-month period, and each of the numerical scores may be indicative of the predicted likelihood that the corresponding one of the customers will be involved in a default event between three and six months subsequent to a corresponding prediction date (e.g., the prediction date $t_{pred}$ described herein).

In step 412 of FIG. 4, FI computing system 130 may also perform any of the exemplary processes described herein to post-process the customer-specific elements of output data and, among other things, associated each of the customer-specific elements of output data with a corresponding one of the customer identifiers and in some instances, with a corresponding one of the system identifiers, e.g., as maintained within the elements of customer data). Further, FI computing system 130 mat also perform any of the exemplary processes to sort the associated elements of customer data and the customer-specific elements of output data based on the corresponding numerical scores, which indicate the predicted likelihood that corresponding ones of the customers will be involved in a default event during the future temporal interval, and generate elements of sorted output data that include the associated, and now sorted, elements of customer data and the elements of customer-specific output data (e.g., in step 414 of FIG. 4).

In some instances, by sorting the associated elements of elements of customer data and output data in accordance with the respective numerical scores, FI computing system 130 may identify those customers of the financial institution that represent the greatest default risk to the financial institution during the future temporal interval (e.g., those customers characterize by a numerical score of unity). Further, and based on the corresponding system identifier, FI computing system 130 may perform any of the exemplary processes described herein to transmit all, or a selected portion of, the elements of sorted output data to a corresponding one of the additional computing systems associated with the financial institution, which include, but are not limited to, a corresponding one of issuer systems 201, such as issuer system 203 (e.g., in step 416 of FIG. 4). As described herein, one or more of issuer system 201, such as issuer system 203, may receive a corresponding portion of the ranked elements of predictive output data from FI computing system 130, and may perform any of the exemplary processes described herein to that parse each the elements of sorted output data to obtain a corresponding numerical score for a corresponding customer, based on the corresponding numerical score, to modify one or more terms or conditions of an issued financial product or payment instrument (e.g., a credit limited to an unsecured credit-card account) to reflect the predicted likelihood that the corresponding customer will be involved in a default event during the future temporal interval. Exemplary process 400 is then complete in step 418.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interfaces (APIs) 134, 204, and 242, ingestion engine 136, pre-processing engine 140, NLP module 166, aggregation module 171, training engine 176, training input module 180, adaptive training and validation module 186, model input engine 212, predictive engine 232, post-processing engine 236, and credit modification engine 244, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:

a memory storing instructions;

a communications interface; and at least one processor coupled to the memory and the communications interface, the at least one processor being configured to execute the instructions to:

receive first interaction data from a plurality of first computing systems via the communications interface, generate a plurality of consolidated data elements based on an application of one or more pre-processing operations to the first interaction data, and store the consolidated data elements within the memory, each of the consolidated data elements being associated with an identifier of a device;

receive the identifier of a corresponding one of the devices from a second computing system via the communications interface, and based on the received identifier, obtain, from the memory, a subset of the consolidated data elements associated with a first temporal interval and with the received identifier;

generate an input dataset based on (i) the subset of the consolidated data elements and (ii) elements of contextual data characterizing exchanges of data initiated during the first temporal interval, the elements of contextual data being generated based on an application of a trained first artificial intelligence process to at least a portion of the subset of the consolidated data elements;

process the input dataset using a trained second artificial intelligence process, and based on the processing of the input dataset using the trained second artificial intelligence process, generate output data representative of a predicted likelihood of an occurrence of an event associated with the corresponding device during a second temporal interval, the second temporal interval being subsequent to the first temporal interval and being separated from the first temporal interval by a corresponding buffer interval; and transmit the identifier and at least a portion of the generated output data to the second computing system via the communications interface, the computing system being configured to generate or modify second interaction data associated with the device based on the received identifier and on the portion of the output data.

2. The apparatus of claim 1, wherein:
each of the data exchanges is initiated by a first counterparty during the first temporal interval; and
the at least one processor is further configured to execute the instructions to:
receive elements of third interaction data from an additional computing system via the communications interface, each of the elements of third interaction data being associated with a corresponding one of the data exchanges;
obtain, from each of the elements of third interaction data, an identifier of a second counterparty to a corresponding one of the data exchanges; and
apply the trained first artificial intelligence process to each of the identifiers, and based on the application of the trained first artificial intelligence process to each of the identifiers, generate a corresponding one of the elements of contextual data.

3. The apparatus of claim 2, wherein:
the identifier of at least one of the second counterparties comprises a counterparty name; and
the at least one processor is further configured to generate, for the at least one of the second counterparties, the corresponding one of the elements of contextual data based on the application of the trained first artificial intelligence process to one or more portions of the counterparty name.

4. The apparatus of claim 1, wherein:
each of the data exchanges is initiated by a first counterparty during the first temporal interval;
each of the elements of contextual data associate a second counterparty to a corresponding one of the data exchanges with a counterparty type or a counterparty category; and
the at least one processor is further configured to execute the instructions to generate aggregated parameter data that includes aggregated values of one or more parameters of the data exchanges based on the elements of third interaction data and contextual data, each of the aggregated values being associated with a corresponding one of the counterparty types or the counterparty categories.

5. The apparatus of claim 4, wherein the at least one processor is further configured to execute the instructions to:
based on data characterizing a composition of the input dataset, perform operations that at least one of extract a first feature value from the aggregated values or compute a second feature value based on the first feature value, the second feature value being indicative of a variation in a corresponding one of the aggregated values; and
generate the input dataset based on at least one of the first feature value or the second feature value.

6. The apparatus of claim 1, wherein the at least one processor is further configured to:
obtain (i) one or more parameters that characterize the trained first artificial intelligence process and (ii) data that characterizes a composition of the input dataset;
generate the input dataset in accordance with the data that characterizes the composition; and
apply the trained second artificial intelligence process to the input dataset in accordance with the one or more parameters.

7. The apparatus of claim 6, wherein the at least one processor is further configured to:
based on the data that characterizes the composition, perform operations that at least one of extract a first feature value from the first interaction data or compute a second feature value based on the first feature value; and
generate the input dataset based on at least one of the first feature value or the second feature value.

8. The apparatus of claim 1, wherein:
the trained second artificial intelligence process comprises a trained, gradient-boosted, decision-tree process; and
the output data comprises a numerical score indicative of the predicted likelihood of the occurrence of the event during the second temporal interval.

9. The apparatus of claim 1, wherein the at least one processor is further configured to execute the instructions to:
obtain elements of third interaction data and additional elements of contextual data, each of the elements of the third interaction data comprising a temporal identifier associated with a temporal interval;
based on the temporal identifiers, determine that a first subset of the elements of the third interaction data and the additional elements of contextual data are associated with a prior training interval, and that a second subset of the elements of the third interaction data and the additional elements of contextual data are associated with a prior validation interval; and
generate a plurality of training datasets based corresponding portions of the first subset, and perform operations that train the second artificial intelligence process based on the training datasets.

10. The apparatus of claim 9, wherein the at least one processor is further configured to execute the instructions to:
generate a plurality of validation datasets based on portions of the second subset;
apply the trained second artificial intelligence process to the plurality of validation datasets, and generate additional elements of output data based on the application of the trained first artificial intelligence process to the plurality of validation datasets;
compute one or more validation metrics based on the additional elements of output data; and
based on a determined consistency between the one or more validation metrics and a threshold condition, validate the trained first artificial intelligence process.

11. The apparatus of claim 1, wherein
the at least one processor is further configured to execute the instructions to
based on the identifier, obtain the elements of first interaction data associated with a first temporal interval and the elements of contextual data characterizing the exchanges of data initiated during the first temporal interval from a portion of the memory.

12. The apparatus of claim 1, wherein
the computing system is further configured to transmit at least a portion of the generated or modified second interaction data to the device across the communications network, the portion of the generated or modified second interaction data modifying an interaction between the device and at least one of an additional device or an additional computing system.

13. The apparatus of claim 1, wherein the at least one processor is further configured to execute the instructions to:
obtain a value of a metric that characterizes an accuracy of the trained first artificial intelligence process during the application to the input dataset;

obtain elements of process data that include a parameter value of the trained first artificial intelligence process and input data that specifies a composition of the input dataset;

determine that the metric value is inconsistent with at least one predetermined threshold value; and perform operations that modify at least one of parameter value or the composition of the input dataset based on determination that the metric value is inconsistent with at least one predetermined threshold value.

14. A computer-implemented method, comprising:

receiving, using at least one processor, first interaction data from a plurality of first computing systems, generating, using the at least one processor, a plurality of consolidated data elements based on an application of one or more pre-processing operations to the first interaction data, and storing, using the at least one processor, the consolidated data elements within a memory, each of the consolidated data elements being associated with an identifier of a device;

receiving the identifier of a corresponding one of the devices from a second computing system using the at least one processor, and based on the received identifier, obtaining, using the at least one processor, and from the memory, a subset of the consolidated data elements associated with a first temporal interval and with the received identifier;

generating, using the at least one processor, an input dataset based on (i) the subset of the consolidated data elements and (ii) elements of contextual data characterizing exchanges of data initiated during the first temporal interval, the elements of contextual data being generated based on an application of a trained first artificial intelligence process to at least a portion of the subset of the consolidated data elements;

using the at least one processor, processing the input dataset using a trained second artificial intelligence process, and based on the processing of the input dataset using the trained second artificial intelligence process, generating output data representative of a predicted likelihood of an occurrence of an event associated with the corresponding device during a second temporal interval, the second temporal interval being subsequent to the first temporal interval and being separated from the first temporal interval by a corresponding buffer interval; and transmitting, using the at least one processor, the identifier and at least a portion of the generated output data to the second computing system, the computing system being configured to generate or modify second interaction data associated with the device based on the received identifier and on the portion of the output data.

15. The computer-implemented method of claim 14, wherein:

each of the data exchanges is initiated by a first counterparty during the first temporal interval; and the computer-implemented method further comprises:

receiving, using the at least one processor, elements of third interaction data from an additional computing system, each of the elements of third interaction data being associated with a corresponding one of the data exchanges;

using the at least one processor, obtaining, from each of the elements of third interaction data, an identifier of a second counterparty to the corresponding one of the initiated data exchanges; and using the at least one processor, applying the trained first artificial intelligence process to each of the identifiers, and based on the application of the trained first artificial intelligence process to each of the identifiers, generating a corresponding one of the elements of contextual data.

16. The computer-implemented method of claim 14, wherein:

each of the data exchanges is initiated by a first counterparty during the first temporal interval;

each of the elements of contextual data associate a second counterparty to a corresponding one of the data exchanges with a counterparty type or a counterparty category; and the computer-implemented method further comprises:

generating, using the at least one processor, aggregated parameter data that includes aggregated values of one or more parameters of the data exchanges based on the elements of third interaction data and contextual data, each of the aggregated values being associated with a corresponding one of the counterparty types or the counterparty categories;

based on data characterizing a composition of the input dataset, performing operations, using the at least one processor, that at least one of extract a first feature value from the aggregated values or compute a second feature value based on the first feature value, the second feature value being indicative of a variation in a corresponding one of the aggregated values; and generating, using the at least one processor, the input dataset based on at least one of the first feature value or the second feature value.

17. The computer-implemented method of claim 14, further comprising:

obtaining, using the at least one processor, (i) one or more parameters that characterize the trained second artificial intelligence process and (ii) data that characterizes a composition of the input dataset;

based on the data that characterizes the composition, performing operations, using the at least one processor, that at least one of extract a first feature value from the first interaction data or compute a second feature value based on the first feature value;

generating, using the at least one processor, the input dataset based on at least one of the extracted first feature value or the computed second feature value; and applying, using the at least one processor, the trained second artificial intelligence process to the input dataset in accordance with the one or more parameters.

18. The computer-implemented method of claim 14, wherein:

the trained second artificial intelligence process comprises a trained, gradient-boosted, decision-tree process; and the output data comprises a numerical score indicative of the predicted likelihood of the occurrence of the event during the second temporal interval.

19. The computer-implemented method of claim 14, further comprising:

obtaining, using the at least one processor, elements of third interaction data and additional elements of contextual data, each of the elements of the third interaction data comprising a temporal identifier associated with a temporal interval;

based on the temporal identifiers, determining, using the at least one processor, that a first subset of the elements of the third interaction data and the additional elements of contextual data are associated with a prior training interval, and that a second subset of the elements of the third interaction data and the additional elements of contextual data are associated with a prior validation interval; and generating, using the at least one processor, a plurality of training datasets based corresponding portions of the first subset, and perform operations that train the second artificial intelligence process based on the training datasets.

20. The computer-implemented method of claim 19, further comprising:

generating, using the at least one processor, a plurality of validation datasets based on portions of the second subset;

using the at least one processor, applying the trained second first artificial intelligence process to the plurality of validation datasets, and generating additional elements of output data based on the application of the trained second artificial intelligence process to the plurality of validation datasets;

computing, using the at least one processor, one or more validation metrics based on the additional elements of output data; and based on a determined consistency between the one or more validation metrics and a threshold condition, validating, using the at least one processor, the trained second artificial intelligence process using the at least one processor.

21. A tangible, non-transitory computer-readable medium storing instructions that, when executed by at least one processor, cause the at least one processor to perform a method, comprising:

receiving first interaction data from a plurality of first computing systems, generating a plurality of consolidated data elements based on an application of one or more pre-processing operations to the first interaction data, and storing the consolidated data elements within a memory, each of the consolidated data elements being associated with an identifier of a device;

receiving the identifier of a corresponding one of the devices from a second computing system, and based on the received identifier, obtaining, from the memory, a subset of the consolidated data elements associated with a first temporal interval and with the received identifier;

generating, an input dataset based on (i) the subset of the consolidated data elements and (ii) elements of contextual data characterizing exchanges of data initiated during the first temporal interval, the elements of contextual data being generated based on an application of a trained first artificial intelligence process to at least a portion of the subset of the consolidated data elements;

processing the input dataset using a trained second artificial intelligence process, and based on the processing of the input dataset using the trained second artificial intelligence process, generating output data representative of a predicted likelihood of an occurrence of an event associated with the corresponding device during a second temporal interval, the second temporal interval being subsequent to the first temporal interval and being separated from the first temporal interval by a corresponding buffer interval; and transmitting the identifier and at least a portion of the generated output data to the second computing system, the computing system being configured to generate or modify second interaction data associated with the device based on the identifiers received identifier and on the portion of the output data.

* * * * *